United States Patent
Sengupta et al.

(10) Patent No.: US 7,575,686 B2
(45) Date of Patent: Aug. 18, 2009

(54) PROCESS FOR AUTOTROPHIC PERCHLORATE REDUCTION USING ELEMENTAL SULFUR AND MOLLUSK SHELLS

(75) Inventors: Sukalyan Sengupta, N. Dartmouth, MA (US); Sarina Ergas, Amherst, MA (US); Klaus Nüsslein, Amherst, MA (US); Ashish Sahu, Amherst, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 11/645,152

(22) Filed: Dec. 22, 2006

(65) Prior Publication Data

US 2007/0267346 A1 Nov. 22, 2007

Related U.S. Application Data

(60) Provisional application No. 60/753,992, filed on Dec. 23, 2005.

(51) Int. Cl.
   *C02F 3/00* (2006.01)
(52) U.S. Cl. .................................. 210/617; 210/902
(58) Field of Classification Search ......... 210/615–617, 210/610, 902
   See application file for complete search history.

(56) References Cited

U.S. PATENT DOCUMENTS

| | | | |
|---|---|---|---|
| 4,933,076 A | 6/1990 | Oshima et al. | |
| 5,160,622 A | 11/1992 | Gunderson et al. | |
| 5,578,214 A | 11/1996 | Yamasaki et al. | |
| 5,702,604 A | 12/1997 | Yamasaki et al. | |
| 5,961,831 A | 10/1999 | Lee et al. | |
| 6,171,480 B1 | 1/2001 | Lee et al. | |
| 6,291,233 B1 | 9/2001 | Saha et al. | |
| 6,391,201 B1 | 5/2002 | Pelz | |

(Continued)

FOREIGN PATENT DOCUMENTS

| | | |
|---|---|---|
| EP | 0 695 722 | 1/2000 |
| JP | 10323694 | 12/1998 |
| JP | 11285695 | 10/1999 |
| WO | WO 99/25655 | 5/1999 |

OTHER PUBLICATIONS

Sengupta et al., "Autotrophic biological denitrification for complete removal of nitrogen from septic system wastewater," Water, Air, and Soil Pollution: Focus (2006) 6: 111-126.

(Continued)

*Primary Examiner*—Chester T Barry
(74) *Attorney, Agent, or Firm*—Weingarten, Schurgin, Gagnebin & Lebovici LLP

(57) ABSTRACT

The invention relates to a system and method to reduce perchlorate in wastewater utilizing perchlorate-reducing bacteria, sulfur as an electron donor and mollusk shells as alkalinity agent. Embodiments of the invention include a perchlorate-reduction system comprising a bioreactor unit having perchlorate-reducing media comprising elemental sulfur, oyster shells and a microbial community, and can further include an optional pretreatment unit, wastewater-catchment and/or post-treatment components. Embodiments of the method include multiple steps utilizing the system and additional process steps that achieve enhanced perchlorate reduction.

36 Claims, 36 Drawing Sheets

U.S. PATENT DOCUMENTS

| | | | | |
|---|---|---|---|---|
| 6,808,622 | B2* | 10/2004 | Okamoto et al. | 210/151 |
| 7,109,022 | B1* | 9/2006 | Yatagai et al. | 435/262.5 |
| 2006/0070948 | A1* | 4/2006 | Wickham | 210/610 |
| 2006/0292684 | A1* | 12/2006 | Bentley et al. | 435/262 |

OTHER PUBLICATIONS

Dauphin et al., "Microstructure, nanostructure and composition of the shell of concholepas concholepas (gastropoda, Muricidae)," Aquatic Living Resources, 16 (2003) 95-103.

* cited by examiner

PROCESS FOR AUTOTROPHIC PERCHLORATE REDUCTION USING ELEMENTAL SULFUR AND MOLLUSK SHELLS

CROSS REFERENCE TO RELATED APPLICATIONS

This application claims the benefit of provisional patent application No. 60/753,992 filed on Dec. 23, 2005.

STATEMENT REGARDING FEDERALLY SPONSORED RESEARCH OR DEVELOPMENT

N/A

BACKGROUND OF THE INVENTION

Perchlorate ($ClO_4^-$) contamination has primarily occurred in association with manufacturing of missiles, fireworks, and other industrial processes and has been recorded in 38 US states. Military applications have also resulted in contaminants such as nitrate and Royal Dutch Explosives (RDX) present with perchlorate as co-contaminants. Perchlorate contamination poses a significant health threat, and toxicological studies have demonstrated that it interferes with iodine uptake into the thyroid gland disrupting thyroid function. Although national standards have yet to be established, the Commonwealth of Massachusetts has set a maximum contaminant limit for perchlorate of 2 µg/L.

Perchlorate is highly soluble and stable in water and hence cannot be removed by conventional drinking water treatment processes such as filtration or air stripping. As an alternative, biological reduction of perchlorate has been investigated by several researchers and is thought to be the most cost-effective process for perchlorate removal. Certain bacteria have shown to metabolize perchlorate to chloride, which is harmless to the environment. A number of organic electron donors have been investigated for perchlorate reduction including acetate, hydrogen, elemental iron, thiosulfate, ethanol, desugared molasses and municipal wastewater, using pure and mixed cultures. Current isolates are characterized as mostly denitrifying, facultative anaerobes which can either degrade or co-metabolize perchlorate.

Excessive amounts of nitrogen discharged from decentralized, sub-surface wastewater treatment systems, or septic systems, degrades natural waters. Conventional septic systems remove at best about 23% of the nitrogen in the influent wastewater. Adding onsite, denitrification treatment, in a comparative evaluation of four previous, conventional technologies, showed maximum nitrogen removal reaching only 66%. Thus, there is a great need for cost-effective technologies applicable to onsite wastewater treatment that can achieve relatively higher percentages of nitrogen removal.

Nitrogen in wastewater is typically in the form of ammonia ($NH_3$) and organic nitrogen. Common aerobic soil bacteria convert ammonia and organic nitrogen to nitrate ($NO_3^-$) in soil, through the process of nitrification. A common treatment process is the reduction of $NO_3^-$ to gaseous nitrogen, $N_2$, gas through biological denitrification.

Biological denitrification is carried out in a bioreactor by bacteria that use nitrate as an energy source under anoxic conditions. Nitrate reduction is coupled with oxidation of an electron donor. Reduction of nitrate to nitrogen gas proceeds as follows:

$$NO_3^- \rightarrow NO_2^- \rightarrow NO \rightarrow N_2O \rightarrow N_2 \quad (1)$$

Heterotrophic biological denitrification is commonly coupled with nitrification for removing total nitrogen from domestic and industrial wastewater. Heterotrophic denitrifying bacteria require an organic carbon source for energy and cell synthesis. An internal organic carbon source can be provided by recirculating nitrified wastewater to an anoxic zone in the bioreactor; however, total nitrogen removal is limited in these systems. Methanol is often favored as an external electron donor owing to its lower cost and sludge production compared with other organic carbon sources. However, methanol is difficult to handle, deliver and store and residual methanol in the effluent may pose a toxicity problem.

Autotrophic denitrification using sulfur has been studied since the latter half of the last century. A number of common soil bacteria are able to use reduced sulfur compounds as electron donors and respire on nitrate in the absence of oxygen. The process requires no external carbon and produces low amounts of biomass. A stoichiometric equation for autotrophic denitrification using elemental sulfur ($S^0$) as an electron donor is $$55S^0+20CO_2+50NO_3^-+38H_2O+4NH_4^+ \rightarrow 4C_5H_7O_2N+55SO_4^{2-}+25N_2+64H^+ \quad (2)$$

Based on this equation, for each gram of $NO_3^-$—N removed approximately 0.64 g of organic cells and 2.5 g of sulfate ($SO_4^{2-}$) are generated.

Benefits of this sulfur-based treatment approach include: denitrification can take place under aerobic conditions, eliminating the need to deoxygenate the influent wastewater; autotrophic bacteria yield less sludge; and these bacteria produce less of the greenhouse gas nitrous oxide ($N_2O$) than do heterotrophic bacteria.

Denitrification using sulfur and biological organisms in a bioreactor requires maintaining an appropriate chemical, nutrient and energetic environment for the biochemical reactions to proceed favorably. One of the important chemical parameters is acidity (pH) in the aqueous medium to which the bacteria are exposed. As can be seen in Eq. 2, above, the products of the denitrifying reactions with elemental sulfur as a reactant include the creation of hydrogen ion [$H^+$] as a product. Increasing concentrations of hydrogen ion correspond to increasing acidity in water, or a lower pH (where pH=−log[$H^+$]). Buffering refers to balancing pH, absorbing the acidity in water, or restoring alkalinity.

Alkalinity relates to a measure of total hydroxyl [$OH^-$], bicarbonate [$HCO_3^-$], and carbonate ion [$CO_3^{2-}$] available in natural water to balance acidity. For systems in which the carbonate species provide the major source of alkalinity, such as in the wastewater environment present in wastewater treatment processes, Total Alkalinity. (TALK) can be more precisely defined as $$[TALK]=[HCO_3^-]+[OH^-]+2[CO_3^{2-}]-[H^+] \quad (3)$$

Total Alkalinity is commonly expressed in milligrams per liter (mg/L) as calcium carbonate ($CaCO_3$). A half mole of $CaCO_3$ (50 grams) is charge-equivalent to one mole of $H^+$ ion (because each dissolved $CaCO_3$ molecule produces a carbonate ion with double negative charge); thus, 50 mg/L as $CaCO_3$ is 1 milli-equivalent per liter (meq/L), i.e., charge-equivalent to one milli-mole of $H^+$ ion per liter.

As the reaction in Eq. 2 drives forward, the reaction products increase the acidity of the aqueous environment of the bioreactor, which in turn can inhibit the ability of the bacteria to drive denitrification. In this reaction, to remove a gram of nitrate, 4.5 gram equivalents alkalinity as $CaCO_3$ are consumed.

Therefore, it is advantageous to introduce a source of alkalinity that can sufficiently buffer the acidity as it builds up. It is additionally desirable that this source of alkalinity provide buffering capacity at a rate that matches the needs of the denitrification system for optimal biochemical and chemical processes.

Sulfur and limestone autotrophic denitrification (SLAD) processes have been known and studied since the 1950s including mixing these materials in a packed-bed bioreactor. Most of these processes have only been studied at the scale of the laboratory bench, however. A number of researchers have used reduced sulfur compounds for biological denitrification of domestic wastewater, industrial wastewater, and drinking water. Several early studies focused on thiosulfate ($S_2O_3^{2-}$) as an electron donor.

The SLAD approach was further studied in the 1990s to provide optimum design criteria for the SLAD process. This provided a reportedly optimum sulfur dosage and a loading rate in a SLAD system, the minimum average retention time for water in the reactor, and the nitrate loading rate corresponding to the maximum nitrate removal efficiency.

However, despite the traditional SLAD processes being well-studied, in actual practice problems exist that limit using known SLAD processes to clean wastewater at the field scale. One problem is that the SLAD systems have required frequent "backwashing" (or "backflushing"), i.e., running a flow of water counter to the direction of the normal treatment flow, in order to dislodge sludge and regain active biochemistry. Following this backwashing, there is typically a time-lag in regaining denitrification efficiency. A second problem has been that nitrite ($NO_2^-$) has increased in the effluent when the hydraulic retention time (HRT) has been less than 6 hours and the nitrogen loading exceeds 200 g/day $NO_3^-$—N per cubic meter of the SLAD media.

Autotrophic perchlorate reduction is carried out by organisms that use inorganic compounds, such as hydrogen or reduced iron or sulfur compounds, as electron donors and inorganic carbon as a carbon source. The use of inorganic electron donors eliminates the problem of carry-over of excess organic carbon into the product water. Since these organisms are slow growing, very little excess biomass is produced. Hydrogen has been reported in several studies to be comparable in perchlorate degradation rates to organic electron donors such as acetate.

Perchlorate reducing organisms are ubiquitous in nature; many species of denitrifiers have been shown to be capable of reducing perchlorate using either organic electron donors or hydrogen. However, perchlorate reduction using elemental sulfur has not been reported previously to have been successful; it may require a specialized consortium of microorganisms and/or specialized biochemical conditions in a bioreactor.

Therefore, a need exists for new methods, processes, technology and system designs that can overcome these problems and provide a cost-effective system for reducing perchlorate and/or nitrogen in wastewater.

SUMMARY OF THE INVENTION

The invention provides for a wastewater treatment system, comprising a bioreactor unit, perchlorate reducing media and additional components and process steps, that achieves increased perchlorate reduction using an electron donor, such as, for example, without limitation, elemental sulfur ($S^0$), zerovalent iron, carbon, methanol, and/or alcohol, and offers other substantial and significant advances over conventional autotrophic, perchlorate reduction systems.

An embodiment of the invention provides for perchlorate reduction by sulfur-utilizing, perchlorate-reducing bacteria (SUPeRB). Embodiments of the invention provide a robust, reliable and inexpensive biological process for treatment of perchlorate contaminated water, using $S^0$ as an electron donor with SUPeRB cultures.

Elemental sulfur pellets have many advantages as a bioreactor packing material, including being inexpensive and readily available as a waste by-product of the petroleum industry. Also, since sulfur-oxidizing bacteria are autotrophs they grow slowly, producing very little sludge, hence, reducing the maintenance required for backwashing.

A preferred embodiment provides a system for improving water quality that comprises a bioreactor into which is placed media comprising a plurality of granules of electron donor material and pieces of calcium carbonate material having at least 90% calcium carbonate by weight in the form of aragonite, the media being positioned in a cavity of the bioreactor, the pieces of calcium carbonate material being in fluid communication with the granules of electron donor material, the system having an entry passage for delivery of a liquid into the bioreactor cavity such that the liquid contacts the media, and an exit for the fluid from the bioreactor. A post-treatment system can also be provided in some embodiments to remove biocells in the effluent, which post-treatment may comprise a sand filter and/or other cleansing process.

A preferred embodiment of the invention further provides for a water treatment system comprising a novel bioreactor fitted with perchlorate-reducing media that can include a selected physical form of elemental sulfur in combination with mollusk shell buffering material and the media seeded with autotrophic bacteria. The invention further provides for this system to be used for reducing the loading in wastewater of perchlorate and other undesirable compounds, such as, for example, nitrate compounds.

A preferred embodiment can provide for an enhanced method of reducing perchlorate in a water source using at least one member of the genera *Dechloromonas* (β-proteobacteria) or *Dechlorospirillium* (α-proteobacteria) disposed in a media comprising a sulfur material and a mollusk-shell buffering material present in a particular volumetric ratio of each material to the other.

A preferred embodiment can provide for an enhanced method of reducing perchlorate in a water source using at least one member of the genera *Dechloromonas* (β-proteobacteria) or *Dechlorospirillium* (α-proteobacteria) disposed in a media comprising a sulfur material and a mollusk-shell buffering material present in a particular volumetric ratio of each material to the other, and wherein the bioreactor volume is greater than 10 liters.

A further embodiment provides for the bioreactor to be a rectangular tank, the flow rate to exceed 0.2 L/hr and/or to comport to National Sanitation Foundation standard #40 (NSF 40), and influent and effluent pipes to exceed 1.5 inches in diameter. Further, according to the invention, the tank can be composed of polyethylene, although other materials can be used effectively.

A preferred embodiment for a water purification system can further include a bioreactor having an internal volume greater than 10 liters in which layers of sulfur and oyster shells pieces in fluid communication with each other are used to regulate the energetic and chemical environment for the perchlorate-reducing bacteria.

An alternative embodiment of the invention provides for a water treatment system and method comprising a novel bioreactor fitted with media comprising elemental sulfur in combination with mollusk-shell buffering material and the media seeded with autotrophic bacteria, whereby the system and method is used for reducing perchlorate or nitrogen concentrations in treated water.

A preferred embodiment further provides a method for treating liquid from a source, comprising supplying inlet liquid from a liquid source; providing a bioreactor having a cavity and at least one inlet means and at least one outlet opening connecting to the cavity; providing a media comprising a plurality of granules of electron donor material and pieces of calcium carbonate material having at least 90% calcium carbonate by weight in the form of aragonite; positioning the media in the bioreactor cavity such that a liquid passing through the bioreactor cavity makes fluid contact with the media and such that the pieces of calcium carbonate material are in fluid communication with the granules of electron donor material, and seeding the media with a sludge containing bacteria; delivering the inlet liquid into the bioreactor to come into fluid contact with the media and thereby form a treated liquid; and passing the treated liquid out of the bioreactor outlet opening.

A preferred embodiment of the invention can provide for a method of flowing inlet water from a water source, such as contaminated groundwater, contaminated surface water, industrial wastewater stream or other waste water source, passing the inlet water into a bioreactor comprised of elemental sulfur and crushed oyster shells in a selected volumetric ratio, retaining the water in the bioreactor cavity for a specified time, and releasing the effluent flow from the bioreactor as treated outlet water. In a further embodiment, the sulfur can be provided as solid granules, pellets, blocks or particles preferably greater than 2 mm in diameter, and the total volumetric ratio of sulfur in the bioreactor to buffer material can be in a range of 200% to 350%, and preferably is about 300%.

A preferred embodiment of the invention can also provide for a method of flowing inlet water from a water source, such as contaminated groundwater, contaminated surface water, industrial wastewater stream or other waste water source, passing the inlet water into a bioreactor comprised of elemental sulfur and crushed oyster shells in a selected volumetric ratio, retaining the water in the bioreactor cavity for a specified time, and releasing the effluent flow from the bioreactor as treated outlet water.

According to a preferred embodiment, the invention can provide additionally for one or more pretreatment and/or post-treatment tanks in which source water is first pretreated and/or post-treated, respectively. The invention can further provide for the pretreatment of the wastewater for removal of particulate matter, litter material, organic carbon, or for nitrification, partial denitrification, and/or other physical, chemical or biochemical pretreatment (optionally including prior circulation through a septic tank or other wastewater collection tank or catchment volume) before it enters the bioreactor process. Optionally, there may be a partial recycling of the pretreatment flow between the pretreatment apparatus and a septic tank or other wastewater system component prior to passing a portion or all of the pretreated water into the bioreactor unit.

Another embodiment of the invention further provides for multiple alternating layers of elemental sulfur granules and crushed oyster shells, including, for example, nine or more such alternating layers.

A preferred embodiment of the invention provides also for empty bed contact times (EBCT) that can be in the range of 2 to 100 hours, or preferably in the range of 4 to 48 hours, and more preferably in the range of 8 to 16 hours, and can provide for treatment flow rates greater than 0.2 L/hr, and for various bed replenishment and/or flushing periods for the sulfur and mollusk-shell buffer layers.

The invention can further include a method for backwashing, including backwash frequency, water flowrate, volume of backwash water used, flow direction, pressure and duration, as well as the process variables in this optional step. A preferred backwashing frequency is not more frequent than once every 6 months, a more preferred backwashing frequency is not more frequent than once every year, and more preferably backwashing frequency is not more frequent than once every two years.

A preferred embodiment of the invention provides a system that comprises, in addition to the previously mentioned bioreactor containing elemental sulfur with mollusk-shell-buffered media, at least one of one or more sampling ports, one or more flow sensors, one or more sampling sensors, an automated flow-regulation controller, a computer, an electric control interface, a backwash system comprising a first backwash opening in the body portion sealably connected to a backwash inlet pipe, a second backwash opening in the body portion sealably connected to a backwash outlet pipe, a source of backwash water, a backwash pump, a backwash flow regulator, wherein: when an automated flow-regulator controller is present, then the flow regulator is also present; when a flow regulator and flow regulator controller are both present, the flow-regulator controller is mechanically or electrically connected controllably to the flow regulator; when an automated flow-regulator controller and computer are both present, the computer is electrically and controllably connected at least to the flow-regulator controller; and when an electric control interface is present, said interface is operably connected to one or more of the pump, the backflush pump, the flow regulator, the flow-regulator controller, and the computer; and when the backflush system, computer, and automated flow controller are together present, then the computer is electrically and controllably connected to the automated flow controller and to the backwash pump.

A preferred embodiment of the invention provides even more important and further advantages in the field of using autotrophic, sulfur-oxidizing, perchlorate reduction for wastewater treatment, for example: (1) high perchlorate removal efficiencies that are maintained by the novel media and method of use (perchlorate reduction rates as high as 99%); (2) increased nitrite removal efficiency; (3) elemental sulfur, which is a by-product of oil processing, being less expensive than ethanol or methanol; (4) the sulfur granules eliminating the need for expensive feed control systems; (5) elemental sulfur being easier to store and handle and producing less effluent $SO_4^{2-}$ than thiosulfate; (6) little or no external carbon source being required, minimizing the possibility of carry-over of excess organic carbon into the effluent; (7) the system being maintained more consistently at higher pH levels (less acidic) more favorable to the bioreactor's perchlorate reduction treatment process; and (8) the system being maintained at a higher total alkalinity more favorable to maintaining the higher pH levels.

A preferred embodiment of the invention provides systems and methods for improving the quality of the outlet water in a water treatment system relative to the quality of the inlet water by producing outlet water that has substantially lower concentration of perchlorate. Herein, "substantially lower concentration" is defined to mean at least less than 50%, and preferably less than 30%, and more preferably less than 10%, and even more preferably less than 2% of the untreated inlet perchlorate concentration. Similarly, achieving "substantial reduction" in perchlorate is herein defined to mean achieving, in the treated outlet water, a reduction in pollutant concentration relative to the untreated inlet water that is at least greater than a 50% reduction, and preferably that is greater than a 70% reduction, and more preferably greater than 90% reduction, and even more preferably greater than 98% reduction.

Further advantages relate to the feature that the system can be provided as a passive system (e.g., neither electric power nor daily dose of chemicals are required), although use of electric power and regular replenishment of chemicals are also consistent with alternative embodiments of the invention, thus making the invention advantageous for wastewater treatment applications where round-the-clock supervision is impractical or impossible, such as on-site systems, in situ reactive barriers for stormwater treatment, contaminated groundwater, combined sewer overflows (CSOs), surface water treatment, and aquaculture systems.

System applications include, for example, without limitation, treatment systems for individual households, commercial establishments, industrial facilities, military bases, small communities, municipal wastewater treatment systems, farms, aquaculture systems, storm water treatment systems, surface water treatment systems, bioreactor systems generally for the treatment of perchlorate, in situ permeable reactive barrier walls for treatment of urban and agricultural run-off, and/or nitrate-contaminated and/or perchlorate-contaminated groundwater and in situ permeable reactive barrier walls for treatment of perchlorate-contaminated groundwater.

"Unmodified mollusk shell" as used herein, means mollusk shell or shells, including without limitation oyster shell or shells, from which the mother-of-pearl layer, if any such layer is present, has not been substantially removed by a manmade process or by substantial exposure to natural weathering in a procedure intended to do the same.

"Mollusk shell pieces" and/or "oyster shell pieces" means herein pieces of the respective shell or shells resulting from unmodified mollusk shells being broken by a manmade or natural process.

"Commercial crushed oyster shell" means herein unmodified oyster shell or shells that is broken into pieces for use in poultry farming, fish tanks, or other human industry.

"Industrial by-product oyster shell" means herein unmodified oyster shell that remains after harvesting and extracting of the oyster meat for commercial use.

"Oyster shell," "oyster shells" and "oyster shell pieces" when used herein without other immediate, specific qualification, means unmodified oyster shell pieces.

A preferred embodiment of the invention provides for using unmodified mollusk shell pieces, including, for example, oyster shell pieces. The source of these oyster shell pieces can be commercial, crushed oyster shell and/or industrial by-product oyster shell that is subsequently crushed for use according to the invention.

Use of unmodified oyster shell is important and advantageous for reasons that include, inter alia, cost, availability, chemical modulation, and secondary environmental benefit. Modification of shells, such as, for example, removing the mother-of-pearl layer takes time, energy and human labor, all of which add to the direct economic cost of the shell, as well as adding indirect environmental burden owing to additional energy use. Unmodified mollusk shell can be obtained more easily and from more sources, such as commercial crushed oyster shell or industrial by-product oyster shell, again reducing cost owing to market competition among these multiple sources. Further, the presence of unmodified aspects of the oyster shell, such as, for example, the internal mother-of-pearl layer and/or the outer shell surface composition, can modulate the chemical dissolution of $CaCO_3$ and otherwise change the rate of dissolution of the $CaCO_3$ adjacent and below the mother-of-pearl adhesion. Therefore, using unmodified oyster shell pieces for the buffering material is preferred in the method and system according to the invention.

One embodiment of the invention provides for a bioreactor bed of combined amounts of sulfur and oyster shell wherein the oyster shell is unmodified oyster shell pieces and including biopolymers, such as chitin, lustrin, conchiol and other biopolymeric compounds secreted by the mollusk. A further embodiment can have unmodified oyster shell pieces that have been sterilized by electromagnetic radiation and/or heat treatment. For example, the oyster shell can be heated at about 250° F. for sufficient period to kill any bacteria that may be present in the shell.

Another embodiment provides for a bioreactor bed of combined amounts of sulfur and oyster shell wherein the microbes colonize both the sulfur and oyster shells. The oyster shells can provide a large surface for microbial attachment.

A further embodiment provides for a denitrification and/or a perchlorate-reduction bioreactor bed of combined amounts of sulfur and oyster shell wherein the sulfur granules and oyster shell pieces are each smaller in their greatest cross-sectional dimension than about 1 cm. Preferably, the sulfur granules (or pellets) are in the range of about 0.15 mm to 10 mm, are preferably in the range of about 0.3 mm to 5 mm, and more preferably in the range of about 0.4 mm to 2 mm. The crushed oyster shell pieces can be in the range of about 0.25 mm to 10 mm, or preferably in the range of about 0.6 mm to 8 mm, and more preferably in the range of about 0.85 mm to 5 mm. The size of the sulfur granules and oyster shell pieces is important for appropriate operation of the bioreactor according to an embodiment of the invention. Granules and pieces that are too small will tend to clog too easily and inhibit flow of the water to be treated through the bioreactor, while granules and pieces too large will provide reduced contact surface for microbial population and reduced contact between the bed and the treated water. Further, the relative size of the sulfur granules to the oyster shell pieces is important, where the sulfur granules and oyster shell pieces can be about the same size, and preferable that they be about the same size but with the effective size of sulfur granules being smaller than the effective size of oyster shell pieces, and more preferably the effective size of the oyster shell pieces being in the range of 150% to 250% of the effective size of the sulfur granules. "Effective size ($d_{10}$)" is defined herein to denote a size, $d_{10}$, wherein 90% of granules or pieces, as measured in a random sample of the overall volume of granules or pieces, respectively, are greater in size than this effective size $d_{10}$, while 10% of the granules or pieces are smaller in size than the effective size $d_{10}$.

An embodiment of the invention further provides for a method of perchlorate reduction using a bioreactor as described in one or more of the embodiments above, wherein the retention time for water being treated in the bioreactor is preferably in the range of about 2 hours to 100 hours, and more preferably in the range of about 8 hours to 65 hours, and more preferably in the range of about 8 to 40 hours, and preferably less than 15 hours in some embodiments. Another embodiment provides for the biochemical reactions in the bed to be anoxic and/or for the method to not include aeration or use of an aeration device within the denitrification and/or perchlorate-reduction bioreactor.

One preferred embodiment of the method achieves water quality having a concentration less than about 0.4 micrograms per liter of perchlorate and/or below the minimum limit of detection (MLD) using anoxic denitrification in a mixed sulfur and oyster shell sludge-inoculated medium.

One embodiment provides for the influent to a denitrification and/or perchlorate reduction bioreactor to be substantially depleted in organic carbon, preferably less than 15 mg/L organic C and more preferably less than 10 mg/L organic carbon.

A preferred embodiment of the system and method according to the invention provides for a system and method for improving water quality utilizing a bioreactor containing a media comprising an electron donor, such as for example, sulfur, iron and carbon, in a reduced oxidation state (such as, e.g., methanol, alcohol or other reduced carbon compounds comprising a hydrogen source) combined with a buffering material that provides alkalinity at a preferred rate of release. Preferably the buffering material will release alkalinity, in equivalents of mg/L $CaCO_3$ per day, at a rate not less than 8 mg/L and/or at a rate not less than 1.25 milli-equivalents per hour per gram of buffer material. A further embodiment provides for using a buffer material, which can be natural or synthetic, that has weight percentage of carbon (C), calcium (Ca) and magnesium (Mg) present in ratio to each other wherein Mg/Ca is less than about 50%, or Ca/C is greater than about 75%, or both Mg/Ca is less than about 50% and Ca/C is greater than about 75%.

DETAILED DESCRIPTION

Figure 1:
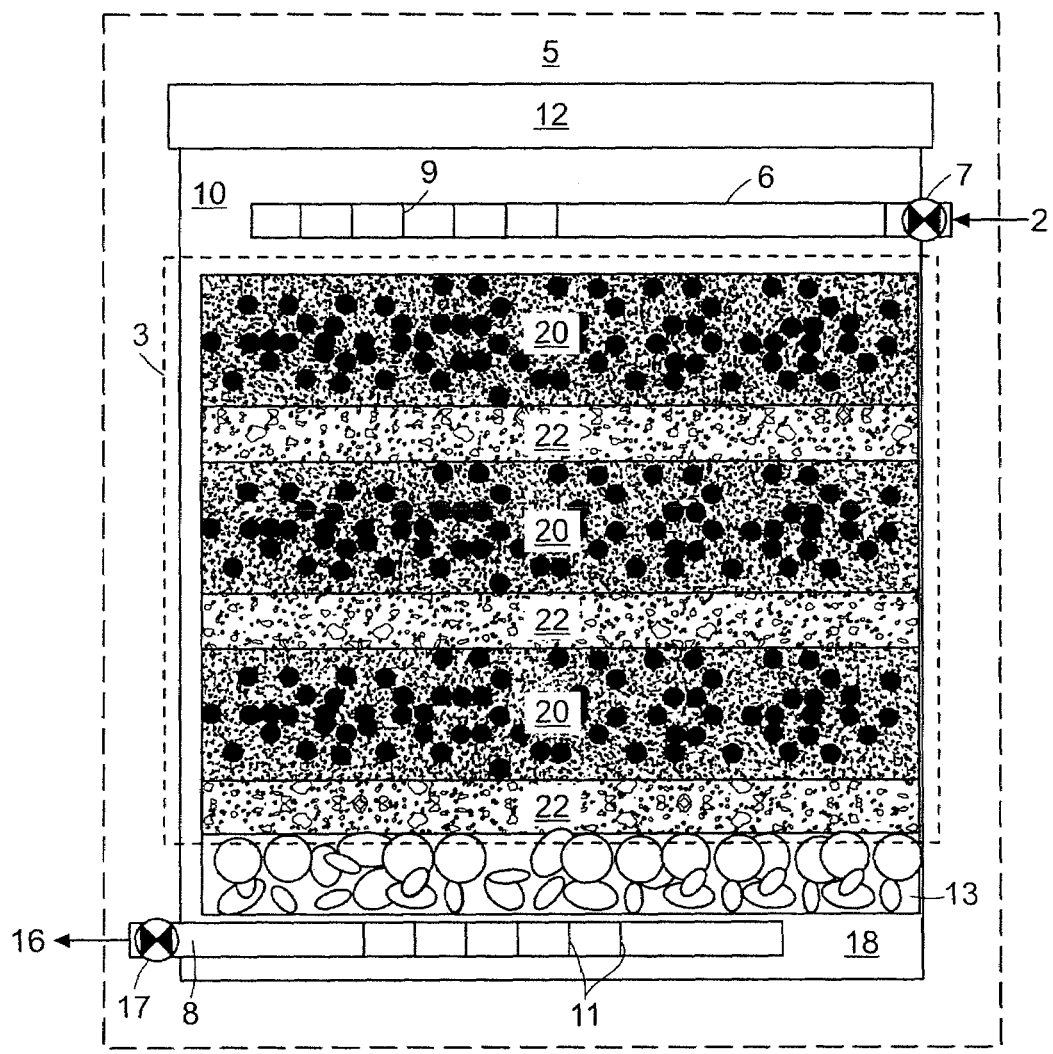
FIG. 1 illustrates a bioreactor with layered media of the present invention.

Preferred embodiments of the invention provide for, inter alia, a bioreactor unit, a novel treatment media, autotrophic bacteria seeded to the media, and related components to comprise a treatment system and operational method for reducing perchlorate in waste water. A preferred embodiment of the treatment media employs an electron donor, such as elemental sulfur, for example, and a buffering material having a high content calcium carbonate material such as mollusk shells or crushed coral material, for example. According to a further preferred embodiment, the media can be seeded by a sulfur-utilizing, perchlorate-reducing bacteria (SUPeRB), and/or by a perchlorate-reducing bacteria that is within the phylum Proteobacteria, and/or by at least one member of the genera *Dechloromonas* (β-proteobacteria) or *Dechlorospirillium* (α-proteobacteria).

The invention provides for a wastewater treatment system, comprising a bioreactor unit, perchlorate reducing media and additional components and process steps, that achieves increased perchlorate reduction using an electron donor, such as, for example, without limitation, elemental sulfur, zerovalent iron, carbon, methanol, and/or alcohol, and offers other substantial and significant advances over conventional, sulfur and carbonate-based, autotrophic, perchlorate reduction systems.

Embodiments of the invention provide a robust, reliable and inexpensive biological process for treatment of perchlorate contaminated water, using $S^o$ as an electron donor with SUPeRB cultures.

Further embodiments of the invention provide for, inter alia, a bioreactor unit, a novel treatment media, autotrophic bacteria seeded to the media, and related components to comprise a treatment system and operational method for also reducing nitrogen in waste water. A preferred embodiment of the treatment media employs an electron donor, such as elemental sulfur, for example, and a buffering material having a high content calcium carbonate material such as mollusk shells or crushed coral material, for example. According to one embodiment, the media can be seeded by at least one of the species *Thiobacillus denitrificans* and *Thiomicrospira denitrificans*, in order to provide denitrification.

The invention can also offer substantial and significant advances over conventional sulfur and carbonate-based autotrophic denitrification system, including by achieving greater nitrogen reductions, maintaining higher alkalinity, producing less nitrite and requiring less backwashing. Tank bioreactors greater than 10 liters in volume, according to preferred embodiments of the invention, with elemental sulfur as the electron donor, have shown in operational evaluations that the denitrification process is robust and can provide an effluent that meets drinking water standards with nitrate-nitrogen less than 10 mg/L and sulfate less than 250 mg/L. In a preferred embodiment of the invention, a denitrifying bioreactor can be incorporated in a wastewater treatment system that further comprises a pretreatment tank and, optionally, a septic system.

In the discussion that follows, where reference may be made to a bioreactor, media and/or various related processes, it is to be understood that these systems, methods, designs and processes apply equivalently for perchlorate-reduction as for denitrification within the scope of the invention.

Turning now to the drawings, FIG. 1 depicts basic details of an embodiment of an autotrophic denitrifying and/or perchlorate-reducing bioreactor unit 5 according to the present invention. The bioreactor 5 can include a tank 10 having an interior cavity volume greater than 10 liters, fitted with cover 12, influent line 6 and effluent line 8. A media volume 3 interior to the tank comprises at least one layer of sulfur 20 and at least one layer of mollusk-shell buffer material 22. In FIG. 1 are shown three layers each of sulfur and buffer material, but it will be appreciated that any number of layers may be employed consistent with the invention. Preferably, the media volume may be packed above a base layer of gravel 13. The influent pipe 6 has at least one influent pipe opening 9, which may be a hole or a slit cut into or otherwise installed in the influent pipe 6. The influent pipe 6 can enter the tank 10 through an inflow opening 7, which optionally can include a flow regulator. The effluent pipe 8 has at least one opening 11, which may be a hole or a slit cut into or otherwise installed in the effluent pipe 8. The effluent pipe 8 can attach to the tank 10 at an effluent opening 7, which, optionally, can include a flow regulator. Wastewater 2, optionally pretreated and flowing from the pretreatment unit 74, can enter through the inflow pipe 6 at flow regulated opening 7 and pass through the packed bed layers of sulfur and buffer to form treated water. The treated water can enter the effluent pipe 8 through opening(s) 11, and exit the bioreactor via flow-regulated opening 17, said water now being characterized as effluent, or outlet water 16. In a preferred embodiment, tank 10 can be rectangular and, in a further embodiment, the tank 10 can be polyethylene. The influent pipe 6 and effluent pipe 8 are preferably greater than 1.5 inches in diameter.

Referring again to FIG. 1, in the buffering media 3 of the invention, the sulfur layer(s) 20 can be provided as solid granules or pellets at least 2 mm in diameter, preferably in the range of 4-8 mm and the volumetric ratio of sulfur to buffer material 22 is preferably three to one.

Figure 2:
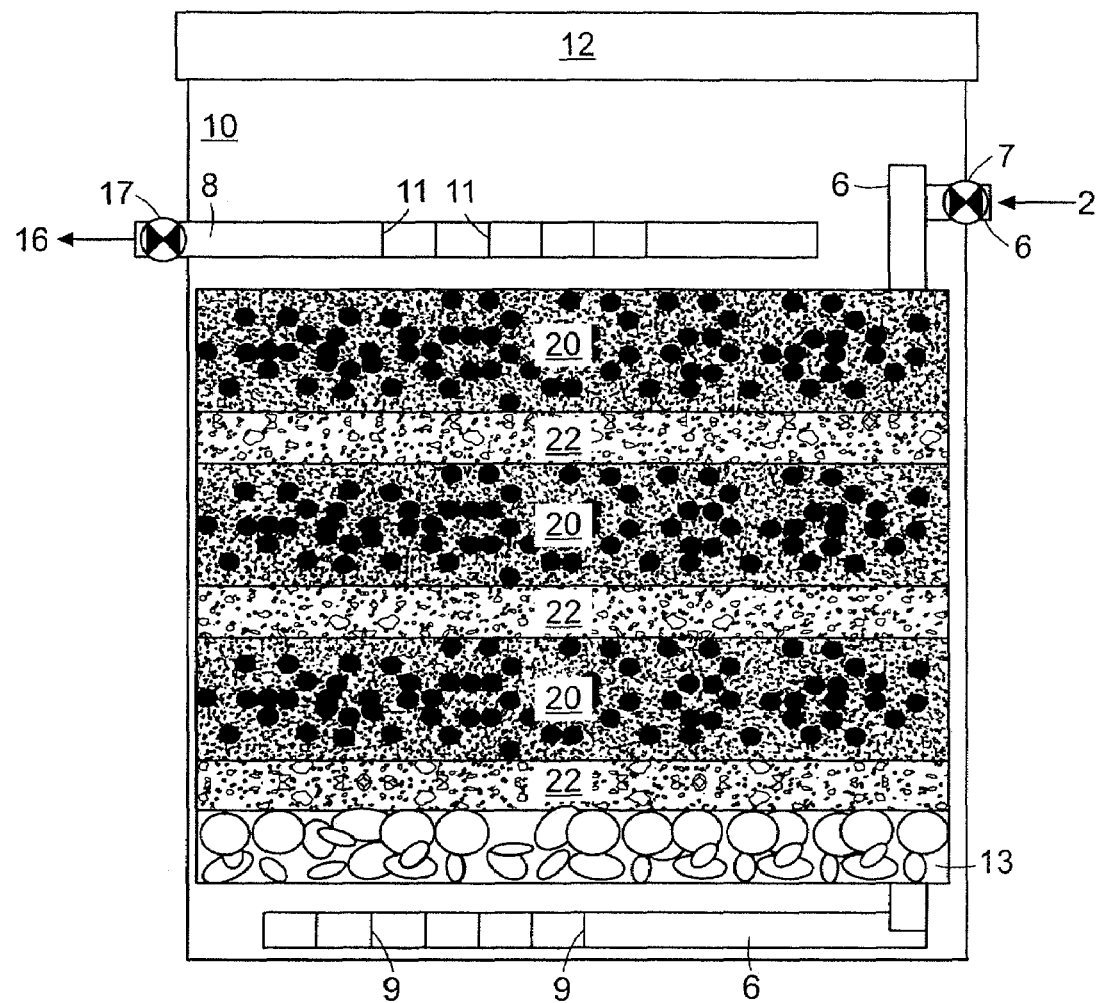
FIG. 2 illustrates an upflow bioreactor containing the layered media of the present invention.
Figure 3:
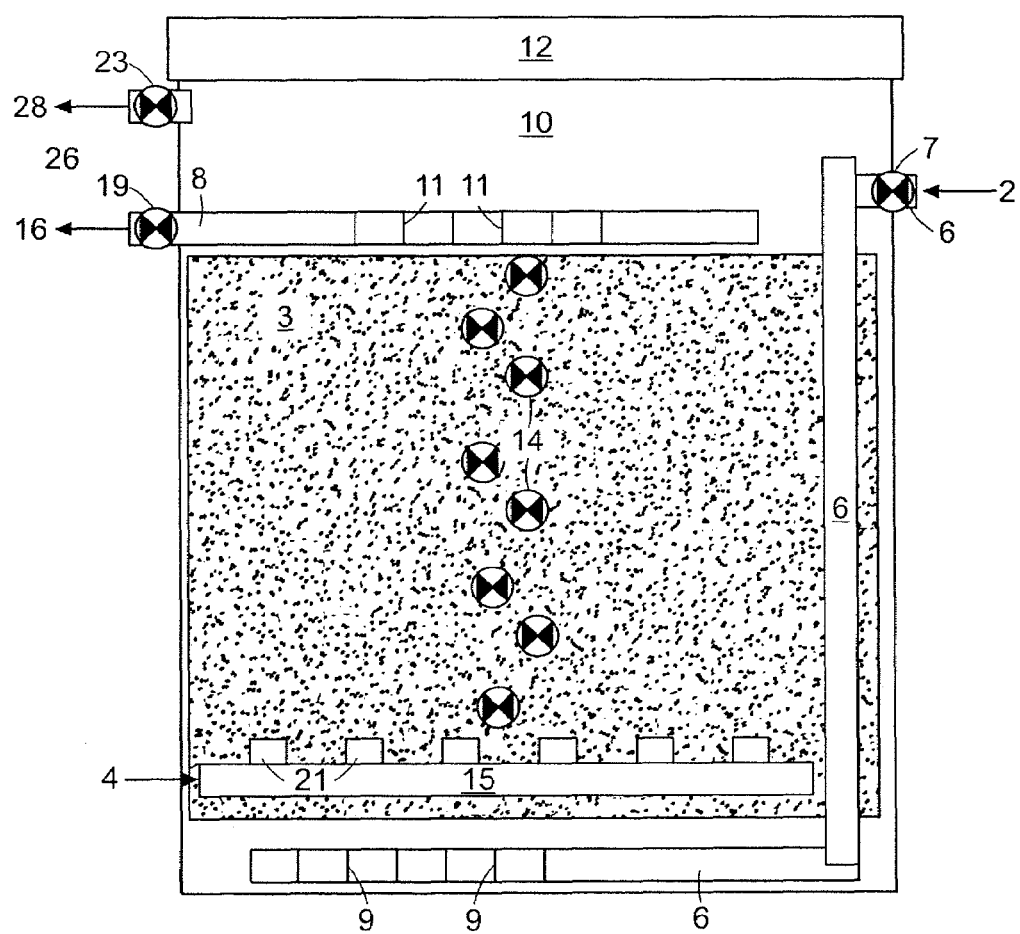
FIG. 3 depicts an upflow bioreactor with a backwash system and sample ports.

As depicted in FIG. 2 and FIG. 3, the preferred method of the invention uses an "upflow" bioreactor, where the influent pipe 6 enters the bioreactor 10 through tank opening and regulator 7 and then influent pipe 6 continues vertically downward through the media 3 and then horizontally beneath media 3, optionally within or below the gravel bed 13, such that influent is fed through the influent openings 9 to the packed bed of sulfur and buffer material from the bottom and the effluent is drawn out from the bioreactor through openings 11 in the effluent pipe 8 located above the media 3 and exiting the bioreactor through outflow opening and regulator 17.

As illustrated in FIG. 2, according to one preferred embodiment of the invention, the media comprises at least two or more layers, wherein at least one layer is sulfur 20 and at least one layer is buffer 22. There is no limit as to the number of layers that can be used. One embodiment can use nine alternating layers of elemental sulfur granules and crushed oyster shells. In other embodiments, the media may be mixed.

Preferably the rate of influent and effluent flow is at least greater than 0.2 L/hr and/or is according to NSF 40 protocols, and will otherwise be determined by system design (including, inter alia, flow geometry, gravity feed, constriction and/or resistance in the pipes or internal architecture) and/or by flow regulators (including, inter alia, faucets, valves, adjustable constrictions, or gates, that can be mechanically and/or electronically controlled. The internal volume of the bioreactor 5 is greater than 10 liters to provide the desirable rates of processing.

Flow regulators, when present, can be connected to the pretreatment unit inlet or outlet openings, bioreactor inlet or outlet openings (such as is shown by regulators 7,17, respectively, in FIG. 2), inlet and outlet pipes, and/or to pumps, and can be automated. Flow sensors, sampling sensors, sensor ports can be provided to assist monitoring of bioreactor performance. An electric control interface and one or more computers can be coupled with the sensors, flow regulators and other mechanical components to assist controlling the performance of the bioreactor.

Referring still to FIG. 2, the preferred method of contact of the wastewater influent source 2 with microorganisms inside the bioreactor tank 10 is by flowing the wastewater through at least one opening 9 in the last section of the inflow pipe 6 located beneath the lowermost layer of the media 3. Said opening(s) 9 can be circular of variable dimension. In the preferred embodiment, as best seen in FIG. 2, the openings 9 are narrow slits cut into the upper radial half of the last segment of the inflow pipe 6.

The invention will be further understood by specific reference to preferred and alternative embodiments presented below as specific examples of implementation, including an operational assessment of performance. Field-scale unit operational assessment is important in order to demonstrate that a technology, before offering as having commercial viability in the onsite wastewater treatment systems market, is robust, passive, and efficient. The influent into the bioreactor undergoes fluctuations in nitrate concentration, DO, temperature, pH, alkalinity, salinity, BOD, and COD, for example. Any commercial system is preferably able to handle such fluctuations and consistently perform to reduce nitrate levels and/or perchlorate levels below drinking water regulations (10 mg/L as nitrate-nitrogen and, in Massachusetts, 2 ppb for perchlorate). Bench-scale tests are of some use to understand aspects of the process and underlying chemistry and microbiology; however, field-scale operational assessment is important for building confidence that a commercial unit installed is able to perform to satisfaction without routine monitoring and maintenance. Again, as stated above, performance evaluations disclosed herein for denitrification are to be understood as disclosing parallel system and method design for equivalent aspects of perchlorate reduction, particularly as to bioreactor design, media electron donor and alkalinity buffering material, flow connectivity, backwashing. It will be appreciated that some differences between system design and methods for denitrification and perchlorate reduction are found in the area of pretreatment, post-treatment, EBCT, bioreactor recirculation and microbial species in the sludge inoculum, as is disclosed below in more specific discussion of perchlorate reduction performance evaluations.

In one prototypical, field-scale implementation of an embodiment of the invention, two structurally identical systems were assembled and placed on an operational site. As shown in FIG. 2, each bioreactor unit 5 includes one rectangular, polyethylene tank 10 with internal volume approximately 190 liters, fitted with a covering lid 12, designed with spin-weld fittings to ease installation and minimize the possibility of leakage. The dimensions of the tank 10 are 24"×18"×30" tall. Influent line 6 and effluent line 8 are constructed from 2" PVC pipe. In this preferred embodiment, as shown in FIG. 2, the tank 10 is fitted with an influent pipe 6 that can feed directly from a pretreatment unit 74 and which pipe 6 is composed of three segments: a first horizontal segment enters the bioreactor tank body above the media, connecting a vertical second segment which descends through the bedded media to the bottom of the tank where it connects the horizontal third segment which projects across the tank 10 under the lowermost layer of the media 3. One or more inflow openings 9 are located in the inflow pipe 6 to enable the influent pretreated wastewater 2 to flow from the pipe 6 into the media 3.

Also, in the same preferred embodiment, for which FIG. 3 now illustrates additional features, the bioreactor tank 10 is fitted with a plurality of sample ports 14, placed at 1" increments along the height of the bioreactor 10 in order to enable the progress of the reactions within the bioreactor tank 10 to be closely monitored.

In the bioreactor tank 10, a media volume 3 extends a distance of 50 cm from the bioreactor base 18. Media volume 3 is packed with one or more layers of sulfur pellets or granules 20 and one or more layers of buffer material 22. In the preferred embodiments of this example, the buffer material in both of the bioreactor tanks at the start of the operational assessment is crushed marble chips, provided at a volume ratio of 3:1, sulfur to marble chips. The granular elemental sulfur is industrial grade, rubber-makers sulfur, 99% pure, manufactured by Georgia Gulf Sulfur Corp. (Valdosta, Ga.). At a subsequent time in the operational assessment, as will be described below, the buffer material in bioreactor #2 is replaced by crushed mollusk shells.

During the operational assessment of a preferred embodiment, two bioreactors 10 as shown in FIG. 3 are loaded with media and then seeded with sludge from a municipal source. The sludge, containing bacteria, is added in liquid fashion to the bed of the reactor. In the start of this performance assessment, the media volume was of both bioreactors packed with layers of sulfur granule and marble chips. Table 1 lists the field-scale bioreactor operational conditions.

TABLE 1

Larger-scale tank bioreactors operational conditions

| Day | Date | Modification |
|---|---|---|
| 0 | Mar. 15, 2004 | Start of bioreactors. Media volume packed with layers of sulfur and limestone (marble chips). Tanks seeded. |
| 133 | Jul. 26, 2004 | Backwash |
| 247 | Dec. 04, 2004 | Change of alkalinity source in bioreactor # 2. Crushed oyster shells were substituted for previous marble chips. |

The reactor is fed with nitrified wastewater from a wastewater source 2 through a recirculating sand filter at the operational site. The bioreactors 10 are operated under transient flow conditions specified in the National Sanitation Foundation (NSF 40) protocol. During the operational evaluation described here, flow was not constant, but rather varied during a 24-hour cycle, with average percentage flow being separable into time periods: 40% of the total flow rate occurred during 17:00-20:00 hours, 35% during 06:00-09:00 hrs, and 25% of the flow occurred during 11:00-14:00 hrs. It will be appreciated that in the case of treatment to reduce perchlorate the reactor is fed with wastewater containing perchlorate.

Composite samples of influent 2 to the bioreactors and effluent 16 from the bioreactors were collected twice each week and analyzed for numerous chemical properties. Time-series profiles of acidity (pH), nitrate ($NO_3^-$), total alkalinity (TALK), sulfate ($SO_4^{2-}$), nitrite ($NO_2^-$), chemical oxygen demand (COD), biochemical oxygen demand (BOD), and Total Kjeldahl Nitrogen (TKN) are provided in FIGS. 4-11.

For the purposes of evaluating operations, beginning at day 247, a change was made in bioreactor #2 from one preferred embodiment to a second preferred embodiment of the invention: the media volume 3 of bioreactor #2 was emptied and refilled with a fresh supply of sulfur pellets 20 and now crushed oyster shells were substituted for marble chips as the solid-phase buffer layers 22, again at the ratio of 3:1 sulfur to buffer, by volume. Bioreactor #2 was again seeded with sludge. Bioreactor # 1 continued to operate with the same marble chips as alkalinity source.

Figure 4:
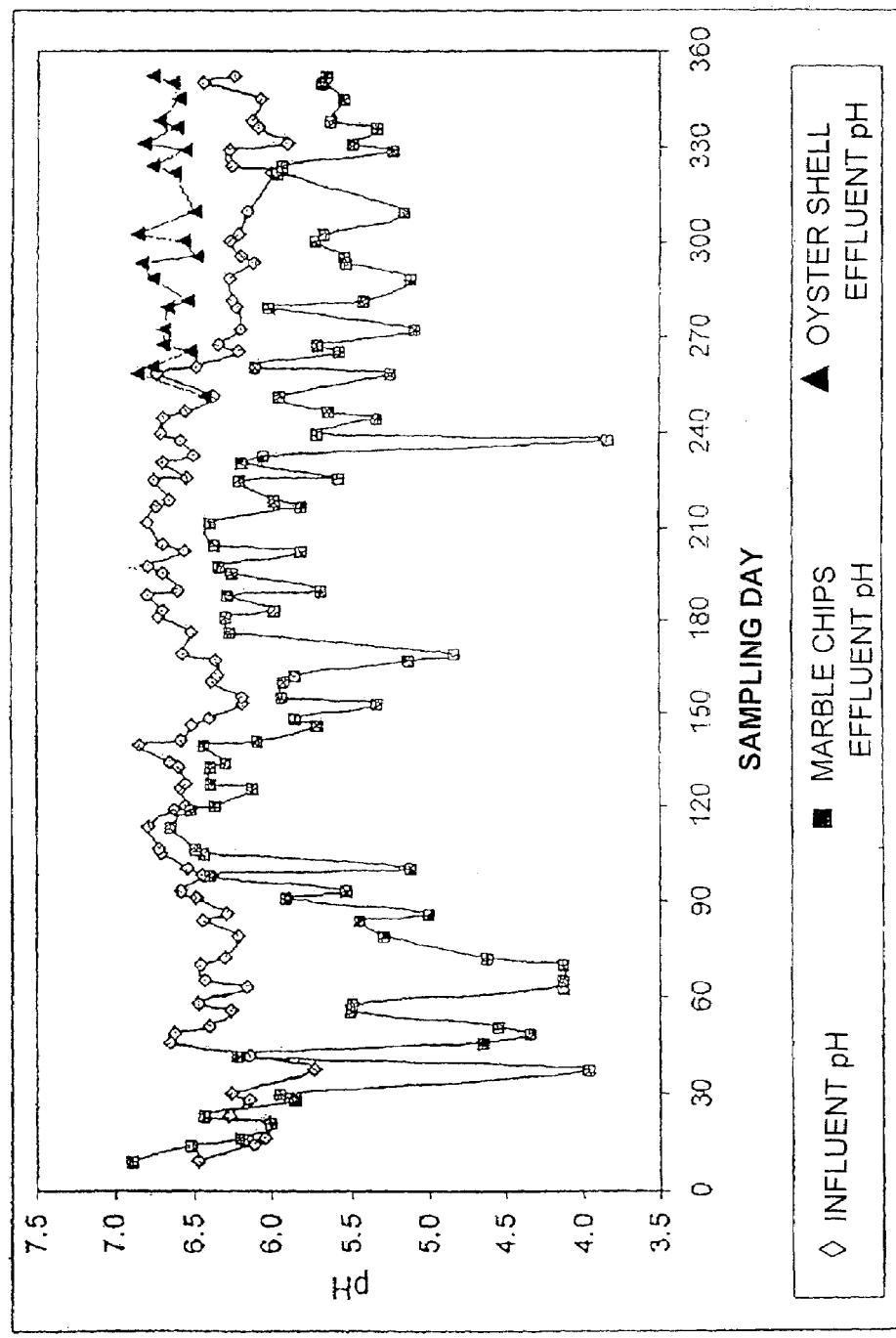
FIG. 4 shows influent pH and effluent pH in the tank bioreactor using limestone (marble-chip) and oyster-shell buffering material.

As shown in FIG. 4, the pH of the composite sample from the two bioreactor(s) employing marble chip buffer material prior to day 247 fluctuated between 3.8 and 6.9, with an average effluent pH of 5.7. The effluent from reactor #2 after switching to oyster-shell buffering at day 247 fluctuated between 6.4 and 6.9 and maintained a ten-fold higher pH (less acidic) at an average of 6.7.

Figure 5:
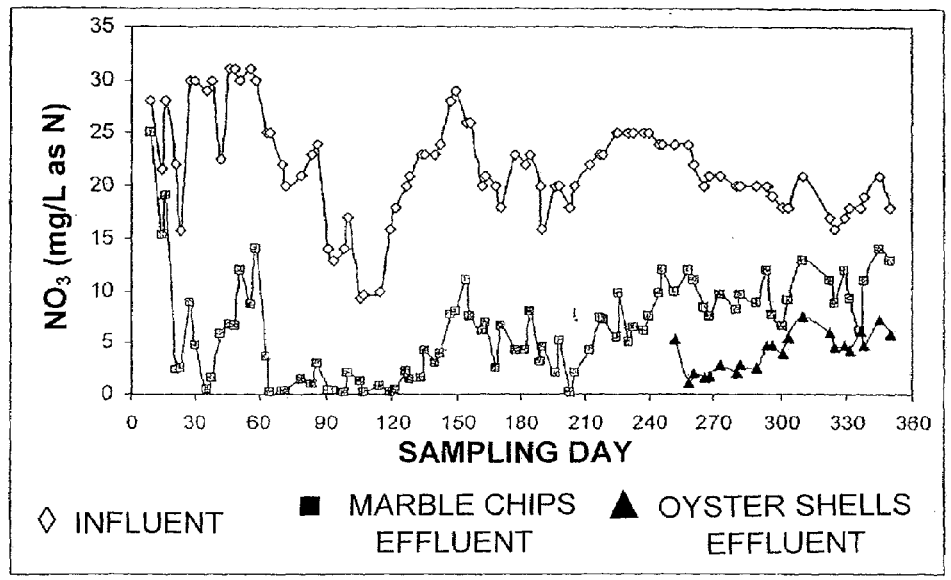
FIG. 5 shows the nitrate reductions in a tank bioreactor using limestone/marble-chip and oyster shell.

The nitrogen removal averaged 80%, with $NO_3^-$—N concentration consistently below 10 mg/L. As can be seen in FIG. 5, from day 247 forward, the analysis of samples from bioreactor #2 using oyster shell as alkalinity source shows a higher degree of nitrogen removal (average of 80%) than bioreactor #1 using marble chips as buffer (average of 70%). Bioreactor #2 produced effluent $NO_3^-$—N concentrations consistently below 8 mg/L, with the average effluent concentration being 4.2 $NO_3^-$—N.

Fifteen days after the installation of the tank bioreactors employing the marble chip buffer material, the effluent $NO_3^-$—N concentration was consistently below 15 mg/L, with the effluent concentration steadily increasing over the period following. Reactor #2, after switching to oyster-shell buffering at day 247, maintained a nitrate concentration in effluent about 50% that of reactor #1.

Figure 6:
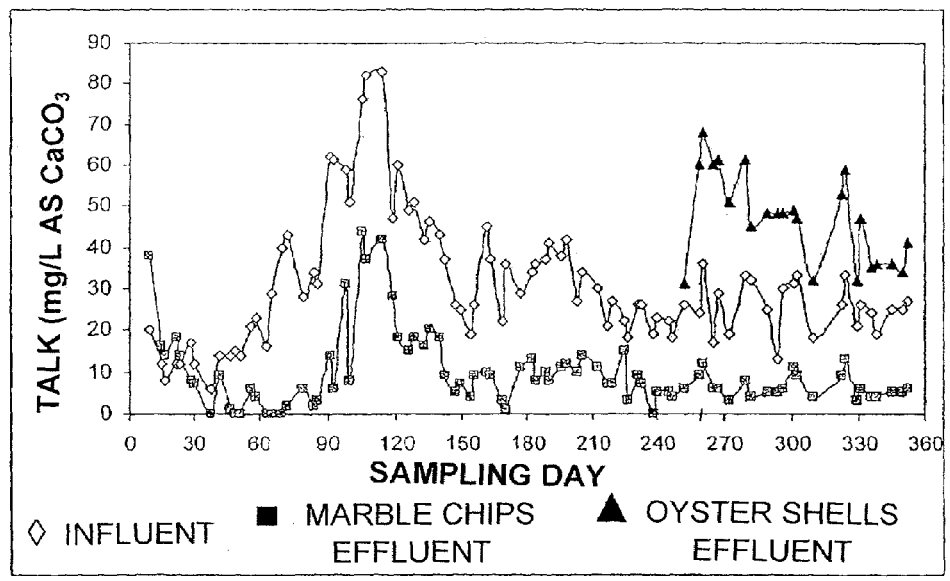
FIG. 6 shows the alkalinity maintained in a tank bioreactor using limestone/marble-chip and oyster shell.

The marble chips in the bioreactor provided enough alkalinity to prevent shutdown of denitrification. In reactor #2 after switching to oyster shells, alkalinity was maintained at levels approximately six-fold to ten-fold higher than by the buffering of marble chips. As seen in FIG. 6, the average influent TALK was 26 mg/L as $CaCO_3$, while the average effluent TALK for bioreactor #2 with oyster shell was 47 mg/L as $CaCO_3$, considerably higher than the TALK for the marble chip buffered effluent, which averaged 9.6 mg/L.

Figure 7:
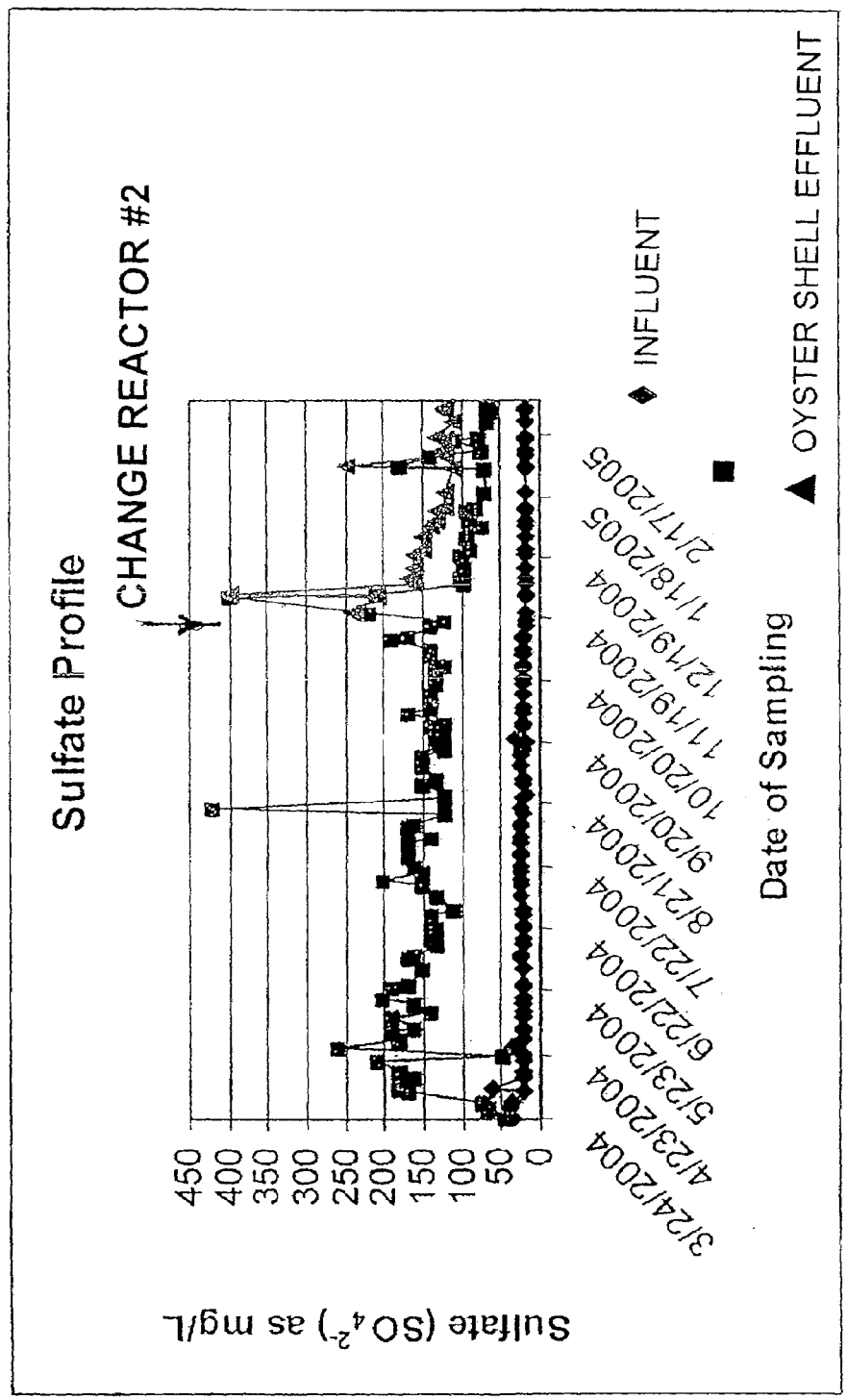
FIG. 7 shows the sulfate produced in a tank bioreactor using limestone/marble-chip and oyster shell.

FIG. 7 shows that the rate of sulfate production remained under 200 mg/L for the marble-chip buffering process, and that switching to oyster chips in bioreactor #2 produced higher levels initially, but these also stabilized below 200 mg/L. The biological oxygen demand after 5 days ($BOD_5$ standard) concentration in the marble-chip effluent (8 mg/L) was 53% greater than at the influent (5 mg/L). The $BOD_5$ concentration in the reactor #2 effluent (7 mg/L) was 36% greater than in the influent (5 mg/L), shown in FIG. 10.

Figure 12:
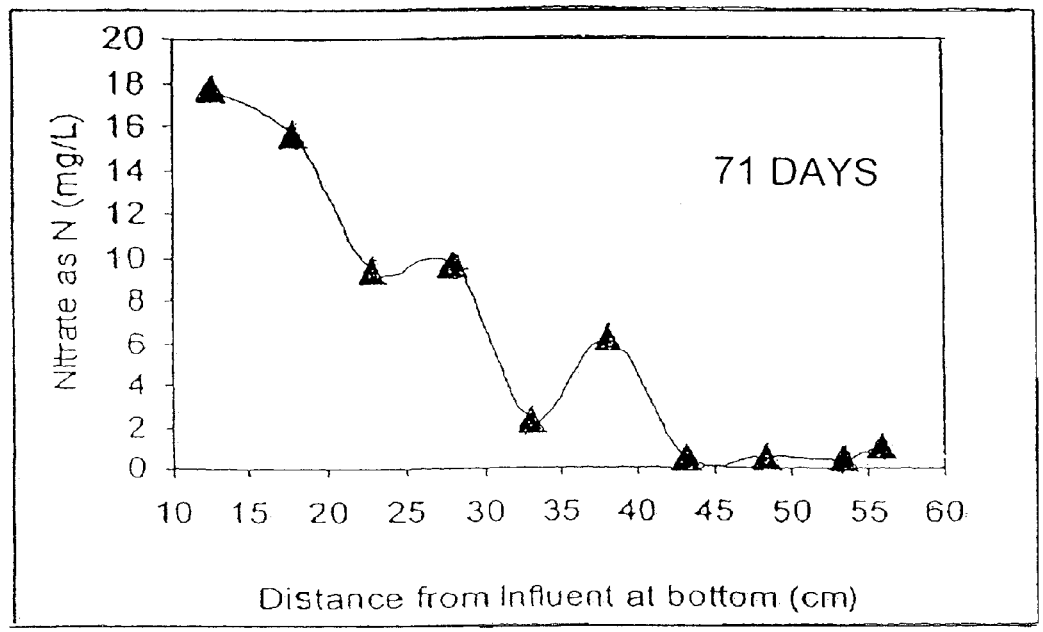
FIGS. 12A, 12B and 12C illustrate the nitrate concentration by depth in the tank bioreactor #1 after 71 days, 94 days and 133 days, respectively.
Figure 12:
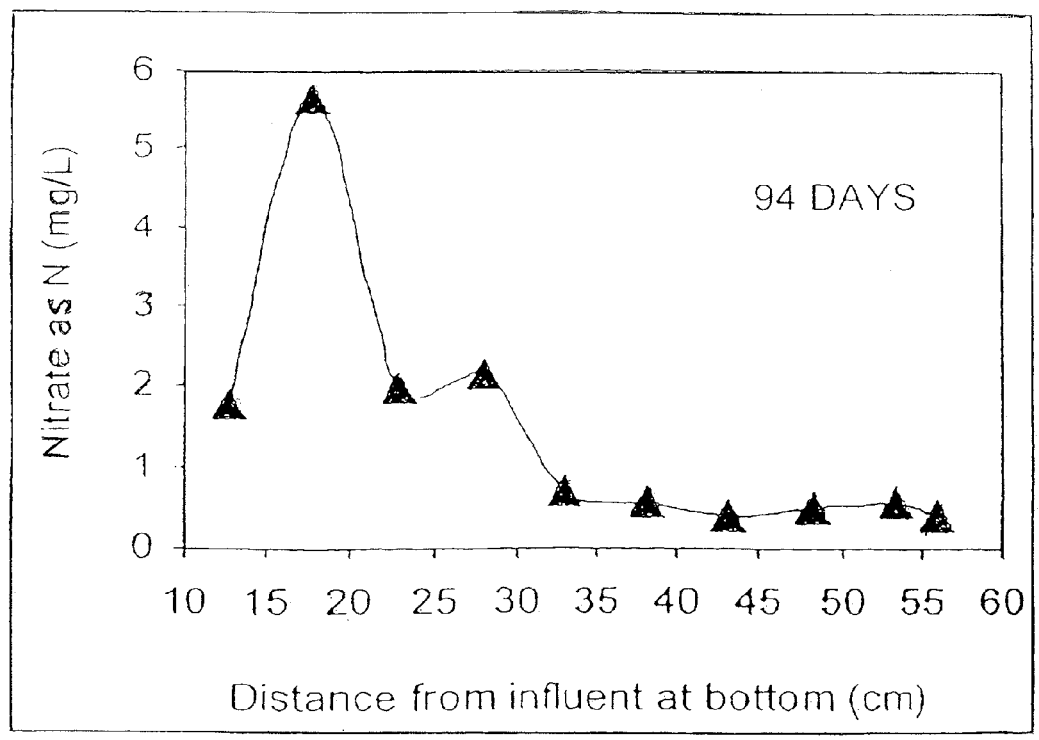
Figure 12:
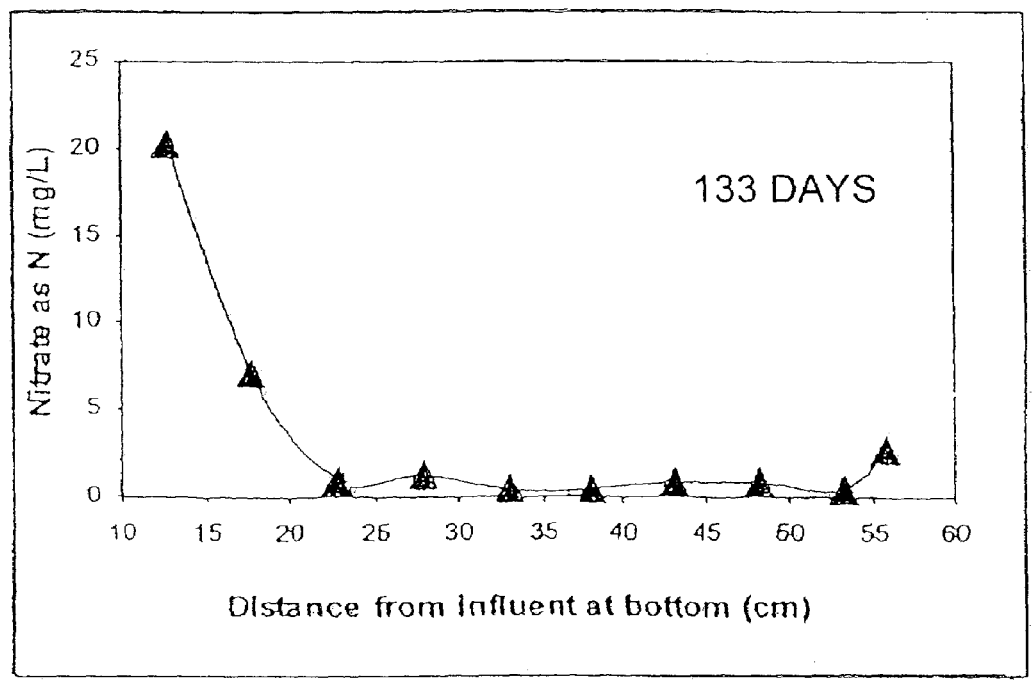
Figure 13:
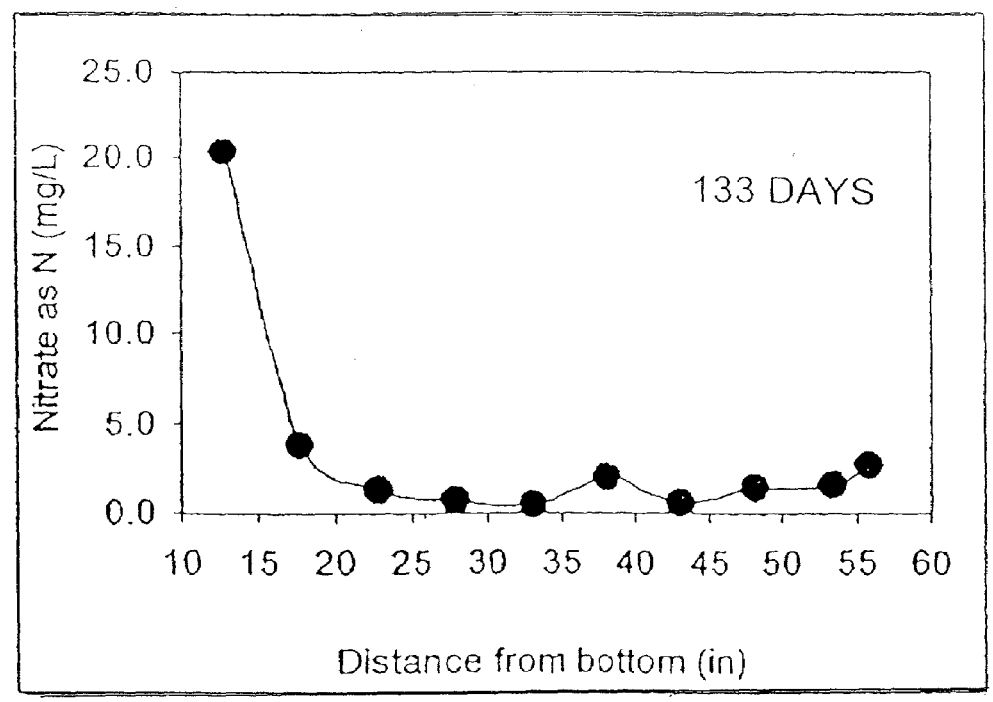
FIGS. 13A, 13B and 13C illustrate the nitrate concentration by depth in the tank bioreactor #2 after 71 days, 94 days and 133 days, respectively.
Figure 13:
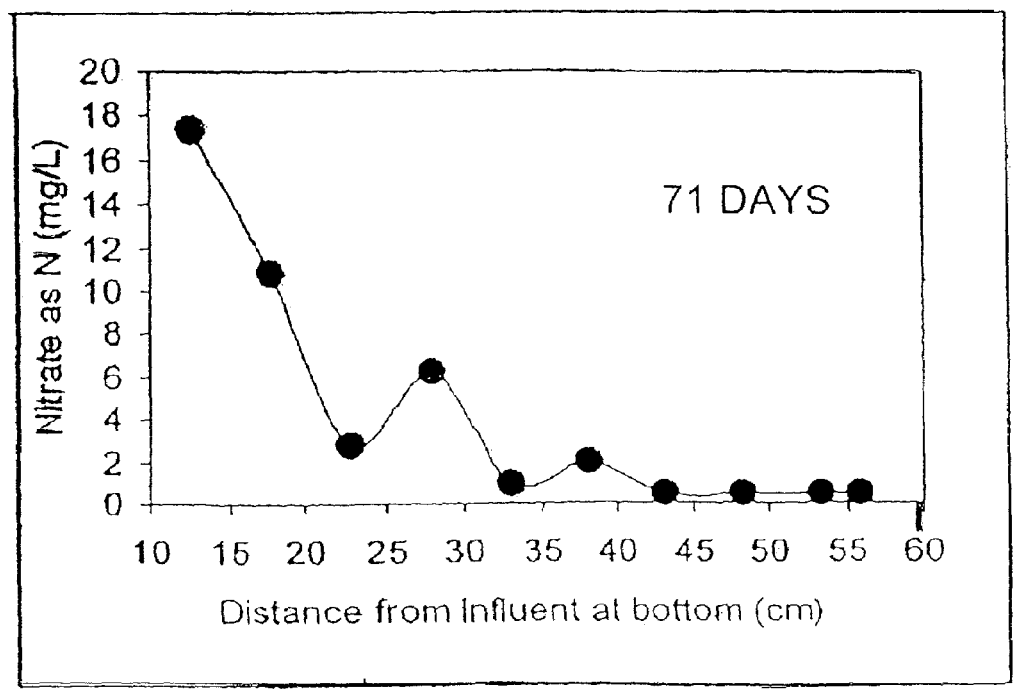
Figure 13:
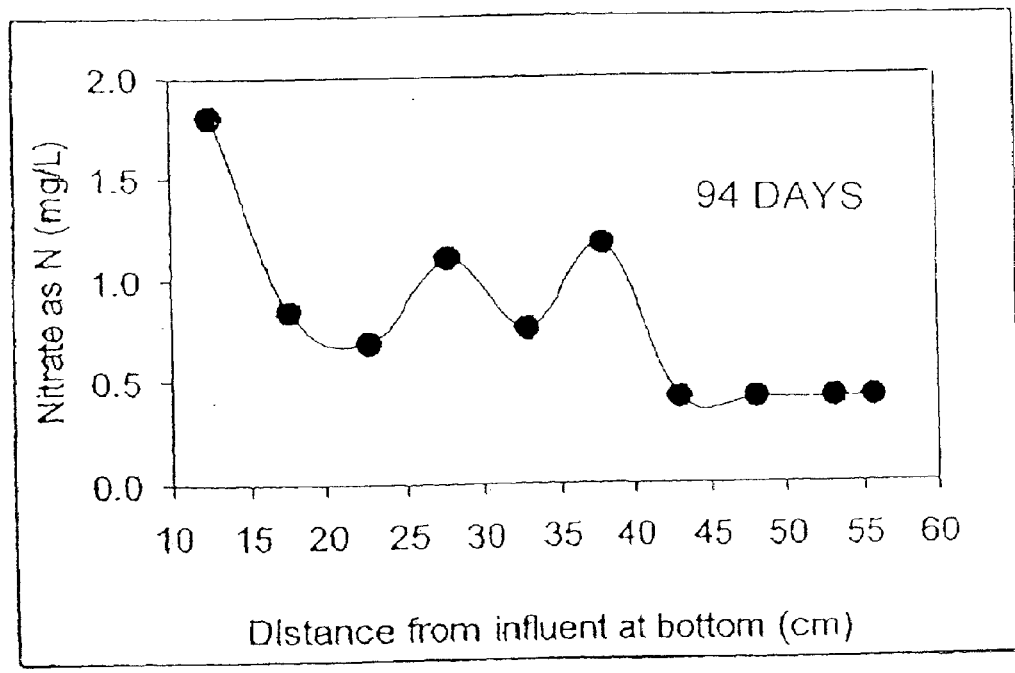

The profiles of nitrate concentration versus depth obtained for both denitrification field-scale bioreactors are presented in FIG. 12 and FIG. 13. Employing marble-chip buffering, both field bioreactors consistently showed a decrease in nitrate concentration as the water traveled from the bottom of the reactor (influent) to the top (effluent). The empty-bed contact time (EBCT) refers to the time an average water molecule will spend in the reactor if the bed were empty. From FIGS. 12 and 13 it can be seen that the EBCT needed for the treated water to be satisfactorily denitrified (which is proportional to the vertical distance the water needs to rise) was shorter after operating 133 days than after being operated for only 71 days. Also, FIGS. 12 and 13 show the water was denitrified to low nitrate concentrations (below 10 mg/l as N) when water reached 36% (20 cm) of the total length of the bioreactor (34 cm).

In the embodiment of this example, a backwashing system was included in the bioreactor system. Backwashing is an optional operation according to the invention, the purpose of which is to dislodge excess micro-organisms and other suspended solids that can physically and chemically impede the active circulation and biochemical reactions between the wastewater and the denitrifying media and bacteria. Referring again to FIG. 3, the backwashing method consists of supplying backwash source water 4 to the backwash inlet pipe 15 fitted with at least one backwash inflow port/nozzle 21, periodically activating a backwash pumping means to pump the backwash water through inlet pipe 15 and port/nozzle(s) 21 into the media 3. After the backwash water has contacted and washed the media it passes into a backwash effluent pipe 23, by which it is directed through the backwash outflow opening and regulator 26 in the wall of the bioreactor 10, thus leaving the system as backwash effluent 28.

The backwash flow direction may be in a direction opposite to the direction of primary flow during treatment or in the same direction, or alternating. The pressure, flow rate and direction are determined to create optimal dislodging of sludge, and will vary depending on the media granularity, number of layers, periods between backwashing, sludge burden/density, and other factors. The backwashing frequency used in the preferred method is in the range of 120 to 240 days. The preferred backwash flow rate is 3 times the media volume over 15-30 minutes duration of the backwash operation. The backwash pressure is in the range of 60 to 180 PSI, preferably 80-100 PSI.

The number of layers of sulfur and oyster shells, per se, does not affect the optimal backwashing parameters; however, the total height of the sulfur and mollusk-shell layers is a major criterion, because backwashing requires fluidizing the bed. Thus, the higher the total depth of these layers, the heavier the bed is and the higher the backwash velocity required to fluidize the bed. On the other hand, a higher depth of the bioreactor media can mean a longer run-time of the bed before backwash is required. A preferred range of media height, where between these two opposing factors is produced a preferred set of operating conditions, is from 40 cm to 200 cm, although a system works with media heights that are less or greater than this range.

The system required little maintenance over eleven months of operation. The water backwash system was operated 6 months from the start of the denitrification process, and successfully dislodged excess biomass from the reactor. Table 2, below, provides the chemical characteristics for the backwash effluent for each of the bioreactors #1 and #2.

TABLE 2

Characteristics of Backwash Effluent

| Water Quality Parameter | Bioreactor #1 | Bioreactor #2 |
|---|---|---|
| pH | 6.05 | 5.85 |
| Total Alkalinity (mg/L as CaCO3) | 11.0 | 11.0 |

TABLE 2-continued

Characteristics of Backwash Effluent

| Water Quality Parameter | Bioreactor #1 | Bioreactor #2 |
|---|---|---|
| Total Solids (mg/L) | 414.0 | 498.0 |
| Fixed Solids (mg/L) | 260.0 | 318.0 |
| Volatile Solids (mg/L) | 154.0 | 180.0 |
| Total Suspended Solids (mg/L) | 103.52 | 176.38 |
| Fixed Suspended Solids (mg/L) | 14.12 | 54.16 |
| Volatile Suspended Solids (mg/L) | 89.4 | 122.12 |

Maximum denitrification rates were obtained with oyster shell used as alkalinity source and, therefore, crushed oyster shells used as buffer material in a denitrifying bioreactor, according to the preferred embodiment of the invention, produces improved results and advantages over the conventional use of limestone buffering material in SLAD processes and bioreactors. The advantage is related to the ability of the crushed oyster shell to maintain relatively higher pH levels. In the measurements, for example, the denitrification process had the highest removal efficiencies (higher than 80%) at average pH values of above 6.0.

Figure 14:
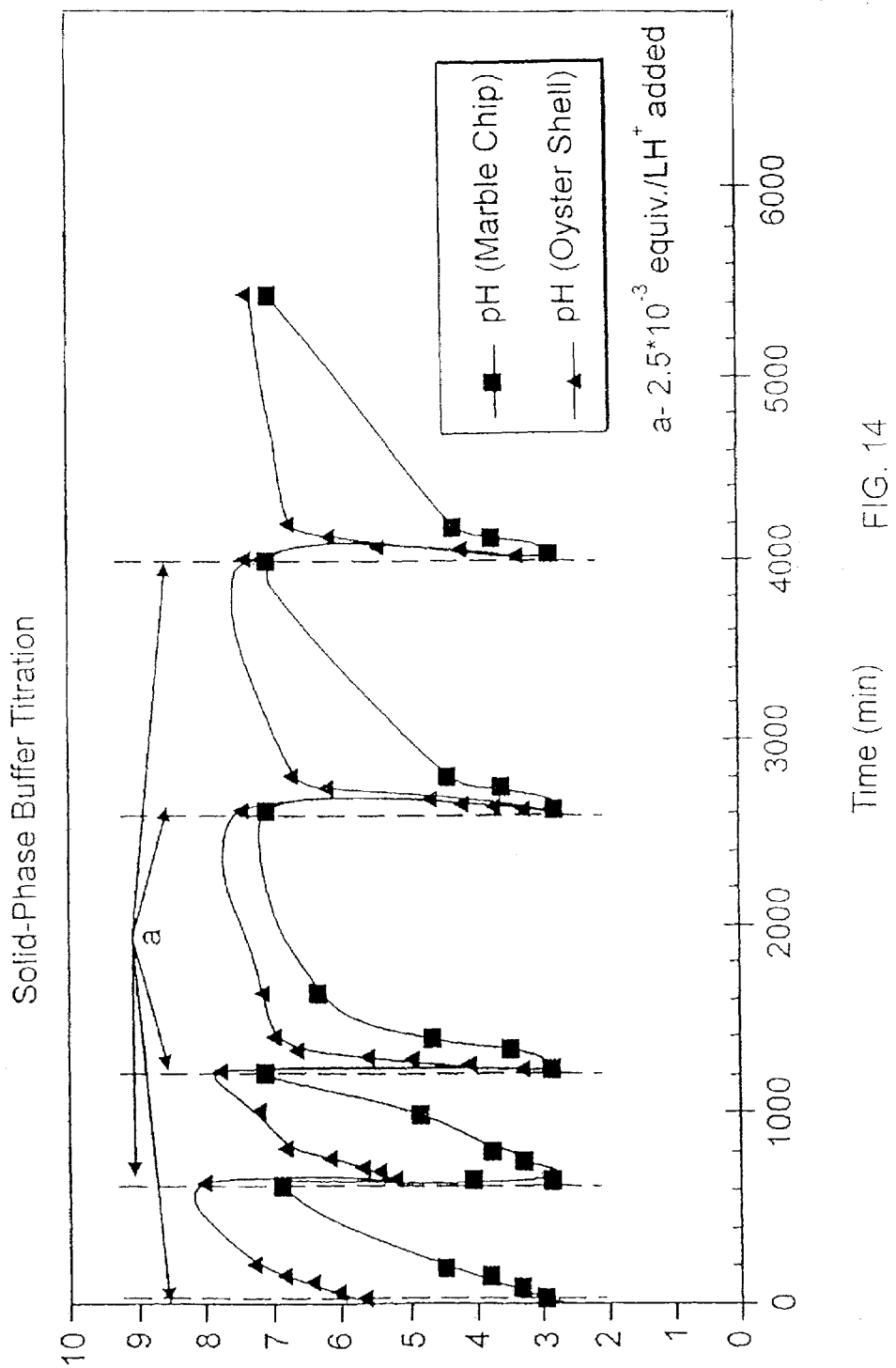
FIG. 14 illustrates the different responses to acid titration in a media comprising marble chips versus oyster shells.

Referring now to FIG. 14, to further measure the advantage of oyster shell relative to marble chip in buffering ability, a straightforward titration assessment was conducted, whereby an acid solution ($2.5 \times 10^{-3}$ equivalents/liter of hydrogen ion [$H^+$]) was added to similar preparations of both buffer materials. A titration curve is shown in FIG. 14 of both solid-phase buffers (marble chips and crushed oyster shells) and it shows that in the initial cycles crushed oyster shells provide higher pH to the aqueous solution and thus higher buffering capacity. In the initial cycles, just after addition of [$H^+$] the slope of the pH recovery curve is steeper in the case of crushed oyster shells, meaning that the rate of dissolution of buffering ion from the surface of the crushed oyster shell is faster than the rate of dissolution from the surface of marble chips. Although the aqueous pH reaches almost the same value in both cases after the $5^{th}$ cycle, the time of contact of the water with the solid-phase buffer after the $5^{th}$ cycle is much longer than the empty bed contact time (EBCT) available (<<6 hours) in a commercial application system. Thus, for this application crushed oyster shells act as a better solid-phase buffer than marble chips.

These enhanced results derive from both structural and chemical differences between the crushed oyster shells on the one hand and the marble chips and crushed limestone on the other. Limestone is a sedimentary rock consisting primarily of calcium carbonate in the mineral calcite. Limestone is generally formed by accumulation of the shells of marine animals, but it may also form by direct chemical precipitation from solution in hot springs or caves and inorganic precipitation in the open ocean. A soft, white, porous form of limestone is chalk. Limestone and chalk may contain varying amounts of silica, quartz, feldspar, and/or other mineral impurities. A metamorphosed limestone infused with magnesium is dolomite. Marble is metamorphosed limestone and/or dolomite, i.e., composed mainly of calcite or magnesium calcite.

Calcite ($CaCO_3$) is a mineral commonly secreted by marine invertebrate animals to form shells or other types of exoskeletons. Aragonite is another mineral with the same chemical formula, but a different crystal structure (i.e., both calcite and aragonite are polymorphs of $CaCO_3$). Aragonite ($CaCO_3$) is an example of an inorganically formed mineral that also has an organically produced, yet otherwise identical, counterpart: the shells of bivalve mollusks are composed to a large extent of organically formed aragonite.

Structurally, oyster shells tend to be quite thin when compared with crushed limestone or crushed marble, thereby offering greater surface area exposed to the aqueous medium to promote more rapid dissolution. The surface of the oyster shell also can provide a surface for the bacterial biofilm (upon seeding prior to the denitrifying process beginning, or afterwards).

Chemically, oyster shells and other molluscan shells or crushed coral material can provide a composite material made up of µm-sized $CaCO_3$ crystals and an organic phase (matrix). Binding, or rather sandwiching, the crystals of aragonite from oyster shells together is an organic scleroprotein called conchiolin. Extracted shell proteins are polyanionic and range in size from relatively small soluble forms to those which are crosslinked and insoluble. The soluble forms are capable of adsorbing to mineral calcite in vitro and in the process changing the growth habit of the mineral and acting as threshold growth inhibitors. The function of these proteins in vivo is not yet fully understood, but they appear to control shell crystal morphology.

Crushed shells of oysters and other mollusks, as well as crushed coral, therefore, mainly contain over 90% calcium carbonate ($CaCO_3$) in the aragonite form, along with shell proteins, can provide a natural source of alkalinity, or buffering material. Further, oyster shells and/or crushed coral is readily obtainable having over 95% calcium carbonate ($CaCO_3$) in the aragonite form. However, although crushed oyster shells are related to crushed marble or limestone, the oyster shells are chemically distinct as well as structurally distinct. These differences produce advantageous results in maintaining the pH environment in the bioreactor and achieving steadily high denitrification rates.

Moreover, crushed oyster shells are a waste product of the shellfish industry, whereas limestone and marble are compounds that are mined and then processed. Therefore, using crushed oyster shells is a more economically advantageous and environmentally favorable approach.

Figure 15:
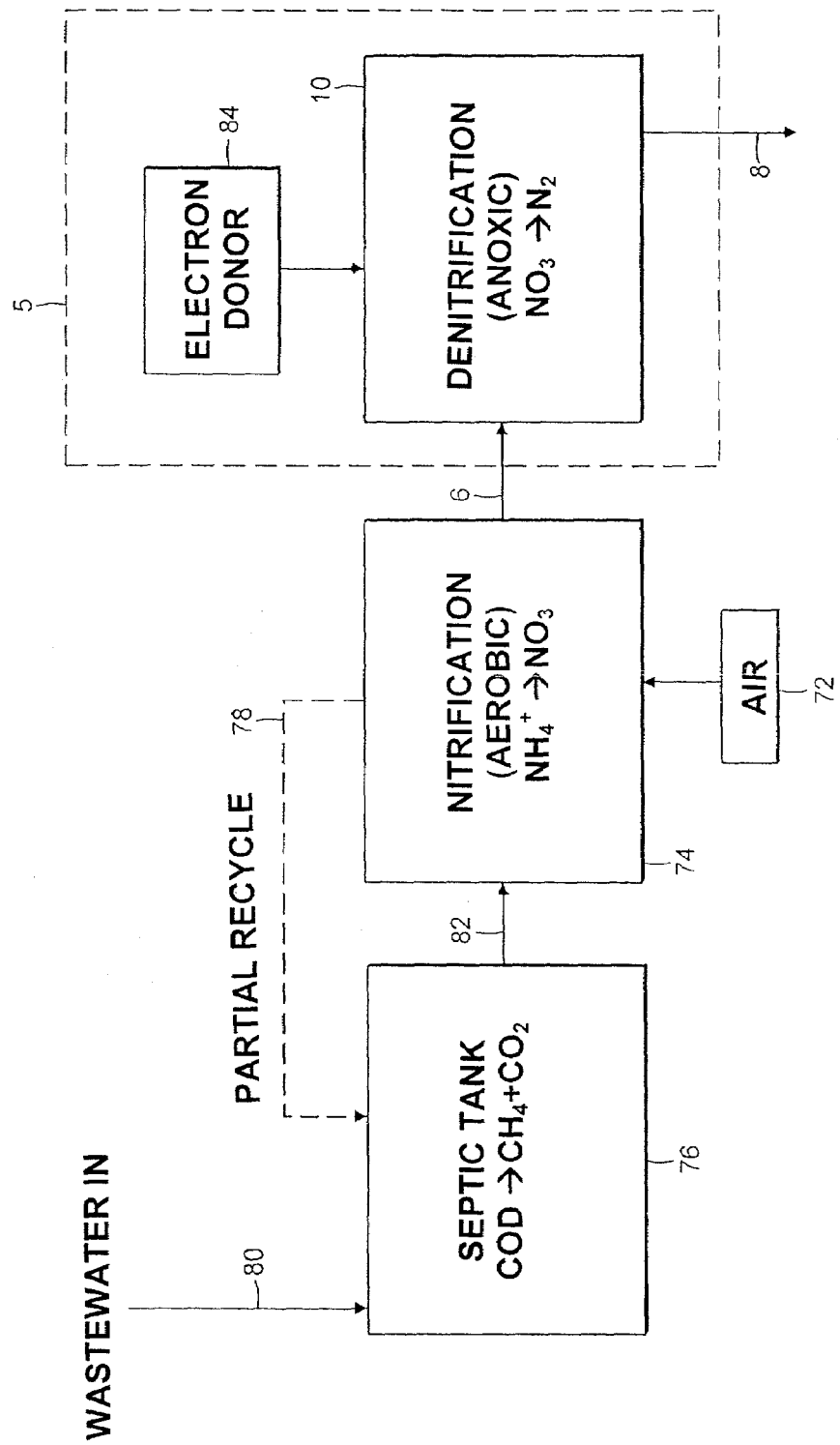
FIG. 15 is a schematic according to an embodiment of the invention depicting the bioreactor coupled with a pretreatment apparatus and process.

As shown in FIG. 15, a preferred embodiment of the invention can include an optional pretreatment tank 74 in which pretreatment source wastewater 82 can be, optionally, first pretreated, such as, for example, filtered and/or chemically treated to remove particulate matter, litter material, organic carbon, or to nitrify, partially denitrify, or otherwise perform a physical, chemical and/or biochemical pretreatment step, prior to passing to pretreatment outflow and denitrification and/or perchlorate-reduction bioreactor influent pipe 6. The optional pretreatment method optionally includes first circulating raw source wastewater 80 through a wastewater holding volume, such as, for example, a catchment, receptacle, holding tank or septic tank 76, before it enters the optional pretreatment tank 74 by way of holding tank or septic tank outflow and pretreatment inflow pipe 82, and then to the bioreactor 10 by way of pretreatment outflow and bioreactor influent pipe 6. Optionally, the pretreatment flow is partially recycled from the pretreatment tank 74 through recirculation pipe 78 to the holding tank or septic tank 76. The range for recirculation rates depend on the type of technology needed in the optional pretreatment stage; for recirculation through sand filters the recirculation rates are typically 3:1 to 5:1.

An operational assessment of field-scale bioreactors was conducted in combination with a pretreatment tank, including assessment of nitrate removal (denitrification) capacity; buffering capacity; sulfate generation capacity; organic matter concentration in the effluent (Biochemical Oxygen Demand and Chemical Oxygen Demand); and Total Kjeldahl Nitrogen (TKN) concentration in the effluent. The assessment occurred during a 16-month period. Flow rates were maintained in the range of approximately 110-230 liters per day per bioreactor.

The optional pretreatment tank (Recirculating Sand Filter, RSF) can ensure pretreatment, such as, for example, total nitrification of the influent. As raw wastewater enters a septic tank, for example, nitrogen is in the form of organic nitrogen or ammonium ($NH_4^+$), which is the reduced form (oxidation number of $-3$). From the septic tank, the wastewater enters the RSF. Here the aerobic nitrifying bacteria in the wastewater oxidize the organic matter (causing a reduction of the BOD) and the nitrogen to nitrate ($NO_3^-$, oxidation number of $+5$). This nitrification process is important to the success of a downstream denitrification step.

The combination of a pretreatment tank with an oyster-shell-buffered bioreactor confers unique advantages in a denitrification system according to a preferred embodiment of the invention. First, as explained above, successful denitrification requires prior successful nitrification, which is achieved by the RSF. Second, and further, important benefits are conferred by a pretreatment tank in combination with an oyster-shell-buffered bioreactor that cannot be obtained from combining a pretreatment step with a standard SLAD system. Pretreatment (achieving nitrification) cannot be effectively combined with a standard SLAD system (achieves denitrification) because the redox environment needed for the former is opposite to that needed for the latter: the nitrification step (pretreatment) requires an oxidizing environment with DO as high as possible, whereas denitrification in a standard SLAD system requires an anoxic environment (zero DO). However, in pretreatment with an oyster-shell-buffered denitrification bioreactor, it is observed that there is no loss of process efficiency if DO is present. This exhibits an important and significant advantage of at least one embodiment of the invention, comprising a pretreatment step combined with an oyster-shell-buffered denitrification bioreactor, over a standard SLAD system.

It will be appreciated and understood by persons skilled in the art that pretreatment in the case of perchlorate reduction is an optional step, where wastewater requiring perchlorate reduction will often come from different wastewater sources than those requiring denitrification; for example, without limitation, wastewater requiring perchlorate reduction can come from surface or groundwater flowing from manufacturing and/or processing facilities, military bases, industrial sites, inter alia, and many of these wastewater sources may require no pretreatment or specialized pretreatment relative to the process for denitrification.

The preferred range of volumes for a field-scale bioreactor according to various embodiments of the invention that would be viable for commercial applications will vary between different applications, for example single-dwelling applications, municipal system applications, storm water treatment applications and permeable reactive barrier applications. In general, the bioreactor tank volume must be greater than 10 liters to be of practical utility. In single-dwelling applications a preferred range for the bioreactor volume is in the range of about 350-600 liters (0.35-0.6 cubic meters), although smaller or larger volumes can be used, and a more preferred volume is about 450 liters. In municipal wastewater treatment system applications, a preferred range of bioreactor tank volume is about 100-200 cubic meters of tankage for every 375 cubic meters per day of waste water flow rate, with a more preferred volume being about 115 cubic meters of tankage for every 375 cubic meters per day of waster water flow rate.

In general, for a mollusk-shell-buffered denitrification and/or perchlorate-reduction system according to many embodiments of the invention, a preferred bioreactor tankage volume for many diverse applications is in the range of 0.3-0.5 cubic meters of tankage per each cubic meter per day of flow rate for the water to be treated. This guideline can be applied to single-dwelling applications, municipal system applications, storm water treatment applications, groundwater and surface water treatment, and permeable reactive barrier applications, inter alia.

In addition to and summarizing advantages presented above, the invention provides greater efficiency and achievement in nitrate and/or perchlorate reduction and performance based on other chemical factors as opposed to conventional technologies. For example, the preferred system achieves autotrophic denitrification using elemental sulfur as electron donor wherein the effluent meets National Sanitation Foundation Standard 40.

Elemental sulfur, which is a by-product of oil processing, is less expensive than ethanol or methanol. The sulfur granules used eliminate the need for expensive feed control systems and the elemental sulfur is easier to store and handle and produces less effluent $SO_4^{2-}$ than thiosulfate. Little or no external carbon source is required, minimizing the possibility of carry-over of excess organic carbon into the effluent.

As shown in FIG. 5, the invention achieves high nitrate removal efficiencies in field-scale implementations. Good denitrification rates were observed for the alternative preferred alkalinity source, i.e., crushed oyster shells.

Figure 8:
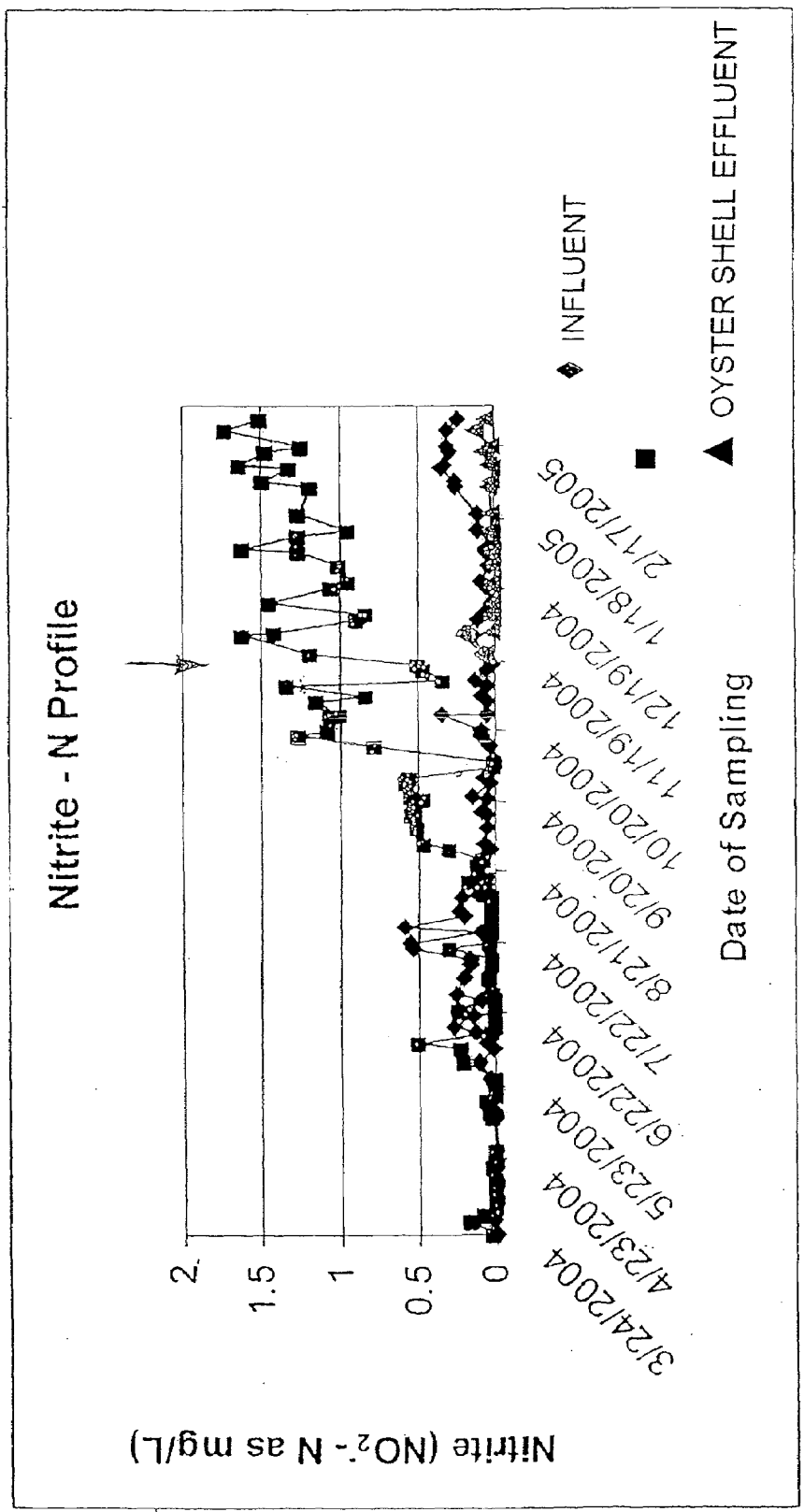
FIG. 8 shows the nitrite concentrations produced in a tank bioreactor using limestone/marble-chip and oyster shell.
Figure 9:
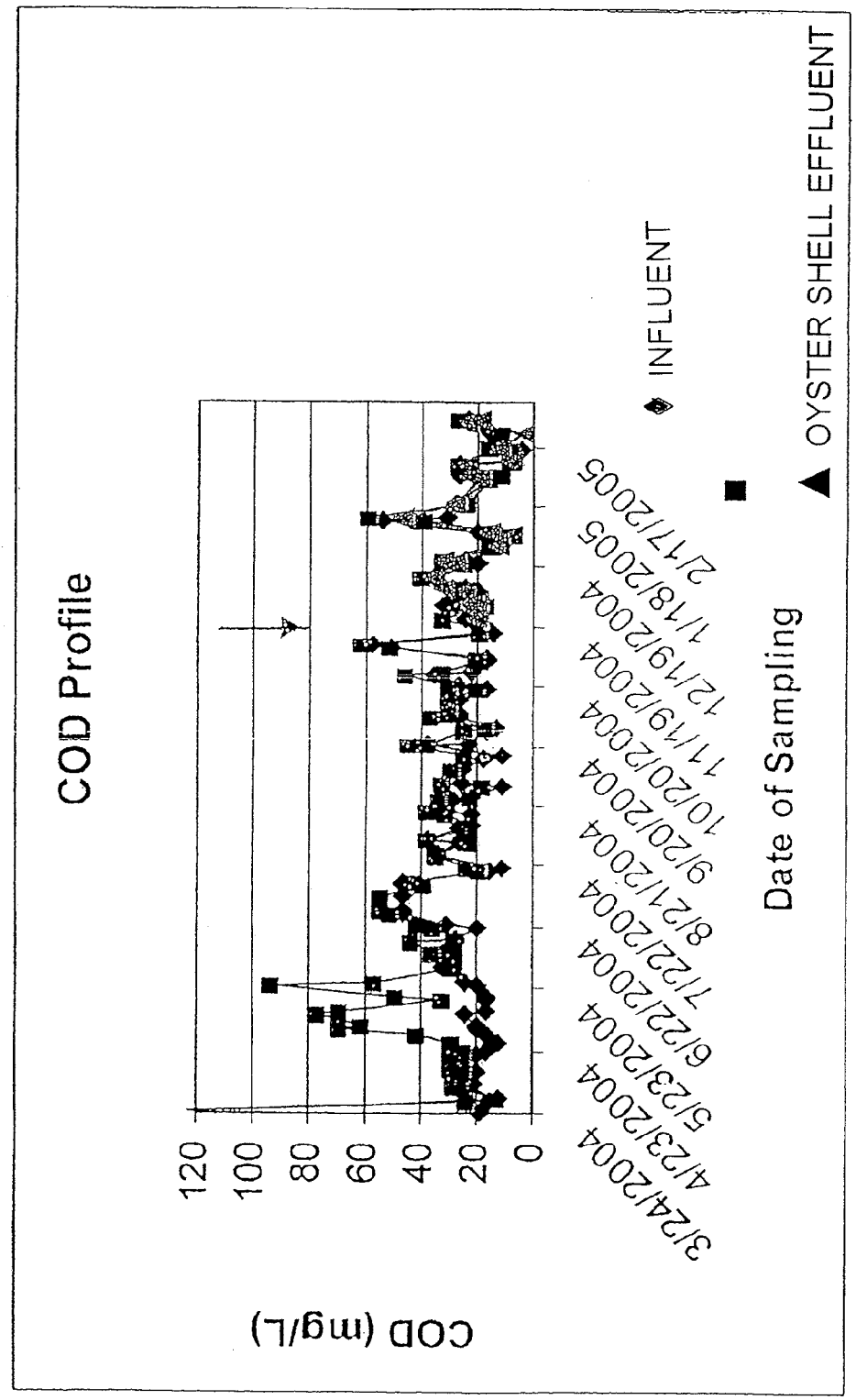
FIG. 9 shows the change in chemical oxygen demand (COD) over time in a tank bioreactor using limestone/marble-chip and oyster shell.
Figure 10:
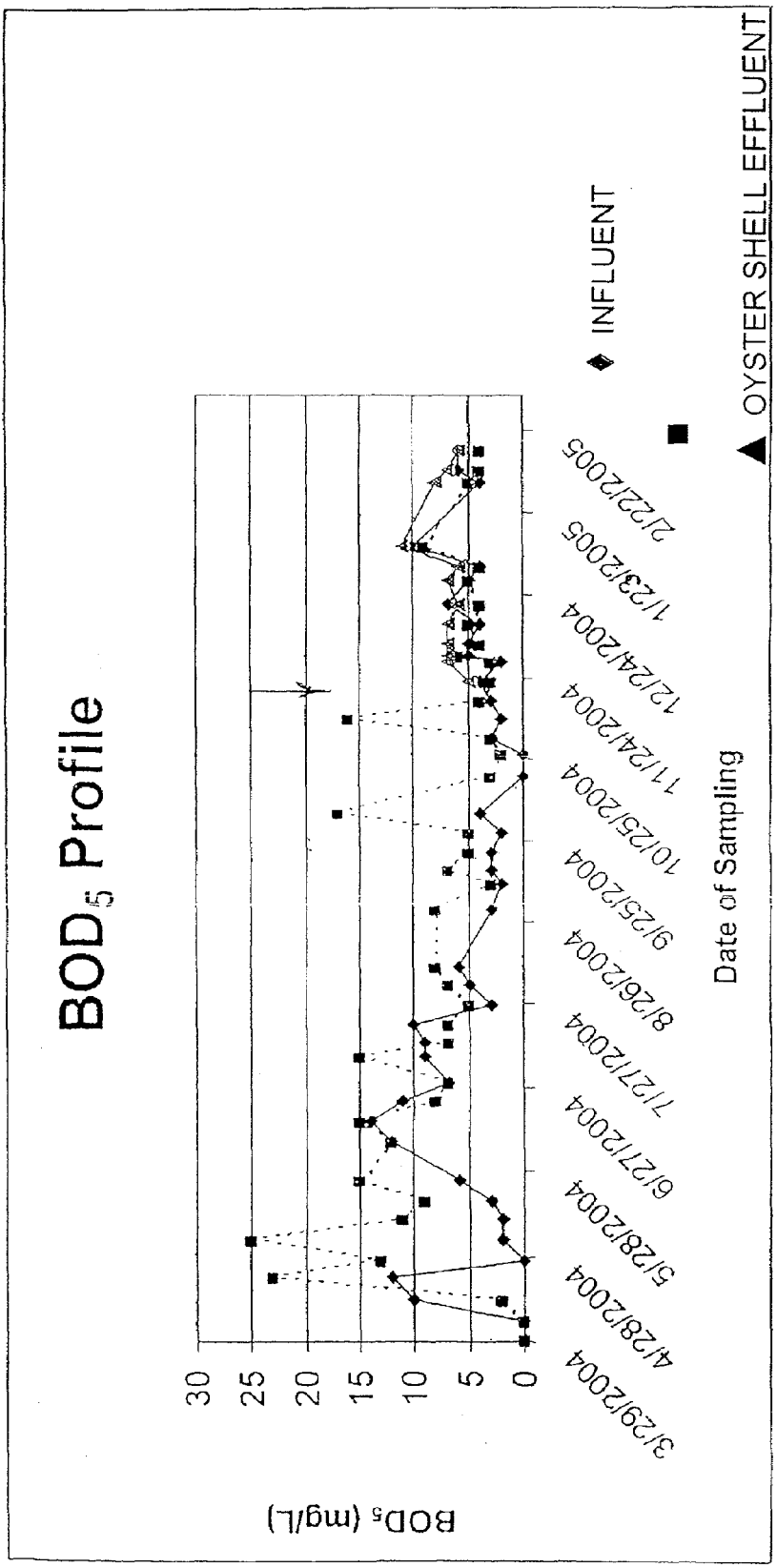
FIG. 10 illustrates the changes in biological oxygen demand (BOD) in a tank bioreactor using limestone/marble-chip and oyster shell.
Figure 11:
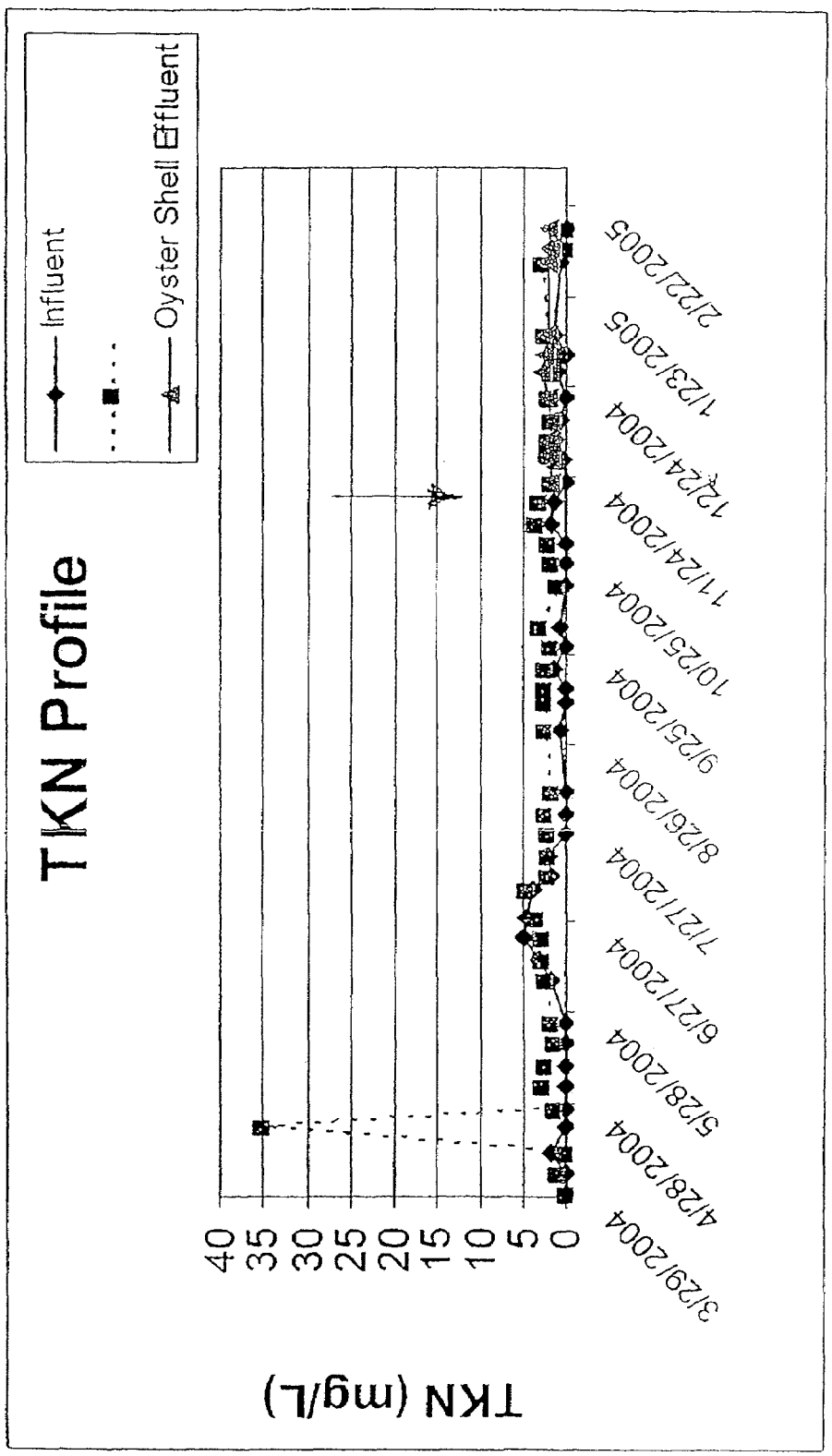
FIG. 11 shows Total Kjeldahl Nitrogen levels in a tank bioreactor using limestone/marble-chip and oyster shell.

The performance of the field-scale bioreactor # 2 was improved significantly after oyster shell addition in terms of nitrate removal, pH and TALK. When oyster shell was used as an alkalinity source, the bioreactors showed a high degree of nitrogen removal (average of 80%), with the effluent $NO_3^-$—N concentration consistently below 8 mg/L (FIG. 5).

pH is 6.7 on average with oyster-shell buffering (FIG. 4), and TALK in effluent averages 9.6 mg/L for the marble-chip buffering (FIG. 6). Keeping the system at consistently higher pH levels (less acidic, more alkaline) is favorable to the bioreactor process. Nitrite removal efficiency is also very high, as shown in FIG. 8, where nitrite is maintained below 0.25 mg/L in the oyster-shell buffered effluent.

The results of the extended operational data record for field-testing of the denitrification method that uses crushed oyster shell as buffer material versus limestone as buffer material provide an understanding of the field operation, efficiency and capability of the crushed oyster shell system versus the limestone system that cannot be gained from laboratory bench-scale testing or from a too short record of field testing. For example, the rate of dissolution of the solid-phase buffer plays an important role in the efficiency of the process. If the rate of generation of $CO_3^{2-}$ from the buffer upon being stressed (release of $H^+$ from the biological denitrification) is slower than the rate of release of $H^+$, the resulting drop in pH will inhibit the denitrification process. If, on the other hand, the rate of dissolution of the solid-phase buffer (and the concomitant rate of release of the buffering ion) is too fast, the bioreactor will maintain the desired pH, but the excess alkalinity generated will be wasted as it will be washed out of the bioreactor, and the buffer will be exhausted sooner, needing more frequent replenishment. Extended field-scale operations have shown that crushed oyster shells provide for a preferred dissolution rate.

Early bench-scale studies allowed an opportunity to experiment with changes in the concentration of the influent nitrate, Dissolved Oxygen (DO), organic matter, and with change in the feed flow rate, recirculation rate, for example, providing some insight to the chemistry of these processes. However, in field-scale bioreactors, because they are operated under the standard NSF-40 protocol and the influent concentration of nitrate or DO cannot be controlled, viability of the technology cannot be assessed without a sufficient duration of operation.

According to some embodiments of the present invention, an operational assessment period of about 26 weeks for a field-scale bioreactor in a commercial setting is needed in order to establish that a denitrification process and system are stable and reliable. Such an assessment time period can be used to demonstrate that a system is producing substantial reductions in nitrate concentrations, the performance being determined as an average of the reductions measured in multiple samples or monitoring events over the time period of the assessment.

It is preferable that the system demonstrate at a 90% or higher degree of confidence that the effluent from the system contains less than 10 mg/L as nitrate-nitrogen in sustainable operations. The operational assessment period needed to reach this 90% degree of confidence, however, can be shorter or longer than 26 weeks, the period depending on variations in individual system design, variations in characteristics of the water to be treated, variability over time of those characteristics of the water to be treated, variations in operational parameters employed in each system, variation in protocols used for monitoring system performance, and variations in operations quality control, among other reasons.

In determining operational performance for some embodiments of the present invention, a statistical "paired difference t-test" can be employed to determine within some degree of confidence, based on performance criteria and system-monitoring data, that a mollusk-shell-buffered system is performing significantly better than a standard system. In this statistical approach, the differences in the alkalinity values and nitrate concentrations between a mollusk-shell-buffered media according to an embodiment of the invention and a limestone-buffered media according to a standard SLAD system are tabulated for each sampling date, a null hypothesis (with some level of significance) is posed that the two media perform the same (i.e., $\mu_d=0$), and the hypothesis is evaluated using the equation, $$t = \frac{\bar{d} - \mu_d}{s_d / \sqrt{n}} \quad (4)$$

where d bar is the mean difference, $s_d$ is the standard deviation, n is the number of sample pairs, and t is a quantile with n−1 degrees of freedom.

It is a further advantage that a system according to the present invention can be provided as a passive system (e.g., neither electric power nor daily dose of chemicals are required), thus making it ideal for wastewater treatment applications where round-the-clock supervision is impractical or impossible, such as on-site systems, in situ reactive barriers for stormwater treatment, combined sewer overflows (CSOs), and aquaculture systems. It should be noted, too, that use of electric power and regular replenishment of chemicals, although not necessary to practice the invention, are nonetheless consistent with alternative embodiments of the invention.

A preferred embodiment of the invention can provide also for a system that comprises, in addition to the previously mentioned bioreactor containing elemental sulfur with mollusk-shell-buffered media, at least one of one or more sampling ports, one or more flow sensors, one or more sampling sensors, an automated flow-regulation controller, a computer, an electric control interface, a backwash system comprising a first backwash opening in the body portion sealably connected to a backwash inlet pipe, a second backwash opening in the body portion sealably connected to a backwash outlet pipe, a source of backwash water, a backwash pump, a backwash flow regulator, wherein: when an automated flow-regulator controller is present, then at least the flow regulator is also present; when a flow regulator and flow regulator controller are both present, the flow-regulator controller is mechanically or electrically connected controllably to the flow regulator means; when an automated flow-regulator controller and computer are both present, then the computer is electrically and controllably connected at least to the flow-regulator controller; and when an electric control interface is present, said interface is operably connected to one or more of the pumps, the backflush pump, the flow regulator, the flow-regulator controller, and/or the computer; and when the backflush system, computer, and automated flow controller are together present, then the computer is electrically and controllably connected to at least the automated flow controller and to the backwash pump.

The invention provides for system applications in, inter alia, without limitation, individual households, commercial establishments and small communities, municipal wastewater treatment systems, storm water treatment systems, in situ permeable reactive barrier walls for treatment of urban and agricultural runoff, and aquaculture systems.

Presented below are operational monitoring data for two field-scale denitrification systems operated over a period of several months, wherein at least one of the systems (Bioreactor #2) is a denitrification system according to a preferred embodiment of the present invention. Table 3 lists effluent chemistry data for a limestone-buffered media in Bioreactor #1. Table 4 lists effluent chemistry data for an oyster-shell-buffered bioreactor (Bioreactor #2) coupled to a pretreatment system, according to the present invention. Table 5 lists the monitoring data for the influent, i.e., the source water to be treated, which was delivered to both systems. The data show the significantly better performance of the oyster-shell-buffered bioreactor in reducing nitrate concentrations in the effluent relative to the influent.

TABLE 3

Field-scale operational assessment; bioreactor #1 effluent monitoring data

| MARBLE Date | Nitrate $NO_3^-$—N (mg/L) | Sulfate $SO_4^{2-}$ (mg/L) | COD mg/L | pH at UMD | Alkalinity mg/L as CaCO3 | Nitrite $NO_2^-$—N (mg/L) | BRL = 0 BOD mg/L | TKN mg/L |
|---|---|---|---|---|---|---|---|---|
| Mar. 24, 2004 EFF | 25 | 45.2 | 141.2 | 6.89 | 38 | 0.0115 | | |
| Mar. 29, 2004 EFF | 15.3 | 64.9 | 22.9 | 6.51 | 16 | 0.1674 | 0 | 0 |
| Mar. 31, 2004 EFF | 19 | 74.1 | 11.81 | 6.19 | 14 | 0.0765 | | |

TABLE 3-continued

Field-scale operational assessment;
bioreactor #1 effluent monitoring data

| MARBLE Date | Nitrate $NO_3^-$—N (mg/L) | Sulfate $SO_4^{2-}$ (mg/L) | COD mg/L | pH at UMD | Alkalinity mg/L as CaCO3 | Nitrite $NO_2^-$—N (mg/L) | BRL = 0 BOD mg/L | TKN mg/L |
|---|---|---|---|---|---|---|---|---|
| Apr. 05, 2004 EFF | 2.4 | 170 | 27.56 | 6 | 18 | 0.0056 | 0 | 1.1 |
| Apr. 07, 2004 EFF | 2.5 | 180 | 25.2 | 6.42 | 14 | 0.0041 | | |
| Apr. 12, 2004 EFF | 8.8 | 160 | 24.29 | 5.84 | 8 | 0.0054 | 2 | 0 |
| Apr. 14, 2004 EFF | 4.8 | 180 | 28.34 | 5.95 | 7 | 0.0064 | | |
| Apr. 20, 2004 EFF | 0.46 | 210 | 28.46 | 5.23 | 2 | 0.0095 | 23 | 35 |
| Apr. 22, 2004 EFF | 1.6 | 46 | 24.39 | 3.95 | 0 | 0.0044 | | |
| Apr. 26, 2004 EFF | 5.8 | 261 | 28.46 | 6.22 | 9 | 0.0088 | 13 | 1.5 |
| Apr. 30, 2004 EFF | 6.8 | 180 | 40.65 | 4.64 | 1 | | | |
| May 03, 2004 EFF | 6.6 | 190 | 69.1 | 4.33 | 0 | | 25 | 2.9 |
| May 05, 2004 EFF | 12 | 160 | 60.98 | 4.54 | 0 | | | |
| May 10, 2004 EFF | 8.6 | 190 | 77.22 | 5.5 | 6 | 0.0193 | 11 | 2.4 |
| May 12, 2004 EFF | 14 | 140 | 69.1 | 5.48 | 4 | 0.036 | | |
| May 17, 2004 EFF | 3.6 | 160 | 32.4 | 4.12 | 0 | 0.0468 | 9 | 1.5 |
| May 19, 2004 EFF | 0.22 | 200 | 48.6 | 4.12 | 0 | 0.0059 | | |
| May 24, 2004 EFF | 0.25 | 190 | 93.5 | 4.12 | 0 | 0.0071 | 15 | 1.7 |
| May 26, 2004 EFF | 0.24 | 170 | 56.91 | 4.62 | 2 | 0.0092 | | |
| Jun. 02, 2004 EFF | 1.4 | 150 | 28.23 | 5.28 | 6 | 0.1963 | | |
| Jun. 07, 2004 EFF | 0.97 | 170 | 28 | 5.43 | 2 | 0.2194 | 12 | 2.6 |
| Jun. 09, 2004 EFF | 3 | 160 | 36 | 5 | 3 | 0.4985 | | |
| Jun. 14, 2004 EFF | 0.24 | 130 | 43.82 | 5.9 | 14 | 0.0137 | 15 | 2.7 |
| Jun. 16, 2004 EFF | 0.27 | 140 | 27.89 | 5.52 | 6 | 0.0066 | | |
| Jun. 21, 2004 EFF | 0.1 | 130 | 35.16 | 6.39 | 31 | 0 | 8 | 2.7 |
| Jun. 23, 2004 EFF | 2 | 140 | 40.65 | 5.11 | 8 | 0.2476 | | |
| Jun. 28, 2004 EFF | 1.2 | 140 | 50.78 | 6.42 | 44 | 0.0064 | 7 | 3.5 |
| Jun. 30, 2004 EFF | 0.23 | 110 | 54.69 | 6.48 | 37 | 0.0175 | | |
| Jul. 07, 2004 EFF | 0.73 | 130 | 54.69 | 6.64 | 42 | 0.0278 | 15 | 4.4 |
| Jul. 12, 2004 EFF | 0.1 | 150 | 38.61 | 6.51 | 28 | 0.0185 | 7 | 2 |
| Jul. 14, 2004 EFF | 0.42 | 200 | 42.47 | 6.36 | 18 | 0.0148 | | |
| Jul. 19, 2004 EFF | 2.2 | 150 | 19.31 | 6.11 | 15 | 0.2909 | 7 | 2.1 |
| Jul. 21, 2004 EFF | 1.4 | 160 | 23.17 | 6.39 | 18 | 0.0402 | | |
| Jul. 26, 2004 EFF | 1.6 | 170 | 34.09 | 6.39 | 16 | 0.0235 | 5 | 2 |
| Jul. 28, 2004 EFF | 4.3 | 170 | 34.09 | 6.29 | 20 | 0.0156 | | |
| Aug. 02, 2004 EFF | 3 | 170 | 22.73 | 6.42 | 18 | 0.0204 | 7 | 2.5 |
| Aug. 04, 2004 EFF | 4 | 140 | 37.88 | 6.09 | 9 | 0.0162 | | |
| Aug. 09, 2004 EFF | 7.8 | 170 | 22.39 | 5.71 | 5 | 0.0252 | 8 | 1.9 |
| Aug. 11, 2004 EFF | 8.1 | 160 | 22.39 | 5.84 | 7 | 0.0353 | | |
| Aug. 16, 2004 EFF | 11 | 120 | 30.89 | 5.33 | 4 | 0.174 | | |
| Aug. 18, 2004 EFF | 7.5 | 420 | 37.45 | 5.93 | 9 | 0.0614 | | |
| Aug. 23, 2004 EFF | 6.1 | 120 | 32.85 | 5.91 | 10 | 0.1023 | | |
| Aug. 25, 2004 EFF | 6.9 | 120 | 21.9 | 5.84 | 9 | 0.0789 | | |
| Aug. 30, 2004 EFF | 2.5 | 150 | 18 | 5.13 | 3 | 0.2888 | 8 | 2.6 |
| Sep. 01, 2004 EFF | 6.6 | 130 | 32.37 | 4.83 | 1 | 0.4695 | | |
| Sep. 08, 2004 EFF | 4.3 | 150 | 28.78 | 6.25 | 11 | 0.4976 | 3 | 2.6 |
| Sep. 13, 2004 EFF | 4.3 | 150 | 25 | 6.28 | 13 | 0.537 | 7 | 2.3 |
| Sep. 15, 2004 EFF | 8.1 | 120 | 25 | 5.98 | 8 | 0.5254 | | |
| Sep. 20, 2004 EFF | 3.1 | 130 | 44.22 | 6.27 | 10 | 0.4653 | 5 | 2.5 |
| Sep. 21, 2004 EFF | 4.6 | 120 | 37.41 | 5.68 | 8 | 0.5371 | | |
| Sep. 27, 2004 EFF | 2 | 140 | 23.89 | 6.24 | 11 | 0.5674 | 5 | 1.9 |
| Sep. 29, 2004 EFF | 5.2 | 120 | 17.06 | 6.32 | 12 | 0.5472 | | |
| Oct. 04, 2004 EFF | 0.18 | 170 | 36.67 | 5.81 | 10 | 0.0015 | 17 | 3 |
| Oct. 06, 2004 EFF | 2 | 140 | 30 | 6.35 | 14 | 0.0022 | | |
| Oct. 13, 2004 EFF | 4.3 | 140 | 29.9 | 6.39 | 11 | 0.7865 | | |
| Oct. 18, 2004 EFF | 7.4 | 130 | 20 | 5.81 | 7 | 1.2675 | 3 | 1.2 |
| Oct. 20, 2004 EFF | 7.3 | 130 | 30 | 5.97 | 7 | 1.0675 | | |
| Oct. 26, 2004 EFF | 5.5 | 130 | 45.31 | 6.2 | 15 | 1.0534 | 2 | 1.6 |
| Oct. 27, 2004 EFF | 9.7 | 120 | 32.36 | 5.57 | 3 | 0.9927 | | |
| Nov. 01, 2004 EFF | 5 | 140 | 19.48 | 6.18 | 9 | 1.1452 | 3 | 2.1 |
| Nov. 03, 2004 EFF | 6.5 | 140 | 19.48 | 6.04 | 7 | 0.835 | | |
| Nov. 08, 2004 EFF | 6.2 | 190 | 51.28 | 3.83 | 0 | 1.333 | 16 | 3.6 |
| Nov. 10, 2004 EFF | 7.6 | 170 | 60.9 | 5.7 | 5 | 0.3365 | | |
| Nov. 15, 2004 EFF | 9.8 | 140 | 19.23 | 5.32 | 5 | 0.4565 | 4 | 3.1 |
| Nov. 17, 2004 EFF | 12 | 120 | 19.23 | 5.63 | 4 | 0.505 | | |
| Nov. 22, 2004 EFF | 10 | 220 | 32.26 | 5.95 | 6 | 1.179 | 3 | 1.7 |
| Nov. 29, 2004 EFF | 12 | 400 | 16.13 | 5.24 | 9 | 1.614 | 3 | 1 |
| Dec. 01, 2004 EFF | 11 | 210 | 28.22 | 6.1 | 12 | 1.412 | 6 | 2.2 |
| Dec. 06, 2004 EFF | 8.4 | 96 | 24 | 5.57 | 6 | 0.8945 | 4 | 2 |
| Dec. 08, 2004 EFF | 7.5 | 100 | 28 | 5.7 | 6 | 0.8415 | | |
| Dec. 13, 2004 EFF | 9.6 | 95 | 40 | 5.08 | 3 | 1.44 | 5 | 1.8 |
| Dec. 20, 2004 EFF | 8.2 | 99 | 24 | 6.01 | 8 | 1.0567 | 4 | 2 |
| Dec. 22, 2004 EFF | 9.6 | 87 | 32 | 5.41 | 4 | 0.9465 | | |
| Dec. 29, 2004 EFF | 8.9 | 93 | 16 | 5.11 | 5 | 0.9925 | 5 | 1.9 |
| Jan. 3, 2005 | 12 | 74 | 8 | 5.52 | 5 | 1.26 | 4 | 0.7 |

TABLE 3-continued

Field-scale operational assessment;
bioreactor #1 effluent monitoring data

| MARBLE Date | Nitrate $NO_3^-$—N (mg/L) | Sulfate $SO_4^{2-}$ (mg/L) | COD mg/L | pH at UMD | Alkalinity mg/L as CaCO3 | Nitrite $NO_2^-$—N (mg/L) | BRL = 0 BOD mg/L | TKN mg/L |
|---|---|---|---|---|---|---|---|---|
| Jan. 5, 2005 | 7.8 | 86 | 16 | 5.54 | 6 | 1.6045 | | |
| Jan. 10, 2005 | 6.6 | 91 | 39.22 | 5.72 | 11 | 1.2566 | 9 | 2.3 |
| Jan. 12, 2005 | 9.2 | 81 | 58.82 | 5.66 | 9 | 0.9435 | | |
| Jan. 19, 2005 | 13 | 71 | 23.53 | 5.16 | 4 | 1.263 | | |
| Jan. 31, 2005 | 11 | 68 | 15.5 | 5.96 | 9 | 1.1835 | | |
| Feb. 2, 2005 | 8.9 | 180 | 11.63 | 5.93 | 13 | 1.4825 | 5 | 2.8 |
| Feb. 7, 2005 | 12 | 140 | 27.13 | 5.23 | 3 | 1.3095 | 4 | 0 |
| Feb. 9, 2005 | 9.3 | 72 | 7.78 | 5.48 | 6 | 1.6355 | | |
| Feb. 14, 2005 | 6.2 | 110 | 7.78 | 5.32 | 4 | 1.4713 | 4 | 0 |
| Feb. 16, 2005 | 11 | 76 | 15.56 | 5.62 | 4 | 1.2465 | | |
| Feb. 23, 2005 | 14 | 66 | 11.49 | 5.53 | 5 | 1.716 | | |
| Feb. 28, 2005 | 13 | 62 | 19.16 | 5.68 | 5 | 1.494 | 5 | 0 |
| Mar. 2, 2005 | 12 | 65 | 26.82 | 5.65 | 6 | 1.224 | | |
| Mar. 7, 2005 | 14 | 66 | 18.94 | 5.41 | 4 | 0.803 | 2 | 0 |
| Mar. 9, 2005 | 16 | 47 | 22.73 | 5.68 | 7 | 0.984 | | |
| Mar. 14, 2005 | 11 | 86 | 37.88 | 5.82 | 10 | 2.237 | 4 | 1.8 |
| Mar. 16, 2005 | 10 | 64 | 29.63 | 5.96 | 10 | 2.0695 | | |
| Mar. 21, 2005 | 13 | 70 | 25.93 | 6.06 | 10 | 1.3865 | 4 | 0 |
| Mar. 23, 2005 | 13 | 74 | 29.63 | 6.05 | 11 | 1.5825 | | |
| Mar. 28, 2005 | 18 | 56 | 21.9 | 5.58 | 5 | 1.472 | 3 | 0 |
| Mar. 30, 2005 | 13 | 55 | 76.64 | 5.45 | 6 | 1.7665 | | |
| Apr. 4, 2005 | 14 | 61 | 54.74 | 5.43 | 10 | 1.386 | 4 | 1.5 |
| Apr. 6, 2005 | 13 | 70 | 37.45 | 5.8 | 6 | 1.333 | | |
| Apr. 11, 2005 | | | | | | | 0 | 0.8 |
| Apr. 13, 2005 | 14 | 68 | 35.21 | 5.85 | 7 | 1.1375 | | |
| Apr. 20, 2005 | 13 | 69 | 10.56 | 5.89 | 11 | 1.3555 | 2 | 0 |
| Apr. 25, 2005 | 12 | 83 | 14.08 | 5.94 | 9 | 1.085 | 0 | 1.4 |
| Apr. 27, 2005 | 10 | 83 | 16.72 | 5.98 | 7 | 1.3275 | | |
| May 2, 2005 | 5.9 | 100 | 53.51 | 6.12 | 11 | 2.319 | 0 | 2.2 |
| May 4, 2005 | 5.2 | 100 | 30.1 | 6.27 | 16 | 2.119 | | |
| May 9, 2005 | 11 | 66 | 32.58 | 5.2 | 3 | 1.8767 | 0 | 2 |
| May 11, 2005 | 10 | 73 | 36.92 | 5.49 | 8 | 2.308 | | |
| May 16, 2005 | 8.6 | 79 | 27.69 | 6.16 | 13 | 2.246 | 3 | 1.9 |
| May 18, 2005 | 3.6 | 83 | 67.69 | 6.35 | 21 | 2.6875 | | |
| May 23, 2005 | 0.1 | 48 | 46.69 | 6.58 | 58 | 1.217 | 24 | 0 |
| May 25, 2005 | 0.3 | 44 | 19.46 | 6.76 | 57 | 1.0725 | | |
| Jun. 1, 2005 | 0.35 | 66 | 42.8 | 6.81 | 47 | 1.011 | 6 | 1.1 |
| Jun. 6, 2005 | 0.86 | 82 | 34.22 | 6.53 | 48 | 1.0005 | 3 | 2.9 |
| Jun. 8, 2005 | 0.97 | 94 | 22.81 | 6.47 | 38 | 1.002 | | |
| Jun. 15, 2005 | 0.43 | 97 | 26.32 | 6.98 | 49 | 1.008 | 5 | 3.2 |
| Jun. 22, 2005 | 1.8 | 84 | 22.81 | 6.85 | 51 | 1.2145 | 3 | 2.3 |
| Jun. 27, 2005 | 0.47 | 120 | 26.62 | 6.25 | 27 | 1.879 | 4 | 1.8 |
| Jun. 29, 2005 | 0.22 | 200 | 26.62 | 6.58 | 23 | 1.0012 | | |
| Jul. 6, 2005 | 1.5 | 130 | 3.83 | 6.67 | 25 | 1.2925 | 7 | 3 |
| Jul. 11, 2005 | 1.8 | 96 | 11.49 | 6.78 | 47 | 2.006 | 11 | 6.8 |
| Jul. 13, 2005 | 0.93 | 110 | 11.49 | 6.85 | 55 | 2.5675 | | |
| Jul. 18, 2005 | 2.2 | 120 | 22.39 | 6.68 | 32 | 1.143 | | |
| Jul. 21, 2005 | 0.3 | 340 | 22.39 | 6.98 | 44 | 1.0872 | | |
| Jul. 25, 2005 | 0.88 | 160 | 29.85 | 6.9 | 53 | 1.8976 | 9 | 5 |
| Jul. 27, 2005 | 0.25 | 180 | 18.66 | 6.81 | 42 | 1.0028 | | |

TABLE 4

Field-scale operational assessment; bioreactor #2 monitoring data.

| OYSTER SHELLS Date | Nitrate $NO_3^-$—N (mg/L) | Sulfate $SO_4^{2-}$ (mg/L) | COD mg/L | pH at UMD | Alkalinity mg/L as CaCO3 | Nitrite $NO_2^-$—N (mg/L) | BRL = 0 BOD mg/L | TKN mg/L |
|---|---|---|---|---|---|---|---|---|
| Nov. 22, 2004 EFF | 5.4 | 240 | 20.16 | 6.43 | 31 | 0.0675 | 5 | 1.6 |
| Nov. 29, 2004 EFF | 1.1 | 210 | 24.19 | 6.87 | 60 | 0.1965 | 7 | 1.9 |
| Dec. 01, 2004 EFF | 2.1 | 400 | 20.16 | 6.77 | 68 | 0.0117 | 7 | 1.9 |
| Dec. 06, 2004 EFF | 1.6 | 160 | 24.3 | 6.52 | 60 | 0.0042 | 7 | 1.8 |
| Dec. 08, 2004 EFF | 1.7 | 170 | 32 | 6.69 | 61 | 0.0009 | | |
| Dec. 13, 2004 EFF | 2.9 | 160 | 36 | 6.7 | 51 | 0.0013 | 7 | 1.7 |
| Dec. 20, 2004 EFF | 2 | 160 | 28 | 6.66 | 61 | 0.002 | 6 | 2.1 |
| Dec. 22, 2004 EFF | 2.9 | 150 | 32 | 6.54 | 45 | 0.0004 | | |
| Dec. 29, 2004 EFF | 2.5 | 150 | 12 | 6.76 | 48 | 0.0012 | 7 | 2.8 |
| 38355 | 4.7 | 140 | 8 | 6.83 | 48 | 0.0029 | 6 | 2.4 |

TABLE 4-continued

Field-scale operational assessment; bioreactor #2 monitoring data.

| OYSTER SHELLS Date | Nitrate NO$_3^-$—N (mg/L) | Sulfate SO$_4^{2-}$ (mg/L) | COD mg/L | pH at UMD | Alkalinity mg/L as CaCO3 | Nitrite NO$_2^-$—N (mg/L) | BRL = 0 BOD mg/L | TKN mg/L |
|---|---|---|---|---|---|---|---|---|
| 38357 | 4.7 | 130 | 16 | 6.48 | 48 | 0.0018 | | |
| 38362 | 3.9 | 130 | 47.06 | 6.57 | 49 | 0.009 | 11 | 2.2 |
| 38364 | 5.5 | 120 | 47.06 | 6.87 | 47 | 0.0192 | | |
| 38371 | 7.5 | 120 | 27.45 | 6.49 | 32 | 0.0122 | | |
| 38383 | 6 | 110 | 19.38 | 6.63 | 53 | 0.0292 | | |
| 38385 | 4.5 | 250 | 23.26 | 6.77 | 59 | 0.0249 | 8 | 2 |
| 38390 | 4.8 | 120 | 23.26 | 6.56 | 32 | 0.0092 | 7 | 1.9 |
| 38392 | 4.3 | 120 | 7.78 | 6.82 | 47 | 0.0327 | | |
| 38397 | 6.2 | 120 | 11.67 | 6.61 | 35 | 0.0661 | 6 | 2.2 |
| 38399 | 4.8 | 130 | 11.67 | 6.72 | 36 | 0.0171 | | |
| 38406 | 7.2 | 110 | 3.83 | 6.6 | 36 | 0.1309 | | |
| 38411 | 5.8 | 120 | 23 | 6.64 | 34 | 0.0509 | 7 | 1.6 |
| 38413 | 5.6 | 120 | 19.16 | 6.76 | 41 | 0.0671 | | |
| 38418 | 6.9 | 120 | 18.94 | 6.58 | 33 | 0.0645 | 3 | 1.3 |
| 38420 | 10 | 99 | 18.94 | 6.6 | 32 | 0.1246 | | |
| 38425 | 3.4 | 120 | 34.09 | 6.42 | 63 | 0.0109 | 9 | 2.3 |
| 38427 | 2.2 | 200 | 37.04 | 6.44 | 52 | 0.0631 | | |
| 38432 | 6.2 | 130 | 29.63 | 6.87 | 51 | 0.0698 | 5 | 1.7 |
| 38434 | 6.2 | 140 | 29.63 | 6.81 | 57 | 0.0591 | | |
| 38439 | 11 | 100 | 21.9 | 6.59 | 32 | 0.0542 | 3 | 0.6 |
| 38441 | 6.9 | 110 | 62.04 | 6.47 | 33 | 0.1222 | | |
| 38446 | 6.8 | 120 | 32.85 | 6.59 | 36 | 0.1328 | 3 | 2.1 |
| 38448 | 7.5 | 120 | 14.98 | 6.68 | 36 | 0.061 | | |
| 38453 | | | | | | | 3 | 1.9 |
| 38455 | 7.1 | 140 | 38.73 | 6.69 | 45 | 0.1202 | | |
| 38462 | 5.7 | 150 | 28.17 | 6.63 | 57 | 0.0516 | 4 | 1.6 |
| 38467 | 3.8 | 170 | 24.65 | 6.94 | 41 | 0.0085 | 4 | 2.1 |
| 38469 | 6 | 140 | 26.76 | 6.92 | 37 | 0.0049 | | |
| 38474 | 2.4 | 130 | 53.51 | 6.84 | 46 | 0.0079 | 4 | 1.9 |
| 38476 | 1.8 | 130 | 43.48 | 6.9 | 55 | 0.0059 | | |
| 38481 | 3.6 | 130 | 45.59 | 6.69 | 35 | 0.2539 | 0 | 2 |
| 38483 | 3.5 | 140 | 36.92 | 6.66 | 36 | 0.0994 | | |
| 38488 | 3 | 150 | 30.77 | 6.78 | 50 | 0.0027 | 7 | 2.5 |
| 38490 | 1.5 | 130 | 76.92 | 6.68 | 67 | 0.0074 | | |
| 38495 | 0.1 | 60 | 46.69 | 6.73 | 98 | 0.051 | 22 | 0 |
| 38497 | 0.1 | 67 | 31.13 | 7.06 | 102 | 0.0168 | | |
| 38504 | 0.33 | 79 | 31.13 | 6.99 | 90 | 0.0065 | 9 | 1.2 |
| 38509 | 1.6 | 90 | 30.42 | 6.9 | 107 | 0.0054 | 3 | 2.4 |
| 38511 | 1.5 | 160 | 15.21 | 6.82 | 91 | 0.195 | | |
| 38518 | 0.32 | 110 | 26.62 | 7.13 | 110 | 0.008 | 9 | 3.9 |
| 38525 | 0.35 | 140 | 22.81 | 7.1 | 116 | 0.0015 | 6 | 3.1 |
| 38530 | 2.2 | 130 | 30.42 | 7.29 | 103 | 0.0198 | 14 | 3.1 |
| 38532 | 0.19 | 230 | 34.22 | 7.29 | 118 | 0.0033 | | |
| 38539 | 0.57 | 200 | 3.83 | 6.63 | 80 | 0.0331 | 19 | 3.9 |
| 38544 | 1.6 | 130 | 19.16 | 7.09 | 96 | 0.0187 | 16 | 6.4 |
| 38546 | 0.32 | 140 | 3.83 | 7.1 | 129 | 0.019 | | |
| 38551 | 0.64 | 180 | 26.12 | 6.97 | 91 | 0.033 | | |
| 38554 | 0.1 | 290 | 29.85 | 7.44 | 128 | 0.0066 | | |
| 38558 | 0.57 | 230 | 22.39 | 7.17 | 145 | 0.0375 | 15 | 6.8 |
| 38560 | 0.1 | 330 | 22.39 | 6.57 | 75 | 0.0045 | | |

TABLE 5

Field-scale operational assessment: Influent water monitoring data

| Date | Nitrate NO$_3^-$—N (mg/L) | Sulfate SO$_4^{2-}$ (mg/L) | COD mg/L | pH at UMD | Alkalinity mg/L as CaCO3 | Nitrite NO$_2^-$—N (mg/L) | BRL = 0 BOD mg/L | TKN mg/L |
|---|---|---|---|---|---|---|---|---|
| Mar. 24, 2004 INF | 28 | 38.3 | 19.08 | 6.47 | 20 | 0.0079 | | |
| Mar. 29, 2004 INF | 21.6 | 38.5 | 15.27 | 6.12 | 12 | 0.0103 | 0 | 0 |
| Mar. 31, 2004 INF | 28 | 35.9 | 11.81 | 6.05 | 8 | 0.0207 | | |
| Apr. 05, 2004 INF | 22 | 22 | 23.62 | 6.02 | 12 | 0.0032 | 0 | 0 |
| Apr. 07, 2004 INF | 15.8 | 64 | 21 | 6.27 | 12 | 0.0056 | | |
| Apr. 12, 2004 INF | 30 | 23 | 20.24 | 6.15 | 17 | 0.0013 | 10 | 1.8 |
| Apr. 14, 2004 INF | 30 | 23 | 24.29 | 6.25 | 12 | 0.0063 | | |
| Apr. 20, 2004 INF | 29 | 23 | 20.33 | 6.23 | 13 | 0.0074 | 12 | 0 |
| Apr. 22, 2004 INF | 30 | 23 | 16.26 | 5.73 | 6 | 0.0052 | | |
| Apr. 26, 2004 INF | 22.5 | 34.9 | 12.19 | 6.15 | 14 | 0.0047 | 0 | 0 |
| Apr. 30, 2004 INF | 31 | 22 | 16.26 | 6.65 | 14 | | | |

TABLE 5-continued

Field-scale operational assessment: Influent water monitoring data

| Date | Nitrate NO$_3^-$—N (mg/L) | Sulfate SO$_4^{2-}$ (mg/L) | COD mg/L | pH at UMD | Alkalinity mg/L as CaCO3 | Nitrite NO$_2^-$—N (mg/L) | BRL = 0 BOD mg/L | TKN mg/L |
|---|---|---|---|---|---|---|---|---|
| May 03, 2004 INF | 31 | 22 | 20.33 | 6.63 | 15 |  | 2 | 0 |
| May 05, 2004 INF | 30 | 21 | 20.33 | 6.4 | 14 |  |  |  |
| May 10, 2004 INF | 31 | 21 | 24.39 | 6.25 | 21 | 0.0076 | 2 | 0 |
| May 12, 2004 INF | 30 | 21 | 16.26 | 6.47 | 23 | 0.0095 |  |  |
| May 17, 2004 INF | 25 | 22 | 16.2 | 6.16 | 16 | 0.0318 | 3 | 0 |
| May 19, 2004 INF | 25 | 23 | 16.2 | 6.42 | 29 | 0.0078 |  |  |
| May 24, 2004 INF | 22 | 23 | 20.33 | 6.46 | 40 | 0.0189 | 6 | 0 |
| May 26, 2004 INF | 20 | 22 | 24.39 | 6.3 | 43 | 0.0434 |  |  |
| Jun. 02, 2004 INF | 21 | 22 | 32.26 | 6.21 | 28 | 0.1117 |  |  |
| Jun. 07, 2004 INF | 23 | 25 | 32 | 6.44 | 34 | 0.0228 | 12 | 1.9 |
| Jun. 09, 2004 INF | 24 | 25 | 32 | 6.28 | 31 | 0.0518 |  |  |
| Jun. 14, 2004 INF | 14 | 22 | 27.89 | 6.48 | 62 | 0.1218 | 14 | 3 |
| Jun. 16, 2004 INF | 13 | 22 | 27.89 | 6.58 | 61 | 0.2744 |  |  |
| Jun. 21, 2004 INF | 14 | 23 | 19.53 | 6.44 | 59 | 0.1548 | 11 | 4.8 |
| Jun. 23, 2004 INF | 17 | 23 | 31.25 | 6.54 | 51 | 0.2433 |  |  |
| Jun. 28, 2004 INF | 9.3 | 21 | 46.88 | 6.71 | 76 | 0.0868 | 7 | 4.6 |
| Jun. 30, 2004 INF | 9.6 | 21 | 46.88 | 6.72 | 82 | 0.2591 |  |  |
| Jul. 07, 2004 INF | 10 | 24 | 46.88 | 6.8 | 83 | 0.1978 | 9 | 3.7 |
| Jul. 12, 2004 INF | 16 | 25 | 46.33 | 6.63 | 47 | 0.17 | 9 | 1.7 |
| Jul. 14, 2004 INF | 18 | 26 | 46.33 | 6.55 | 60 | 0.1645 |  |  |
| Jul. 19, 2004 INF | 20 | 25 | 15.44 | 6.58 | 49 | 0.537 | 10 | 2.2 |
| Jul. 21, 2004 INF | 21 | 25 | 11.58 | 6.56 | 51 | 0.5479 |  |  |
| Jul. 26, 2004 INF | 23 | 26 | 34.09 | 6.6 | 42 | 0.0872 | 3 | 0 |
| Jul. 28, 2004 INF | 23 | 26 | 34.09 | 6.65 | 46 | 0.594 |  |  |
| Aug. 02, 2004 INF | 23 | 25 | 26.51 | 6.85 | 43 | 0.2099 | 5 | 0 |
| Aug. 04, 2004 INF | 24 | 25 | 37.88 | 6.58 | 37 | 0.2369 |  |  |
| Aug. 09, 2004 INF | 28 | 26 | 26.12 | 6.51 | 26 | 0.2259 | 6 | 0 |
| Aug. 11, 2004 INF | 29 | 26 | 22.39 | 6.4 | 25 | 0.1038 |  |  |
| Aug. 16, 2004 INF | 26 | 23 | 22.47 | 6.19 | 19 | 0.1053 |  |  |
| Aug. 18, 2004 INF | 26 | 24 | 30.89 | 6.18 | 26 | 0.0856 |  |  |
| Aug. 23, 2004 INF | 20 | 21 | 29.2 | 6.38 | 45 | 0.1078 |  |  |
| Aug. 25, 2004 INF | 21 | 20 | 21.9 | 6.34 | 37 | 0.0946 |  |  |
| Aug. 30, 2004 INF | 20 | 23 | 10.79 | 6.36 | 22 | 0.0394 | 3 | 0.8 |
| Sep. 01, 2004 INF | 18 | 21 | 25.18 | 6.57 | 36 | 0.0701 |  |  |
| Sep. 08, 2004 INF | 23 | 24 | 25.18 | 6.51 | 29 | 0.0645 | 2 | 0 |
| Sep. 13, 2004 INF | 22 | 24 | 17.86 | 6.72 | 34 | 0.0463 | 3 | 0 |
| Sep. 15, 2004 INF | 23 | 22 | 10.71 | 6.69 | 36 | 0.0988 |  |  |
| Sep. 20, 2004 INF | 20 | 20 | 37.41 | 6.79 | 37 | 0.0565 | 3 | 1.3 |
| Sep. 21, 2004 INF | 16 | 33 | 23.81 | 6.59 | 41 | 0.1461 |  |  |
| Sep. 27, 2004 INF | 20 | 22 | 17.06 | 6.69 | 38 | 0.0407 | 2 | 0 |
| Sep. 29, 2004 INF | 20 | 21 | 13.65 | 6.79 | 42 | 0.0749 |  |  |
| Oct. 04, 2004 INF | 18 | 21 | 26.67 | 6.56 | 27 | 0.0092 | 4 | 0.6 |
| Oct. 06, 2004 INF | 20 | 21 | 26.67 | 6.7 | 34 | 0.0072 |  |  |
| Oct. 13, 2004 INF | 22 | 22 | 26.58 | 6.8 | 30 | 0.0355 |  |  |
| Oct. 18, 2004 INF | 23 | 22 | 16.67 | 6.73 | 21 | 0.0955 | 0 | 0 |
| Oct. 20, 2004 INF | 23 | 21 | 26.67 | 6.65 | 27 | 0.0938 |  |  |
| Oct. 26, 2004 INF | 25 | 22 | 35.6 | 6.75 | 22 | 0.3587 | 0 | 0 |
| Oct. 27, 2004 INF | 25 | 22 | 22.65 | 6.54 | 18 | 0.0543 |  |  |
| Nov. 01, 2004 INF | 25 | 22 | 16.23 | 6.69 | 26 | 0.0548 | 3 | 0 |
| Nov. 03, 2004 INF | 25 | 22 | 16.23 | 6.5 | 26 | 0.0845 |  |  |
| Nov. 08, 2004 INF | 25 | 21 | 51.28 | 6.58 | 19 | 0.0603 | 2 | 1.6 |
| Nov. 10, 2004 INF | 25 | 21 | 57.69 | 6.71 | 23 | 0.1208 |  |  |
| Nov. 15, 2004 INF | 24 | 20 | 14.18 | 6.7 | 22 | 0.0479 | 3 | 1.5 |
| Nov. 17, 2004 INF | 24 | 20 | 16.02 | 6.56 | 18 | 0.0224 |  |  |
| Nov. 22, 2004 INF | 24 | 20 | 24.19 | 6.37 | 26 | 0.072 | 4 | 0 |
| Nov. 29, 2004 INF | 24 | 20 | 32.26 | 6.74 | 24 | 0.1567 | 2 | 0.5 |
| Dec. 01, 2004 INF | 22 | 19 | 28.22 | 6.48 | 36 | 0.182 | 5 | 1.7 |
| Dec. 06, 2004 INF | 20 | 19 | 20 | 6.22 | 17 | 0.117 | 5 | 1.4 |
| Dec. 08, 2004 INF | 21 | 19 | 24 | 6.34 | 29 | 0.0754 |  |  |
| Dec. 13, 2004 INF | 21 | 18 | 36 | 6.2 | 19 | 0.0206 | 4 | 0.7 |
| Dec. 20, 2004 INF | 20 | 18 | 20 | 6.23 | 33 | 0.0578 | 7 | 0 |
| Dec. 22, 2004 INF | 20 | 17 | 24 | 6.26 | 32 | 0.0834 |  |  |
| Dec. 29, 2004 INF | 20 | 18 | 12 | 6.27 | 25 | 0.0347 | 5 | 1 |
| 38355 | 20 | 18 | 12 | 6.11 | 13 | 0.057 | 4 | 0 |
| 38357 | 19 | 18 | 20 | 6.2 | 30 | 0.0554 |  |  |
| Jan. 10, 2005 | 18 | 18 | 54.9 | 6.27 | 31 | 0.0253 | 10 | 1.5 |
| Jan. 12, 2005 | 18 | 18 | 31.37 | 6.21 | 33 | 0.1083 |  |  |
| Jan. 19, 2005 | 21 | 20 | 27.45 | 6.16 | 18 | 0.102 |  |  |
| Jan. 31, 2005 | 17 | 19 | 15.5 | 6 | 26 | 0.2521 |  |  |
| Feb. 2, 2005 | 16 | 19 | 27.13 | 6.26 | 33 | 0.2613 | 4 | 0.6 |
| Feb. 7, 2005 | 17 | 19 | 27.13 | 6.27 | 21 | 0.3429 | 6 | 1.6 |
| Feb. 9, 2005 | 18 | 20 | 7.78 | 5.9 | 26 | 0.3417 |  |  |
| Feb. 14, 2005 | 18 | 19 | 3.89 | 6.08 | 24 | 0.2878 | 6 | 0 |

TABLE 5-continued

Field-scale operational assessment: Influent water monitoring data

| Date | Nitrate $NO_3^-$—N (mg/L) | Sulfate $SO_4^{2-}$ (mg/L) | COD mg/L | pH at UMD | Alkalinity mg/L as CaCO3 | Nitrite $NO_2^-$—N (mg/L) | BRL = 0 BOD mg/L | TKN mg/L |
|---|---|---|---|---|---|---|---|---|
| Feb. 16, 2005 | 19 | 19 | 15.56 | 6.13 | 19 | 0.3098 | | |
| Feb. 23, 2005 | 21 | 20 | 15.32 | 6.07 | 25 | 0.31 | | |
| Feb. 28, 2005 | 18 | 19 | 23 | 6.44 | 25 | 0.2411 | 4 | 0 |
| Mar. 2, 2005 | 18 | 17 | 23 | 6.24 | 27 | 0.3085 | | |
| Mar. 7, 2005 | 21 | 20 | 22.73 | 6.2 | 17 | 0.1573 | 3 | 0 |
| Mar. 9, 2005 | 19 | 19 | 30.3 | 6.21 | 19 | 0.1995 | | |
| Mar. 14, 2005 | 16 | 19 | 34.09 | 6.02 | 23 | 0.3033 | 4 | 1.7 |
| Mar. 16, 2005 | 17 | 20 | 33.33 | 6.13 | 25 | 0.2158 | | |
| Mar. 21, 2005 | 20 | 21 | 22.22 | 6.87 | 51 | 0.0875 | 4 | 0 |
| Mar. 23, 2005 | 21 | 21 | 25.93 | 6.17 | 21 | 0.0925 | | |
| Mar. 28, 2005 | 22 | 20 | 29.2 | 6.22 | 21 | 0.0781 | 3 | 0 |
| Mar. 30, 2005 | 19 | 17 | 51.1 | 6.39 | 22 | 0.128 | | |
| Apr. 4, 2005 | 20 | 18 | 47.45 | 6.25 | 19 | 0.2535 | 3 | 1.2 |
| Apr. 6, 2005 | 20 | 18 | 29.96 | 6.17 | 20 | 0.1749 | | |
| Apr. 11, 2005 | | | | | | | 0 | 0 |
| Apr. 13, 2005 | 19 | 18 | 35.21 | 6.14 | 18 | 0.007 | | |
| Apr. 20, 2005 | 19 | 18 | 21.13 | 6.42 | 19 | 0.004 | 3 | 0 |
| Apr. 25, 2005 | 19 | 18 | 17.61 | 6.35 | 18 | 0.0098 | 0 | 0 |
| Apr. 27, 2005 | 19 | 18 | 26.76 | 6.34 | 16 | 0.0067 | | |
| May 2, 2005 | 14 | 26 | 36.79 | 6.16 | 23 | 0.0185 | 4 | 2.6 |
| May 4, 2005 | 14 | 26 | 36.79 | 6.41 | 28 | 0.0165 | | |
| May 9, 2005 | 18 | 20 | 36.75 | 6.43 | 20 | 0.0354 | 0 | 1.9 |
| May 11, 2005 | 19 | 19 | 36.92 | 6.22 | 17 | 0.1091 | | |
| May 16, 2005 | 16 | 18 | 27.69 | 6.26 | 29 | 0.4927 | 4 | 1.3 |
| May 18, 2005 | 13 | 19 | 86.15 | 6.42 | 38 | 0.2779 | | |
| May 23, 2005 | 0.23 | 17 | 38.91 | 6.54 | 84 | 0.5295 | 29 | 0 |
| May 25, 2005 | 1.8 | 14 | 35.02 | 6.91 | 73 | 0.1069 | | |
| Jun. 1, 2005 | 4.9 | 15 | 31.13 | 7.01 | 67 | 0.0151 | 6 | 1.8 |
| Jun. 6, 2005 | 8.4 | 19 | 30.42 | 6.44 | 61 | 0.435 | 4 | 1.8 |
| Jun. 8, 2005 | 10 | 20 | 22.81 | 6.53 | 70 | 0.1397 | | |
| Jun. 15, 2005 | 7.7 | 20 | 22.81 | 6.63 | 70 | 0.2327 | 5 | 1.3 |
| Jun. 22, 2005 | 10 | 21 | 26.62 | 6.43 | 69 | 0.0023 | 2 | 1.8 |
| Jun. 27, 2005 | 13 | 20 | 26.62 | 6.77 | 59 | 0.0406 | 4 | 0.6 |
| Jun. 29, 2005 | 12 | 20 | 22.81 | 6.88 | 59 | 0.4314 | | |
| Jul. 6, 2005 | 19 | 19 | 7.66 | 6.37 | 50 | 0.4147 | 8 | 1.2 |
| Jul. 11, 2005 | 12 | 18 | 7.66 | 6.75 | 67 | 0.4249 | 19 | 7.6 |
| Jul. 13, 2005 | 15 | 19 | 19.16 | 6.48 | 55 | 0.3971 | | |
| Jul. 18, 2005 | 20 | 18 | 29.85 | 6.5 | 45 | 0.3375 | | |
| Jul. 21, 2005 | 22 | 19 | 26.12 | 6.6 | 54 | 0.4977 | | |
| Jul. 25, 2005 | 24 | 20 | 22.39 | 6.54 | 35 | 0.4516 | 6 | 0 |
| Jul. 27, 2005 | 26 | 20 | 11.19 | 6.5 | 30 | 0.0476 | | |

Advantages of utilizing crushed oyster shells according to the system and methods of embodiments of the invention are further understood in light of the following paragraphs.

In the bioreactor, the microorganisms reduce (add electrons to) nitrate to form nitrogen gas using elemental sulfur as an electron donor. Traditionally, other electron donors have been used, including for example, carbon, zerovalent iron, alcohol, methanol and other hydrogen sources. In this reaction, $H^+$ (acid) is generated and if there is not enough alkalinity in the wastewater, the pH will drop to a level that can cause the microbes to shut down all metabolic functions. Since in general the wastewater (containing nitrate) does not have adequate alkalinity, a buffer must be maintained in the bioreactor. Traditionally, choices considered for this buffer can include marble chips and limestone.

Figure 16A:
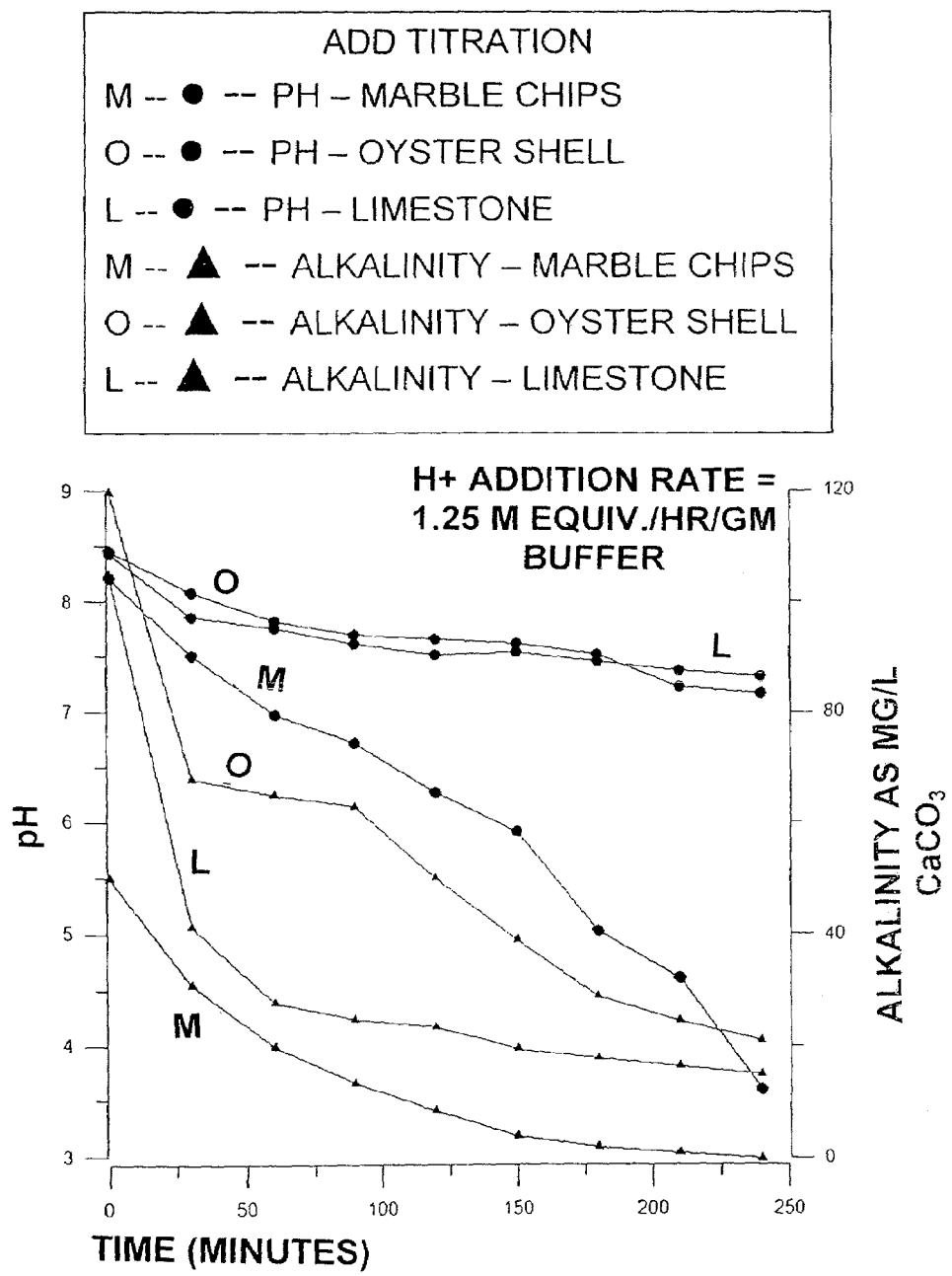
FIG. 16A shows pH and Alkalinity measured in a bioreactor for different buffer materials (marble chips, oyster shell and limestone) for a continuous acid titration over 250 minutes, where hydrogen ion (H+) is added at a rate of 1.25 m equiv/hr/gm buffer.
Figure 16B:
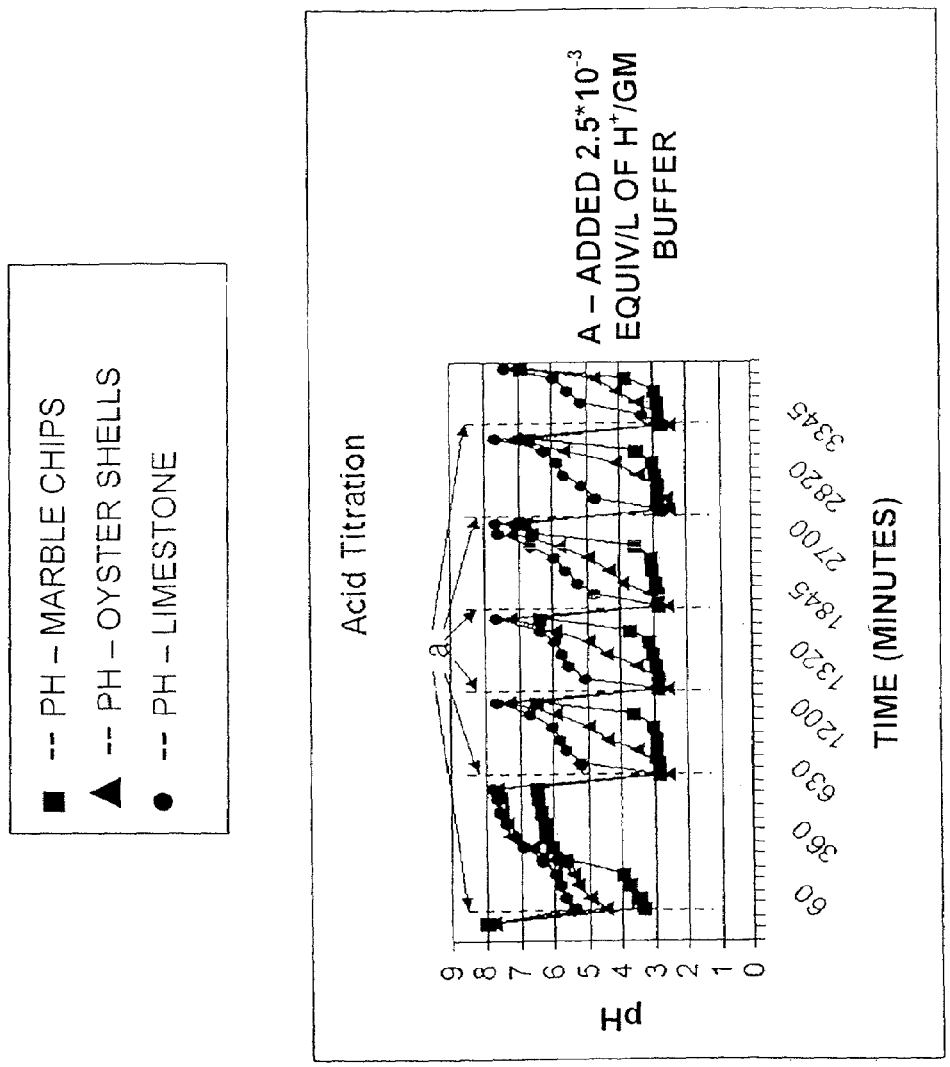
FIG. 16B shows pH measured in a bioreactor for different buffering materials (marble chips, oyster shells and limestone) for a periodic acid titration over greater than 3345 minutes, where, at each time point marked "a," $2.5*10^{**}(-3)$ equiv/L of hydrogen ion ($H^+$) is added per gram of buffer.

FIG. 16A is a graph showing the pH and the alkalinity of a reactor where acid ($H^+$) is being added continuously at a rate of 1.25 milli-equivalents per hour per gram of buffer. This graph mimics continuous denitrification which results in continuous generation of $H^+$. A desirable buffer material scavenges the $H^+$ generated and does not allow the pH to drop. FIG. 16A shows that oyster shell maintains alkalinity to a greater degree than do limestone or marble chips. FIG. 16B shows an acid titration evaluation of the alternative buffering materials (marble chips, oyster shells and limestone), where acid ($H^+$) is added periodically with intervals of pH recovery as the buffer dissolves and restores alkalinity.

Figure 17:
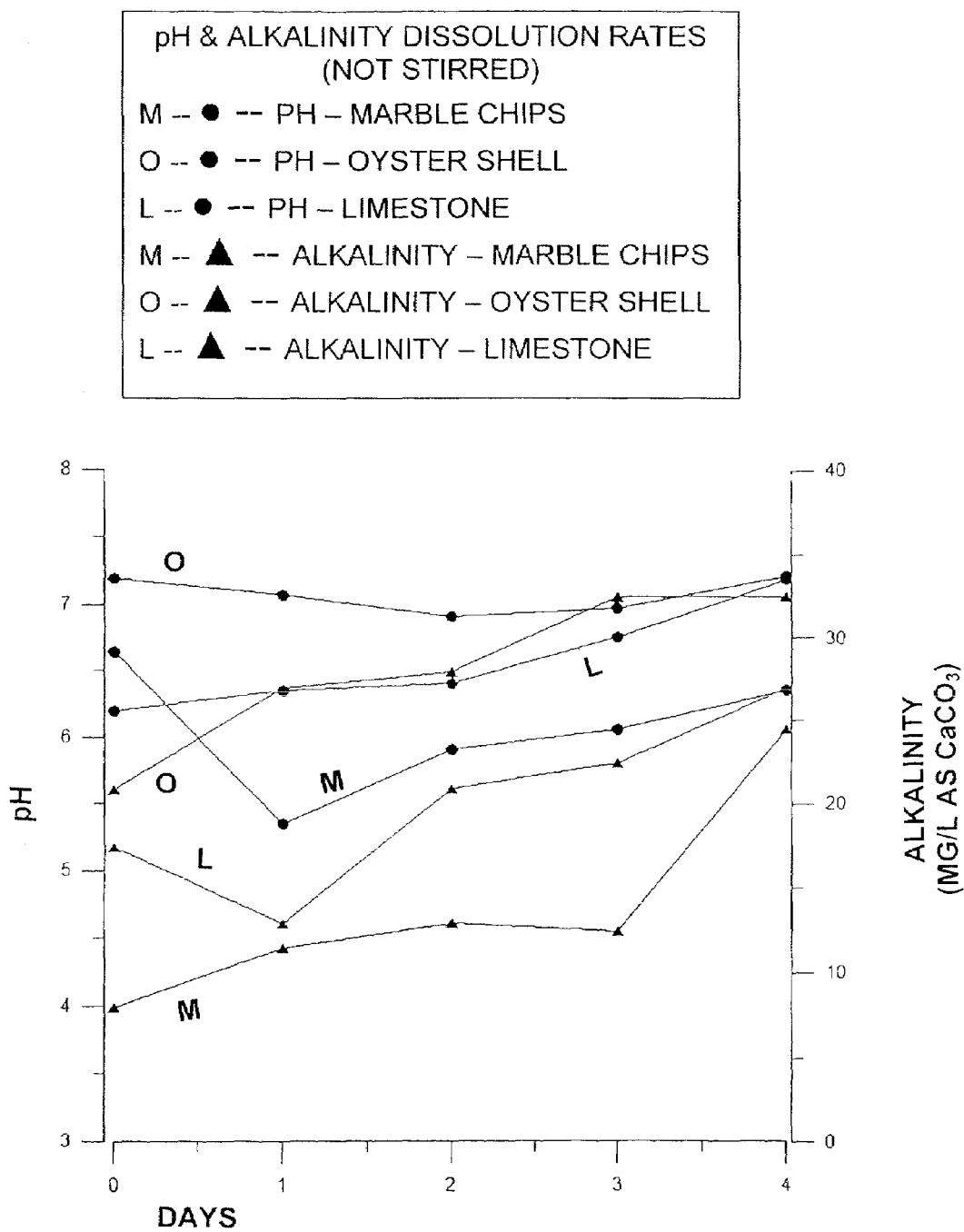
FIG. 17 shows pH and Alkalinity Dissolution Rates measured in a bioreactor for different buffering materials (marble chips, oyster shell and limestone) in water, without addition of acid, not stirred, over a period of four days.

To determine dissolution rates, FIG. 17 shows the pH and Alkalinity profile of each solid-phase buffer considered (limestone, marble chips, and crushed oyster shell) when a known mass of each buffer is added to distilled and deionized water in a quiescent reactor (no stirring). Each buffer material dissolves upon contact with water, releasing alkalinity. pH and alkalinity were monitored each day. The reactors were not stressed; i.e., there was no acid added. After 4 days, crushed oyster shell provided the highest alkalinity and crushed oyster shell and limestone had the same effect in terms of reactor pH. This can be considered as a quasi-equilibrium state: i.e., if there is no stress in the system, the reactor would arrive at this state after equilibrium is achieved.

Figure 18:
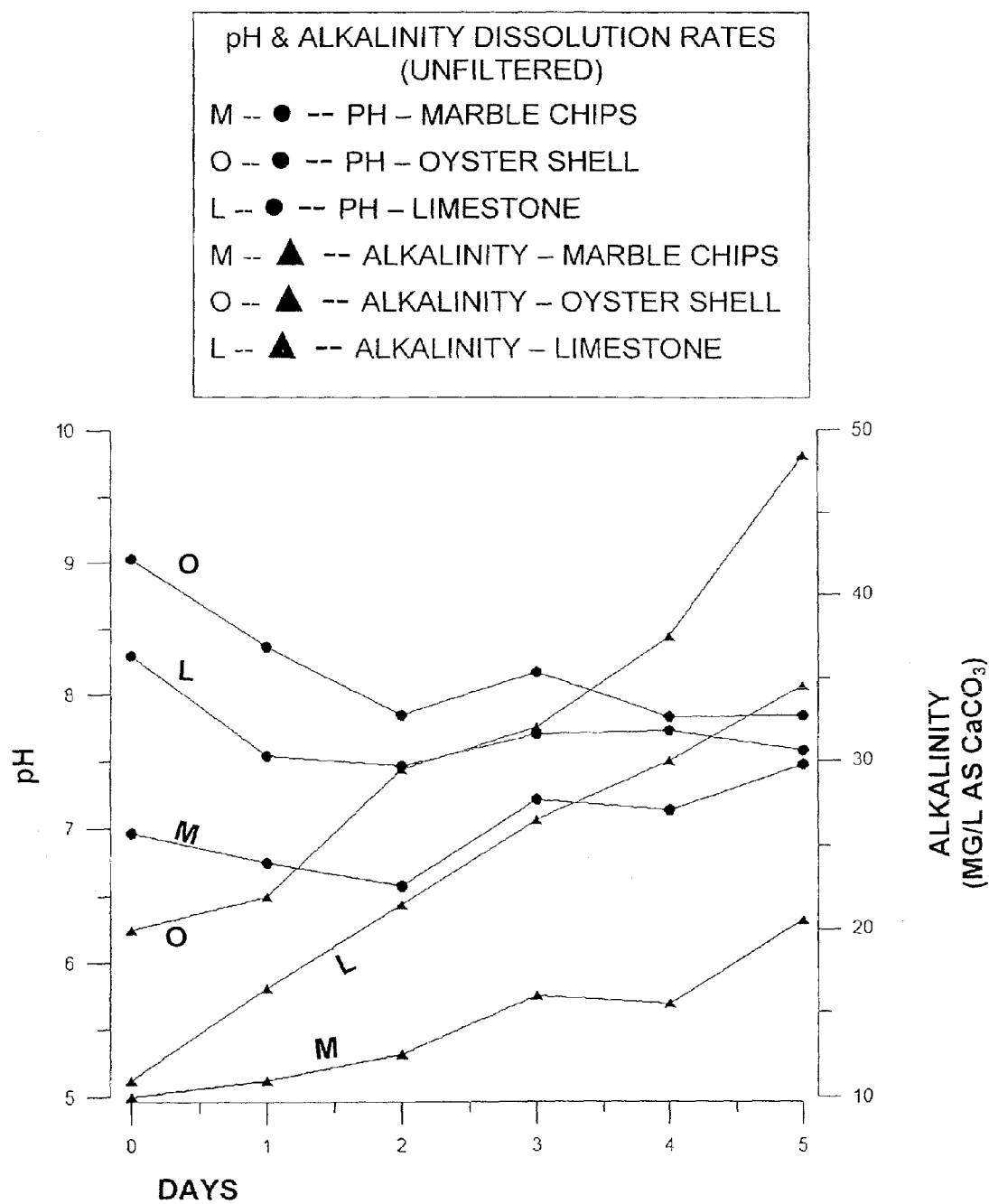
FIG. 18 shows pH and Alkalinity Dissolution Rates measured in a bioreactor for different buffering materials (marble chips, oyster shell and limestone) in water, without addition of acid, with continuous stirring, over a period of five days.

FIG. 18 provides the same information but with the reactor being stirred continuously. Still, the relative performance of each buffer material does not change. Operational bioreactors will be in between a quiescent and a completely stirred condition. Thus, the natural tendency of crushed oyster shell is to provide the maximum alkalinity and highest pH in the reactor. When the reactor is stressed (i.e., when acid is generated by the microbial reaction), the deviation from the equilibrium state provides the buffering action. The greater the difference between the equilibrium state and the stressed state, the stronger will be the dissolution and buffering action.

Table 6, below, shows the rate of release of alkalinity from each of the three buffer materials considered (marble chips, limestone, and oyster shell). Based on FIG. 17 and FIG. 18 and Table 6, below, it is shown that crushed oyster shell is a preferred buffer for this kind of stress induced (addition of $H^+$).

TABLE 6

Alkalinity Release from differing buffer materials

| Buffer Material | Rate of Release of Alkalinity (mg/L as $CaCO_3$ per day) | |
|---|---|---|
| | Stirred Reactor | Unstirred Reactor |
| Marble | 4 | 6 |
| Limestone | 7 | 7 |
| Oyster | 10 | 11 |

The size of the granules of electron donor material, such as, for example, sulfur granules, and the pieces or oyster granules of buffer material, such as, for example, shell pieces, is an important factor in achieving the operational results according to preferred embodiments of the invention.

Figure 19:
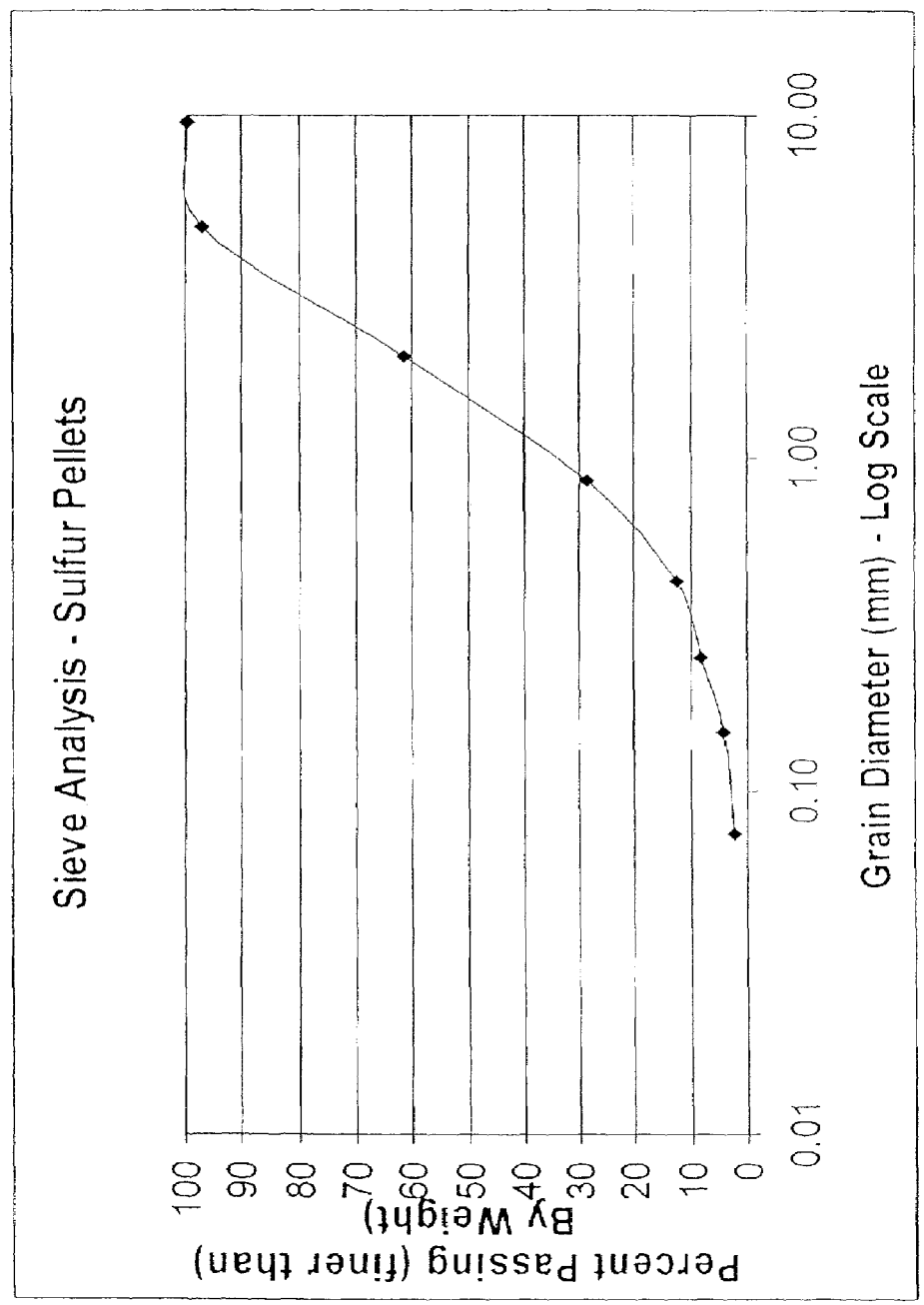
FIG. 19 shows results of a sieve analysis for sulfur pellets used as electron donor in an embodiment according to the invention.

Sieve analysis of sulfur pellets used in the bioreactor according to an embodiment is shown in FIG. 19 and in Table 7 below, showing that the material being discarded is that which passes US Sieve # 100 (0.15 mm), so that the denitrification bed is composed substantially of sulfur granules of size greater than 0.15 mm.

TABLE 7

Sieve analysis of sulfur pellets used
Sample Size = 764.7 g

| Sieve # | Sieve Size (mm) | Sieve Wt. (g) | Sieve Wt. + Material (g) | Wt. of Material Retained (g) | Percent Retained (%) | Accum. % Retained | Percent Passing (%) |
|---|---|---|---|---|---|---|---|
| 3/8 | 9.50 | 535.30 | 536.90 | 1.60 | 0.21 | 0.21 | 99.79 |
| # 4 | 4.75 | 474.10 | 494.90 | 20.80 | 2.72 | 2.93 | 97.07 |
| # 10 | 2.00 | 428.00 | 699.00 | 271.00 | 35.44 | 38.37 | 61.63 |
| # 20 | 0.85 | 383.00 | 635.80 | 252.80 | 33.06 | 71.43 | 28.57 |
| # 40 | 0.425 | 387.80 | 509.70 | 121.90 | 15.94 | 87.37 | 12.63 |
| # 60 | 0.25 | 378.60 | 414.60 | 36.00 | 4.71 | 92.08 | 7.92 |
| # 100 | 0.15 | 312.80 | 342.20 | 29.40 | 3.84 | 95.92 | 4.08 |
| # 200 | 0.075 | 285.00 | 300.70 | 15.70 | 2.05 | 97.97 | 2.03 |
| Pan | — | 361.50 | 377.00 | 15.50 | 2.03 | 100.00 | 0.00 |
| SUM | | | | 764.7 | 100.00 | | |

Figure 20:
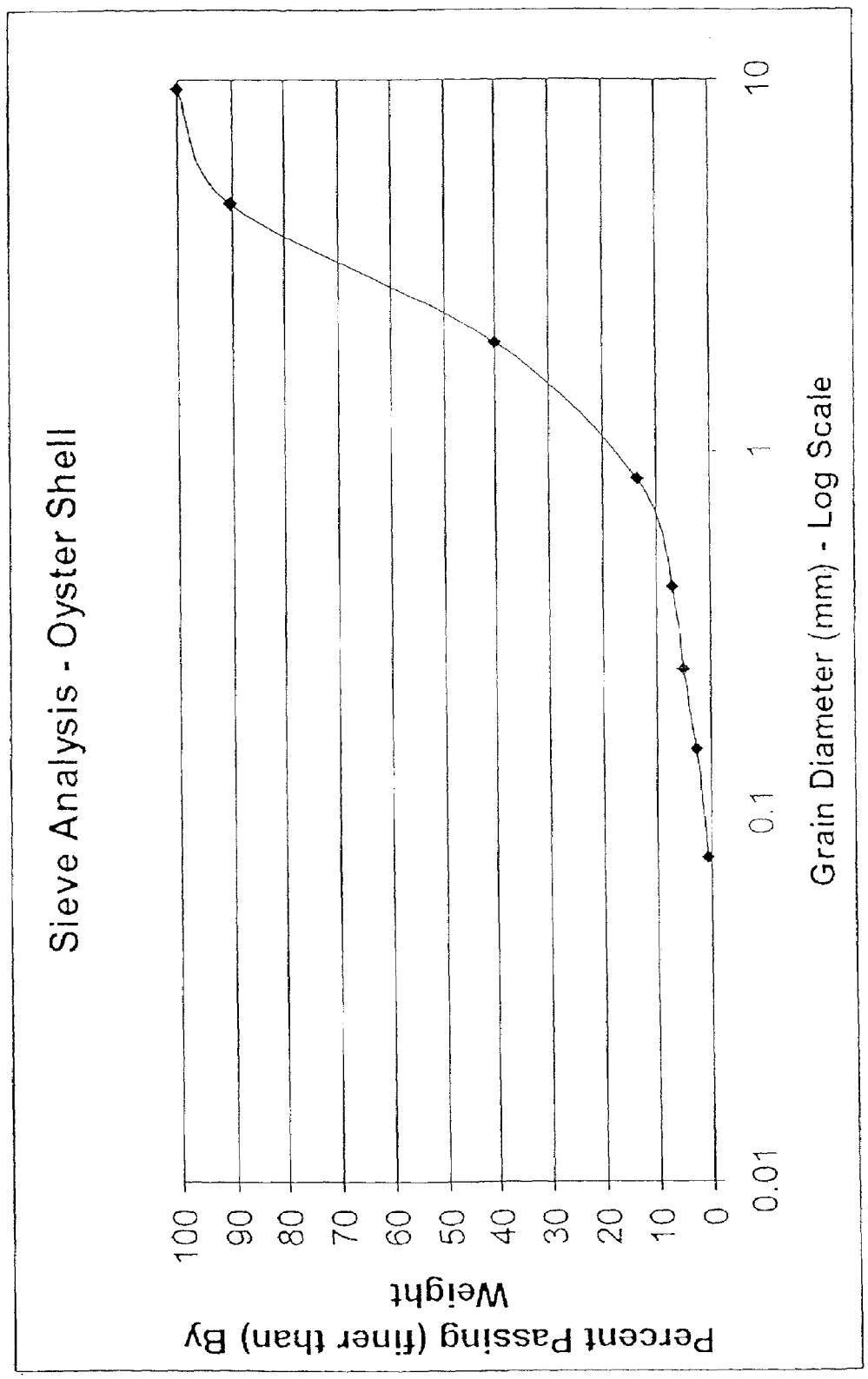
FIG. 20 shows results of a sieve analysis for oyster shell pieces used as buffering material in an embodiment according to the invention.

Sieve analysis of crushed oyster shell used in the bioreactor according to one embodiment is shown in FIG. 20 and in Table 8 below, showing that the discarded material is that which passes US Sieve # 60 (0.25 mm), so that the denitrification bed is composed substantially of oyster shell pieces of size greater than 0.25 mm.

TABLE 8

Sieve analysis of crushed oyster shell
used in the bioreactor
Sample Size = 706.4 g

| Sieve # | Sieve Size (mm) | Sieve Wt. (g) | Sieve Wt. + Material (g) | Wt. of Material Retained (g) | Percent Retained (%) | Accum. % Retained | Percent Passing (%) |
|---|---|---|---|---|---|---|---|
| 3/8 | 9.5 | 535.30 | 535.30 | 0.00 | 0.00 | 0.00 | 100.00 |
| # 4 | 4.75 | 474.00 | 542.70 | 68.70 | 9.73 | 9.73 | 90.27 |
| # 10 | 2 | 427.80 | 782.50 | 354.70 | 50.21 | 59.94 | 40.06 |
| # 20 | 0.85 | 382.90 | 570.80 | 187.90 | 26.60 | 86.54 | 13.46 |
| # 40 | 0.425 | 387.50 | 432.10 | 44.60 | 6.31 | 92.85 | 7.15 |
| # 60 | 0.25 | 378.00 | 393.00 | 15.00 | 2.12 | 94.97 | 5.03 |
| # 100 | 0.15 | 312.70 | 329.10 | 16.40 | 2.32 | 97.30 | 2.70 |
| # 200 | 0.075 | 285.00 | 298.80 | 13.80 | 1.95 | 99.25 | 0.75 |
| Pan | — | 361.50 | 366.80 | 5.30 | 0.75 | 100.00 | 0.00 |
| SUM | | | | 706.4 | 100.00 | | |

The interplay of (a) the size of the sulfur pellets, (b) the size of the crushed oyster shell pieces, and (c) the rate of release of alkalinity, in general terms, can be described as follows:

The head loss in a porous-media bed is primarily governed by the material with the lowest diameter. In this case, it is prudent to form a bed where the electron donor (sulfur) has the lowest diameter. The effective size ($d_{10}$) of the electron donor is 0.327 mm. The buffer material preferably has an effective size higher than the electron donor so that it does not adversely impact the total head loss. Embodiments according to the invention are chosen to have a buffer material (oyster shell pieces) that has an effective size that is almost double that of the electron donor. The buffer material is preferably able to (i) keep the pH of unstressed water above neutral after attaining equilibrium with the partial pressure of carbon dioxide in the atmosphere, and (ii) release alkalinity at a rate greater than or equal to 10 mg/L as $CaCO_3$ per day so that if acid ($H^+$) is continuously added to the system at a rate of 1.25 milliequivalent/hour/gram of buffer, it is able to keep the pH above neutral and maintain an alkalinity in the bioreactor >30 mg/L as $CaCO_3$ at all times. FIGS. 16, 19 and 20 and Tables 6, 7 and 8 demonstrate that the size and buffering capacity of the material chosen according to the invention meet both the objectives described above and the size range of the buffer material vis-à-vis the electron donor is preferred for the desired application (such as, for example, denitrification and/or perchlorate reduction).

Regarding the hydraulics and frequency of backwash, when the proposed technology is used in a passive system, it is desirable for maintenance requirements to be minimal. If the electron donor (for example, sulfur) and the buffer material (for example, oyster shell pieces) are packed in a 3:1 v/v ratio, and if the mass of the electron donor added is stoichiometrically calculated to be sufficient to denitrify influent wastewater (at the known volumetric flow rate and nitrate-nitrogen concentration) for at least two years before the bed needs to be replenished with electron donor and/or buffer, then the only maintenance action that needs to be taken is backwashing the bed to dislodge microorganisms that grow in the bioreactor and clog the pores of the bed. Backwashing can be conducted annually to prevent any deterioration in the denitrification efficiency of the bed. At the time of backwashing, the Minimum Fluidization Velocity is determined based on (i) density of the electron donor, (ii) size distribution of the electron donor, and (iii) temperature of backwash water. Once the Minimum Fluidization Velocity is determined, the backwash velocity can be calculated to expand the bed by a predetermined amount (usually 10-15%) by using the approach outlined by Cleasby and Fan [(1982): Cleasby, J. L. and Fan, K. (1982), "Predicting Fluidization and Expansion of Filter Media", J. of the Environmental Engineering Division, ASCE, 108, EE3, pp. 455-472.] and Dharamarajah and Cleasby [(1986): Dharamarajah, A. H. and Cleasby, J. L. (1986), "Predicting the Expansion of Filter Media", J. American Water Works Association, 78, 12, pp. 66-76].

Figure 21:
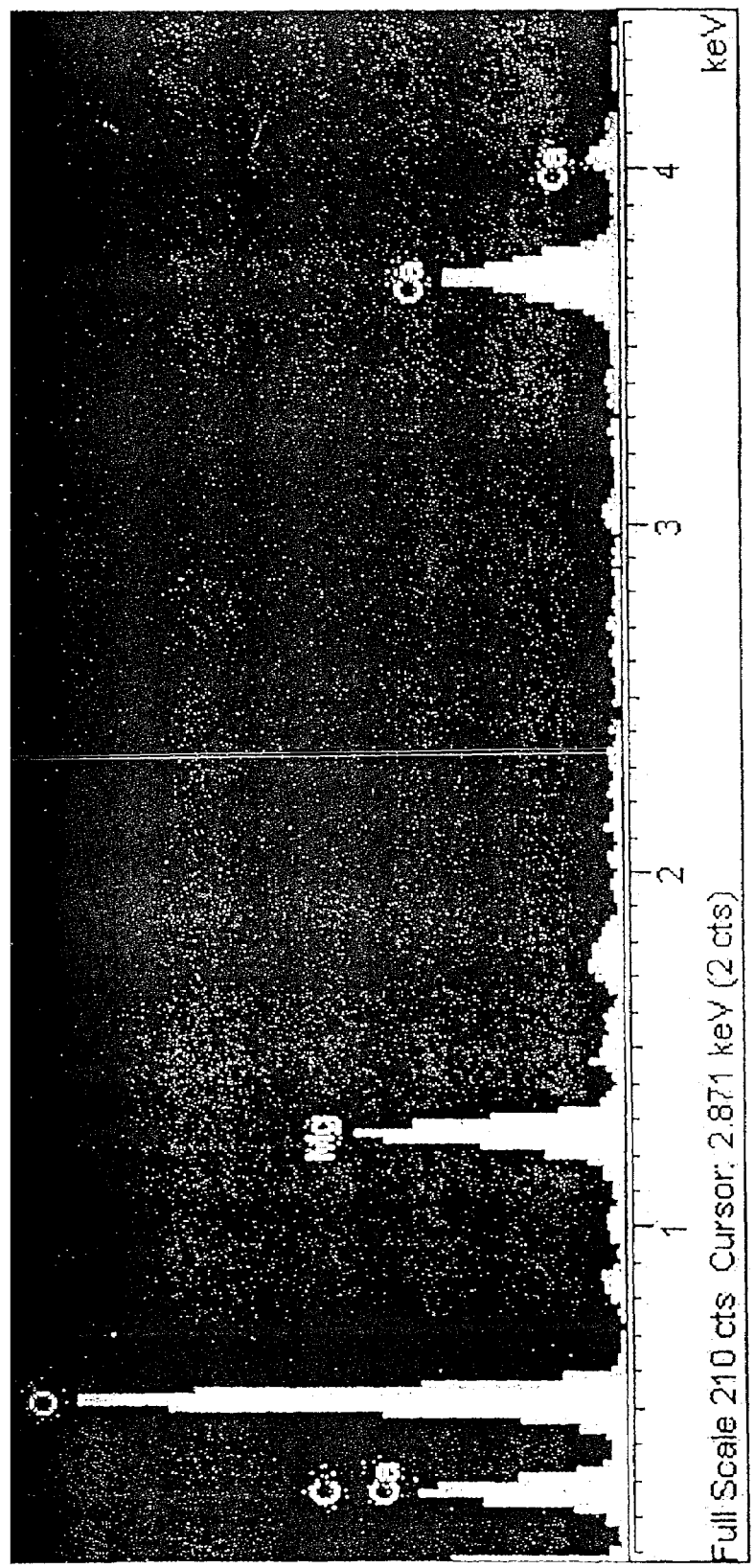
FIG. 21 is an energy dispersive x-ray (EDX) spectrum for marble, showing peaks for calcium (Ca), Magnesium (Mg), Oxygen (O) and Carbon (C).
Figure 22:
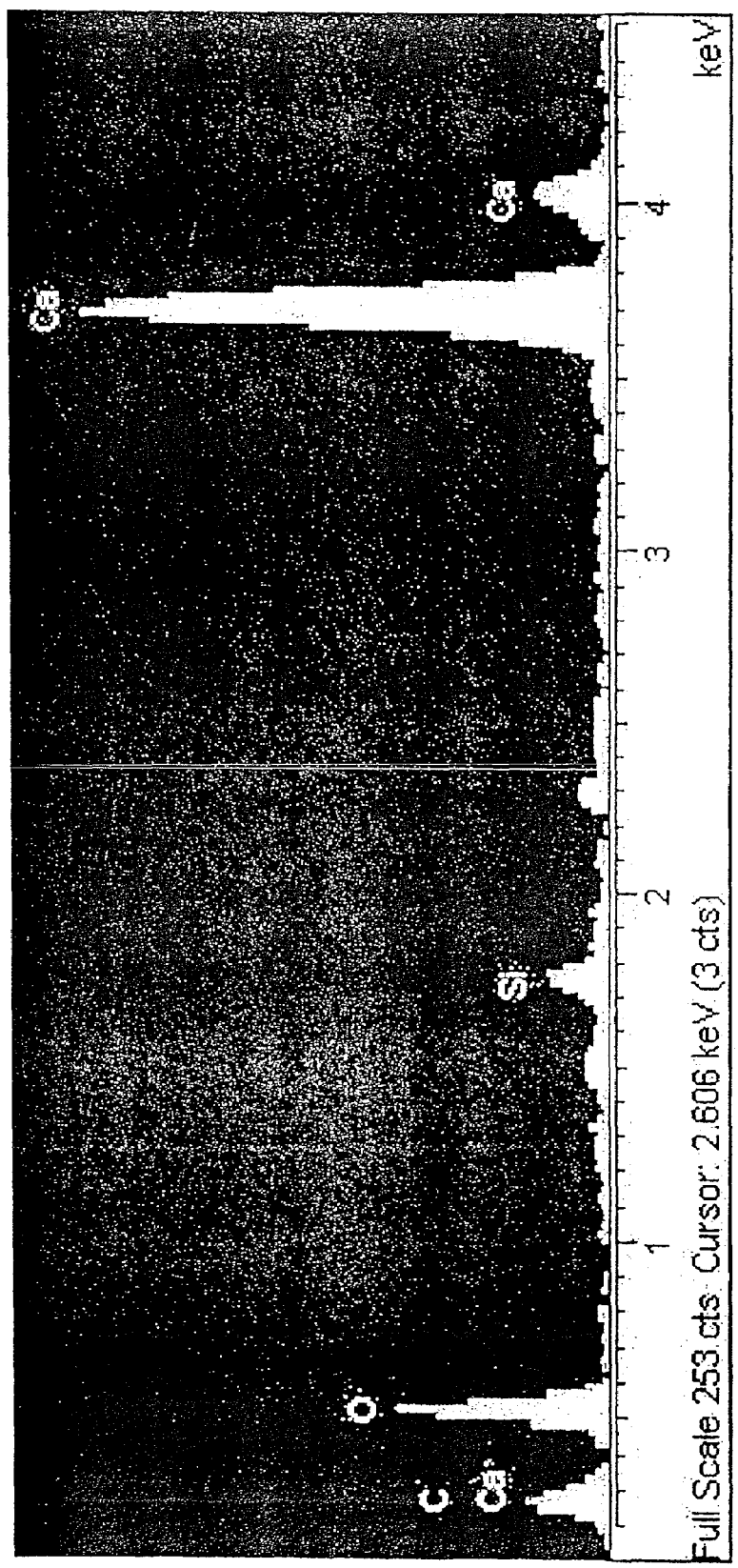
FIG. 22 is an energy dispersive x-ray (EDX) spectrum for oyster shell, showing peaks for calcium (Ca), Silicon (Si), Oxygen (O) and Carbon (C).

Because operational evaluations have shown that oyster shell pieces provide a more suitable solid-phase buffering agent than marble chips, additional investigations were performed to understand this phenomenon. FIG. 21 provides graphical result of Energy Dispersive X-Ray Analysis (EDX) for Marble chips, FIG. 22 provides the same for crushed oyster shells, and FIG. 23 for limestone, with Tables 9-11 below showing respective numerical values.

FIG. 21, an EDX analysis of marble chip, and Table 9, below, show the Elemental Weight % of Constituents in Marble Chip, where Mg/Ca weight % ratio is 8.98/12.9=70% and the Ca/C weight % is 12.9/19.98=65%.

TABLE 9

Marble EDX analysis

| Element | App Conc. | Intensity Corrn. | Weight % | Weight % Sigma | Atomic % |
|---------|-----------|------------------|----------|----------------|----------|
| CK      | 1.58      | 0.7273           | 25.80    | 2.57           | 33.62    |
| OK      | 3.48      | 0.6843           | 60.15    | 2.55           | 58.84    |
| MgK     | 0.44      | 0.6438           | 8.10     | 0.83           | 5.21     |
| CaK     | 0.49      | 0.9851           | 5.95     | 0.61           | 2.33     |
| Totals  |           |                  | 100.00   |                |          |

FIG. 22, an EDX Analysis of Crushed Oyster Shell, and Table 10, below, show the Elemental Weight % of Constituents in Crushed Oyster Shell, where Mg/Ca weight % is 0/28.71=0% and the Ca/C weight % is 28.71/12.85.

TABLE 10

Oyster shell EDX analysis

| Element | App Conc. | Intensity Corrn. | Weight % | Weight % Sigma | Atomic % |
|---------|-----------|------------------|----------|----------------|----------|
| CK      | 0.93      | 0.8099           | 12.85    | 2.46           | 19.85    |
| OK      | 2.09      | 0.4153           | 56.54    | 2.97           | 65.60    |
| SiK     | 0.14      | 0.8353           | 1.90     | 0.45           | 1.25     |
| CaK     | 2.62      | 1.0188           | 28.71    | 2.01           | 13.30    |
| Totals  |           |                  | 100.00   |                |          |

Figure 23:
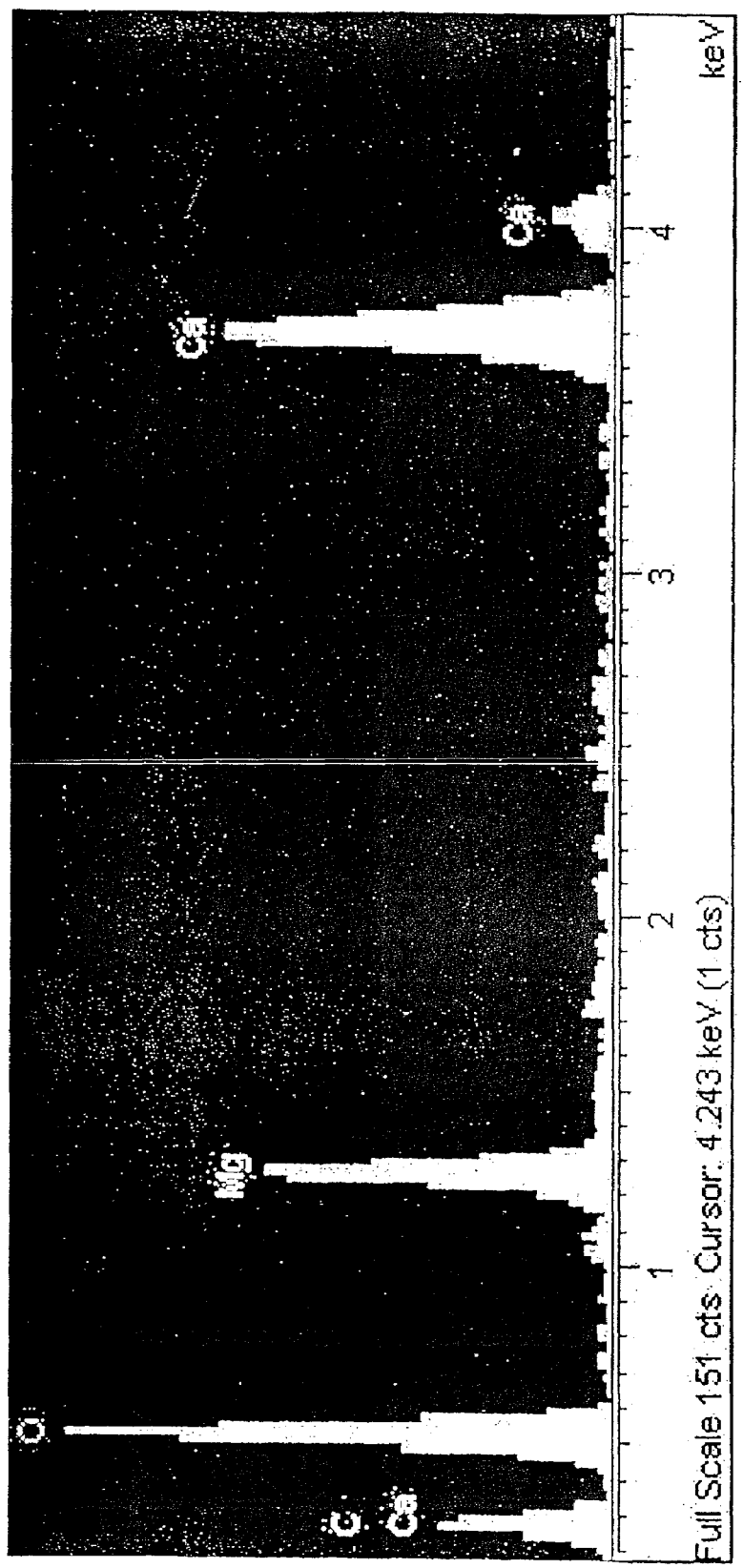
FIG. 23 is an energy dispersive x-ray (EDX) spectrum for limestone, showing peaks for calcium (Ca), Magnesium (Mg), Oxygen (O) and Carbon (C).

FIG. 23, an EDX analysis of limestone, and Table 11, below, show the elemental weight % of constituents in limestone, where the Mg/Ca weight % is 8.1/5.95=136% and Ca/C weight % is 5.95/25.8=23%.

TABLE 11

Limestone EDX analysis

| Element | App Conc. | Intensity Corrn. | Weight % | Weight % Sigma | Atomic % |
|---------|-----------|------------------|----------|----------------|----------|
| CK      | 1.31      | 0.6963           | 19.98    | 2.50           | 27.78    |
| OK      | 3.22      | 0.5875           | 58.13    | 2.65           | 60.67    |
| MgK     | 0.54      | 0.6382           | 8.98     | 0.93           | 6.17     |
| CaK     | 1.21      | 0.9940           | 12.90    | 1.03           | 5.37     |
| Totals  |           |                  | 100.00   |                |          |

Figure 24:
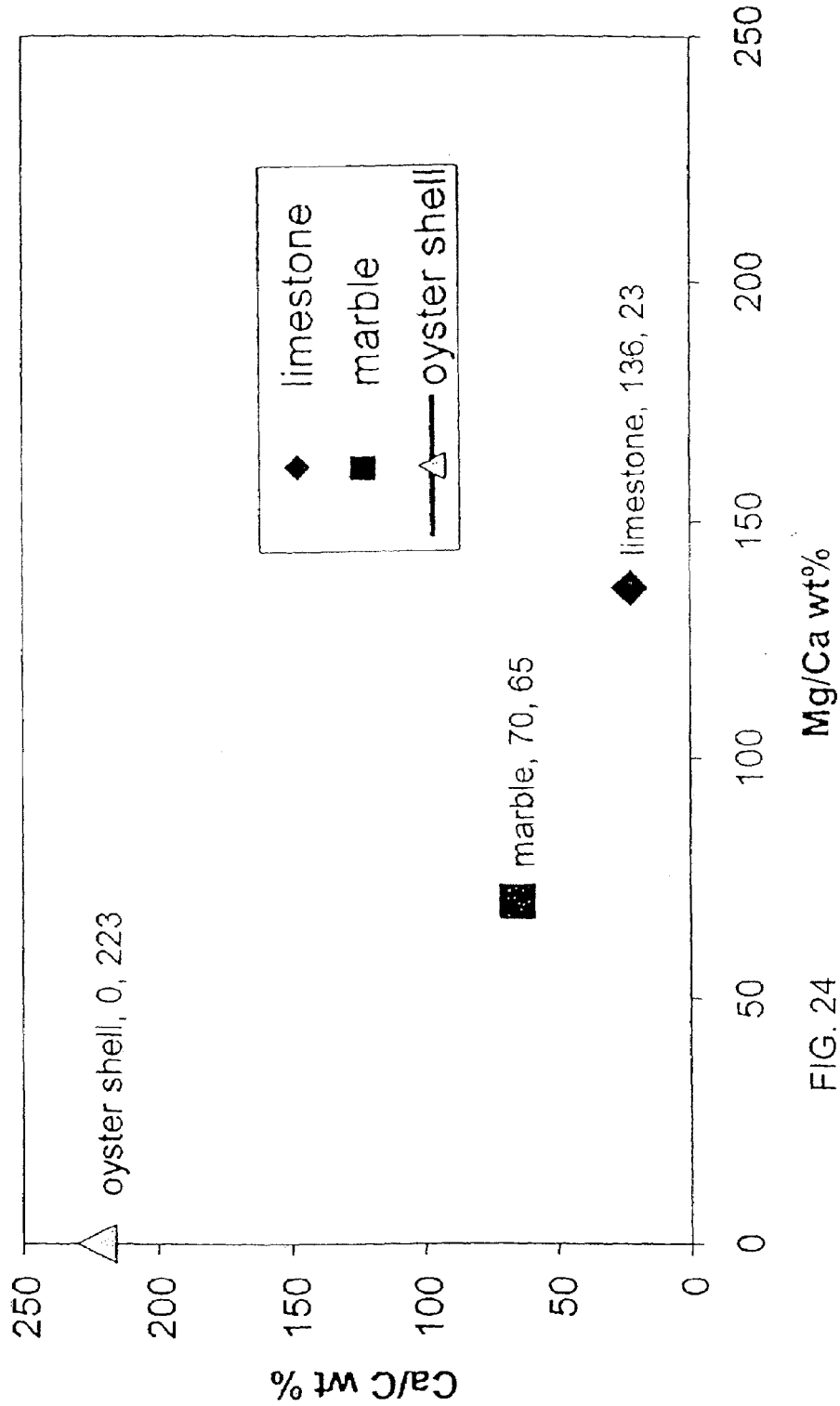
FIG. 24 shows the weight percentage ratio of calcium to carbon plotted against the weight percentage ratio of magnesium to calcium for marble chips, oyster shell and limestone, based on the data in Tables 9, 10 and 11, as determined by energy dispersive x-ray (EDX).

Taking the weight percentages of Mg/Ca and Ca/C as coordinate pairs, these results can be plotted in FIG. 24 to show relative differences in chemical composition between oyster shell and marble and limestone, respectively. Thus, a preferred buffering material, as demonstrated by the oyster shell pieces, can have Mg/Ca less than about 65% by weight % and/or Ca/C by weight % greater than 70%, can have, preferably, Mg/Ca less than 50% and/or Ca/C greater than 75%, more preferably Mg/Ca less than 30% and/or Ca/C greater than 150%, and more preferably Mg/Ca less than 15% and/or Ca/C greater than 200%.

From FIGS. 21-24 it is clear that marble chips constitute a high percentage of $Mg(OH)_2$ and $CaCO_3$ whereas crushed oyster shell is overwhelmingly just $CaCO_3$, predominantly in the form of aragonite associated with a biopolymer matrix. Similar to marble, limestone can be relatively high in Mg weight % compared to the oyster chips, particularly high-dolomite limestone; however, even high-calcium-content limestone is not composed of $CaCO_3$ mainly in the form of aragonite and limestone lacks the biopolymer matrix. At the near-neutral pH prevalent in the bioreactor (FIG. 16), $CaCO_3$ (or more precisely, the $HCO_3^-$ that results from Equation 4 below) is a much better buffering agent than $OH^-$.

$$CaCO_3(s) \rightarrow Ca^{2+} CO_3^{2-} \qquad (5)$$

$$CO_3^{2-} + H^+ \rightarrow HCO_3 \qquad (6)$$

Figure 25:
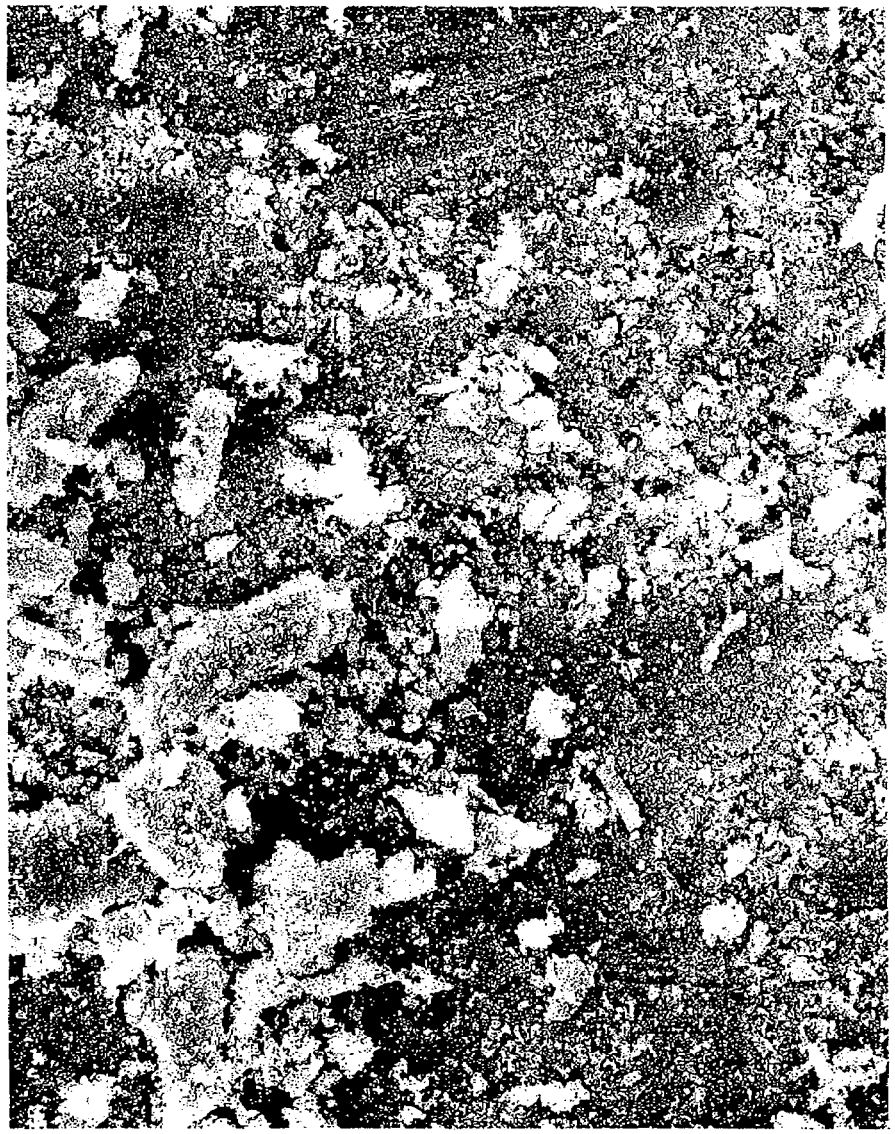
FIG. 25 is a scanning electron microscope (SEM) microphotograph at 1000× magnification of crushed oyster shell used as buffering material according to an embodiment of the invention, showing nanoflake structures comprising calcium carbonate, where the scale bar shown is 10 microns.
Figure 26:
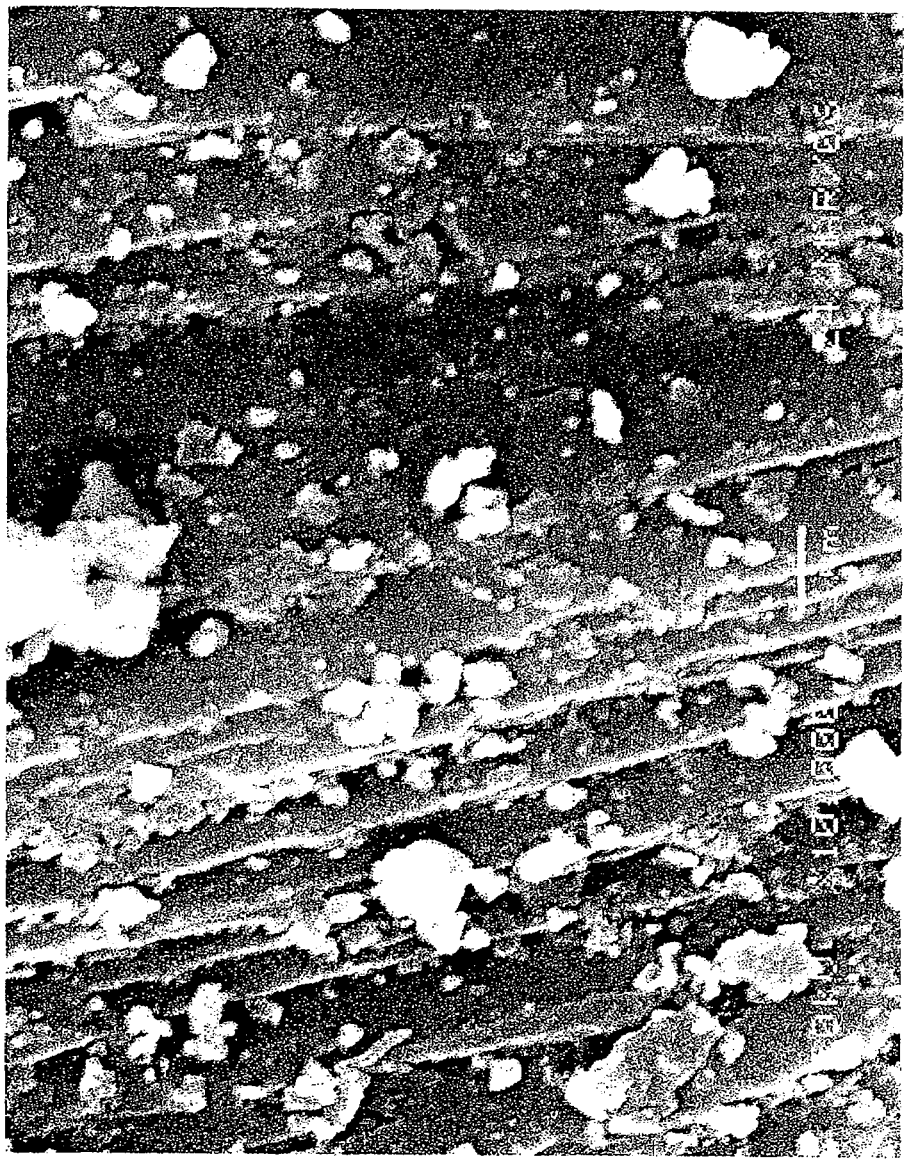
FIG. 26 is a scanning electron microscope (SEM) microphotograph at 10,000× magnification of crushed oyster shell used as buffering material according to an embodiment of the invention, showing nanoflake structures comprising calcium carbonate, where the scale bar shown is 1 microns.

A Scanning Electron Microscope (SEM) analysis of the crushed oyster shell indicates that the surface has nanoflakes present. FIG. 25 is a SEM microphotograph at 1000× magnification and FIG. 26 is a SEM Microphotograph at 10,000× of Crushed Oyster Shell. This nanoflake characteristic contributes to the faster buffering action of crushed oyster shells relative to marble chips, particularly during initial operation. Also, because this nanoflake structure is present throughout the oyster shell, and partially bound within a biopolymeric matrix, the oyster shell exhibits a longer-lasting buffering action relative to limestone, where the limestone can dissolve too rapidly.

In embodiments according to the invention, there is no need for any modification of oyster shell. Since the reactor is a packed bed without an aeration device, there is little agitation of the bed and no strong turbulence to shear off the microbial layer.

An estimate is that >50% of the weight of the unmodified crushed oyster shell is nanoflakes of calcium carbonate. Cutting a cross section of the shell, one can find layers of nanoflakes separated by sheets of biopolymers, such as chitin, lustrin, conchiol, etc. that are secreted by the mollusk (known also as the mother-of-pearl layer).

This combination of elastic biopolymers and nanoflakes (of calcium carbonate) makes the composite material strong and resilient. This is in contrast to material with limestone, which has only calcium carbonate. When limestone comes in contact with water, it dissolves much faster than crushed oyster shells, losing calcium carbonate that is essentially wasted (e.g., lost too quickly to be used chemically to buffer alkalinity in the reactor).

Crushed oyster shell, a choice of buffering material according to one embodiment of the invention, is better suited than marble chips because oyster shell is almost completely calcium carbonate, whereas marble chips are a mixture of calcium carbonate and magnesium hydroxide and, in the pH range where buffering action is desired, calcium carbonate is a stronger buffer than magnesium hydroxide. Moreover, owing to the presence of nanoflakes of calcium carbonate in the crushed oyster shell, the rate of release of calcium carbonate from the surface of the oyster shell pieces is much faster than the rate of release of calcium carbonate and magnesium hydroxide from marble chips.

Regarding the buffering action of oyster shell versus limestone (noting that limestone is also mainly calcium carbonate, sometimes containing dolomite, which in turn contains Mg), while both contribute to maintaining bioreactor pH, oyster is better in maintaining higher alkalinity. This alkalinity is also important from the point of view of the carbonate being the carbon source for the microorganisms where sulfur is the substrate electron donor. However, the biggest disadvantage with limestone is that when it dissolves, it makes the solution very turbid. In other words, limestone disintegrates rapidly upon dissolution, giving rise to micro-particulates, which can potentially cause two problems:

(1) Limestone will exhaust faster, and it is also wasted because the micro-particulates simply exit with the effluent.

(2) Some of the bigger particulates (of disintegrated limestone) can clog the pores of the bioreactor, necessitating more frequent backwashing, which reduces operational effectiveness.

Considering these two reasons together, as well as the fact that oyster shell is a waste product (which limestone is not), crushed oyster shell is a preferred material for this technology controlling alkalinity according to preferred embodiments of the invention.

A preferred treatment to kill any undesirable bacteria that may be present in the oyster shell prior to introducing it to the media is to heat the oyster shell (at about 250 degrees F. or higher). Shells can be obtained from numerous companies that supply crushed oyster shell to chicken farms (bulk price≈$100/ton) such as, for example as is available from Kings Supply Company (Manchaug, Mass.), which sells crushed oyster shell with composition expressed as calcium (Ca) 38-40%, expressed as calcium carbonate ($CaCO_3$) no less than 96%, and expressed as calcium oxide (CaO) about 54%. Sterilized crushed oyster shell can be easily stored at room temperature for many years.

A preferred synthetic, man-made substitute for crushed oyster shells according to a further embodiment of the invention can be a polymeric ion-exchange resin. This material can comprise spherical beads, with diameter of about 0.4 mm to 0.6 mm. A particular kind of ion-exchange (IX) resin, termed weak-acid cation exchanger can be synthesized that is pre-loaded with an innocuous cation (such as $Na^+$). This ion-exchange resin can scavenge $H^+$ from water through the following reaction:

$$\overline{R^-Na^+} + H^+ \rightarrow \overline{R^-H^+} + Na^+ \qquad (7)$$

where the overbar denotes the resin (solid) phase.

Thus the resin exchanges hydrogen with sodium, i.e., the hydrogen ion generated is transferred to the surface of the resin (solid phase) whereas sodium ion is released from the surface of the resin to the water phase. This exchange is always on an equivalent basis. Typically, these resins have an exchange capacity of 3.0-4.0 milliequivalent/gm and cost about $200/ft$^3$. These resins can be regenerated upon exhaustion (with a strong base and salt) and can be used easily for 50-60 cycles. Normalizing cost on the basis of buffering capacity ($/equivalent of $H^+$ scavenged), and factor in the cost of regeneration, the resin is seen to be at least 5 times more expensive than crushed oyster shells.

A stoichiometric equation for biological perchlorate reduction using elemental sulfur as an electron donor can be derived as:

$$2.9S^0 + 3.33H_2O + ClO_4^- + 1.8CO_2 + 0.46HCO_3^- + 0.46NH_{4+} \rightarrow 5.7H^+ + 2.9SO_4^{2+}Cl^- + 0.46C_5H_7O_2N \qquad (8)$$

Since the thermodynamic values of energy gained by sulfur oxidizing microorganisms from nitrate and perchlorate are close to each other (−91 KJ/e$^-$ and −113 KJ/e$^-$, respectively), perchlorate reduction was evaluated using the denitrifying microbial consortium and $S^0$ as the electron donor. A preferred embodiment provides for enriching cultures of sulfur oxidizing perchlorate reducing organisms in a bioreactor. Further batch culture evaluations have been conducted with this microbial consortium as well as bioreactor evaluations with synthetic groundwater and culture-independent techniques can be used to characterize the microbial community.

SUPeRB cultures were enriched from a denitrifying wastewater inoculum in anoxic flasks with perchlorate (4.5 mg/L), elemental sulfur pellets (Georgia Gulf Sulfur, Bainbridge, Ga.), crushed oyster shells (as an alkalinity source), nutrients and trace elements in local groundwater. Mixed-liquor suspended solids (MLSS) from the denitrifying zone of a local wastewater treatment plant (Lansboro, Mass.) were used as inoculum.

Figure 27A:
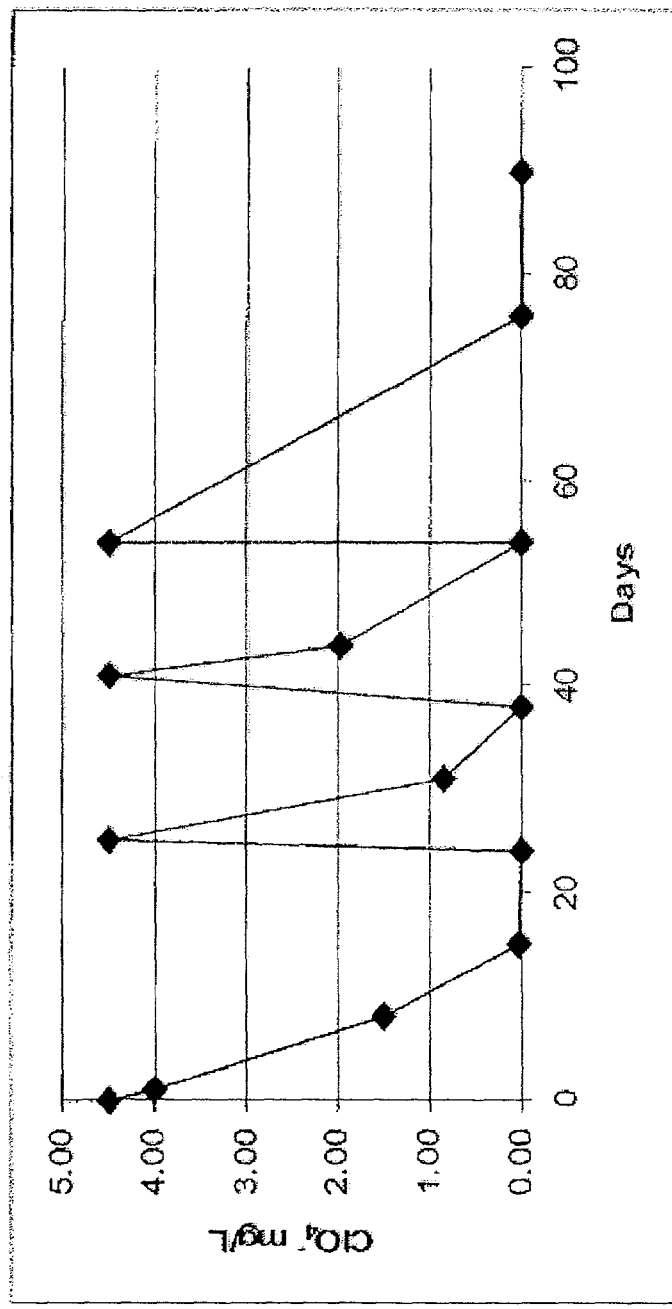
FIG. 27A shows perchlorate enrichment culture with sulfur as an electron donor, showing acclimation of a denitrifying inoculum to perchlorate as an electron acceptor.

Batch cultures were set up in 1000 mL Erlenmeyer flasks containing sulfur pellets (30 g), crushed oyster shell (10 g), 250 mL MLSS, and 250 mL of synthetic perchlorate contaminated groundwater. The cultures were incubated with agitation at 150 rpm in the dark at 20° C. Groundwater (Amherst, Mass.) was used to prepare synthetic groundwater medium containing 5 mg/L $ClO_4^-$, 0.5 g/L $NaHCO_3$, 8.5 mg/L $KH_2PO_4$, 21.75 mg/L $K_2HPO_4$, 33.4 mg/L $Na_2HPO_4.7H_2O$, 22.5 mg/L $MgSO_4.7H_2O$, 0.25 mg/L $FeCl_3.6H_2O$ and 27.5 mg/L $CaCl_2$. N2 gas was periodically sparged through the cultures to maintain anaerobic conditions. The cultures were monitored for perchlorate concentration over time. Perchlorate was reduced from 4.5 mg/L to less than 0.5 mg/L in about 15 days. FIG. 27A shows acclimation of a denitrifying inoculum to perchlorate as an electron acceptor. The flask was then spiked with perchlorate to the original concentration and sparged with $N_2$ to maintain anaerobic conditions. This procedure was repeated each time perchlorate concentration was reduced to below 0.5 mg/L. The data indicate that perchlorate can be biologically reduced by denitrifying cultures using $S^o$ as an electron donor. These results are comparable to those observed for nitrate reduction (Lopez-Luna et al., 2005). Stable perchlorate degradation is observed after one year of repeated spiking.

The cultures were transferred to a standard American Waterworks Association mixture of synthetic ion exchange (IX) brine containing $S^o$/oyster shell and 30 g/L NaCl. Perchlorate was reduced from 12 to <0.1 mg/L in approximately 20 days. The high salt cultures were spiked with perchlorate concentrations typical of IX brines (10-20 mg/L) four times over a period of one year and stable perchlorate reduction was observed. No perchlorate disappearance was observed in experimental controls.

Following the above-described batch culture evaluations, flow-through packed bed column studies with environmentally relevant mixed cultures were used to investigate the potential of the SUPeRB system for perchlorate remediation. Table 12, below, shows the experimental program used to investigate the following bioreactor operating parameters: perchlorate concentration, recirculation rate, EBCT, particle size and the presence of nitrate as a co-contaminant. During the Phase I evaluation, the synthetic groundwater used to feed the bioreactor was the same as was used in the enrichment evaluation (above). During Phase II, the synthetic groundwater was diluted with additional groundwater to achieve the target concentration of 0.08-0.12 mg/L.

TABLE 12

Experimental program for operation of packed bed reactors

| Experimental Phase | Perchlorate conc. (mg/L) | EBCT hrs | Recirculation ratio | $S^o$ particle size |
|---|---|---|---|---|
| Phase I | 5-8 | 13-100 | Intermittent at 37-1580 | 4 mm |
| Phase II | | | | |
| Reactor 1 | 0.08-0.12 | 25-30 | 52, 1016 | 4 mm |
| Reactor 2 | 0.08-0.12 ($NO_3^-$—N 10 mg/L) | 8-30 | None | 4 mm |
| Reactor 3 | 0.08-0.12 | 8-30 | None | 0.85 mm |

Samples were prepared for perchlorate analysis by filtering through 47 mm Millipore glass fiber filter. Perchlorate was analyzed using USEPA Method 314.0 (USEPA, 1999).

Phase I: Bioreactor Performance at High Perchlorate Concentrations in the Influent For Phase I evaluations, high level perchlorate concentrations were measured using a DX-500 Ion Chromatograph (IC) system (Dionex, Sunnyvale, Calif.) equipped with an Ionpac AS16 column, an AG16A guard column, and a $CD_{20}$ conductivity detector. The eluent used was 35 mM NaOH at 1 mL/min. The detection limit was 0.5 mg/L.

A bench-scale bioreactor (working volume of one liter) was constructed from acrylic glass tubing with an inner diameter of 6.1 cm and a 34 cm in height. Four sample ports, evenly distributed along the height of the reactor, were sealed with septum ports for obtaining profiles of perchlorate vs. depth. Recirculation from the effluent to the influent was provided using a variable speed peristaltic pump. The reactor was packed with 4 mm sulfur pellets (Georgia Gulf Sulfur Corp., Valdosta, Ga.) as the electron donor and crushed oyster shell as an alkalinity source (3:1 by volume). To evaluate the performance of small sulfur granules, elemental sulfur and oyster shell were crushed and sieved to 0.85 mm and were used as a packing material in one of the bioreactors. Four such packed-bed bioreactors were packed in the same manner with sulfur/oyster-shell media, inoculated with SUPeRB enriched from batch cultures and operated in an upflow mode.

Cultures were inoculated into bench-scale packed bed bioreactors filled with sulfur and crushed oyster shell (3:1 v/v). The reactors were operated with influent perchlorate concentrations between 5 and 8 mg/L and varying empty bed contact time (EBCT). The packed-bed bioreactor was inoculated with SUPeRB from the batch cultures and initially operated with a 100 hour EBCT and an influent perchlorate concentration of 5 mg/L (high perchlorate). An acclimation period of approximately 26 days was observed after which a steady effluent perchlorate concentration was observed. Intermittent recirculation was used to improve mass transfer and distribute the biomass. The organisms were able to reduce 8 mg/L perchlorate to less than 0.5 mg/L or the method detection limit (MDL) at the time of these tests at an EBCT of 10 hours. Average removal efficiencies for the high perchlorate concentration experiments at varying EBCTs with and without recirculation are given in Table 13, below.

TABLE 13

Packed bed reactor performance at high perchlorate concentrations

| Days of Operation | EBCT (hrs) | Recirculation velocity at 9.7 cm/min | Average removal efficiency |
|---|---|---|---|
| 1-30 | 100 | No | 66% |
| 31-43 | 100 | Yes | 61% |
| 44-57 | 100 | No | 90% |
| 58-62 | 61 | Yes | 99% |
| 63-68 | 61 | No | 58% |
| 69-129 | 61 | Yes | 96% |
| 130-132 | 36 | Yes | 99% |
| 133-175 | 36 | No | 93% |
| 176-198 | 16 | No | 80% |
| 199-210 | 13 | Yes | 92% |
| 211-258 | 13 | No | 81% |
| 259-268* | 13 | No | 90% |
| 269-280* | 13 | Yes | 90% |

*indicates higher influent concentration of perchlorate (~8 mg/L)

Intermittent recirculation was employed on selected days to promote mass transfer of perchlorate to the biofilm; however, the effect of recirculation on perchlorate removal during this phase was inconclusive. On day 259, the influent perchlorate concentration was raised to ~8 mg/L to challenge the system with higher perchlorate concentrations. The spike had no significant effect on effluent concentration, which resulted in a 96% perchlorate removal efficiency.

Phase II: Bioreactor Performance at Low Perchlorate Concentration in the Influent After conducting the high perchlorate concentration evaluations, the influent perchlorate concentration was decreased to ~100 μg/L (typical of drinking water) and the reactors were operated at varying EBCT with and without recirculation. Low levels of perchlorate concentrations were treated varying two parameters: recirculation ratio and empty bed contact time (EBCT). Little or no recirculation was required to efficiently reduce perchlorate to <4 μg/L. The system also proved somewhat independent of EBCT.

For Phase II evaluations, low-level perchlorate concentrations (0.5-50 μg/L) were measured using the same IC with a 1000 μL injection loop. Samples were manually filtered through ONGUARD® silver (Ag) and barium (Ba) filter cartridges to remove chloride and sulfate. The reporting limit was 4 μg/L. Nitrate was measured using the same IC but with Ionpac AS14 column, AG14A guard column. The eluent was 8.0 mM $Na_2CO_3$/1.0 mM $NaHCO_3$ at 1 mL/min. The lowest reporting limit was 0.01 mg/L $NO_3^-$—N. The pH values were measured using an Orion 720A pH meter.

The contents of the packed bed reactor, including biomass, were divided and mixed with fresh sulfur/oyster shell media to construct two new packed bed reactors (Reactor 1 and Reactor 2). Both reactors were operated at low perchlorate concentrations (80-120 μg/L), more typical of contaminant groundwater levels. Reactor 1 was operated at a constant EBCT of 30 hrs and varying recirculation ratios while Reactor 2 was operated with no recirculation and varying EBCT.

Figure 27B:
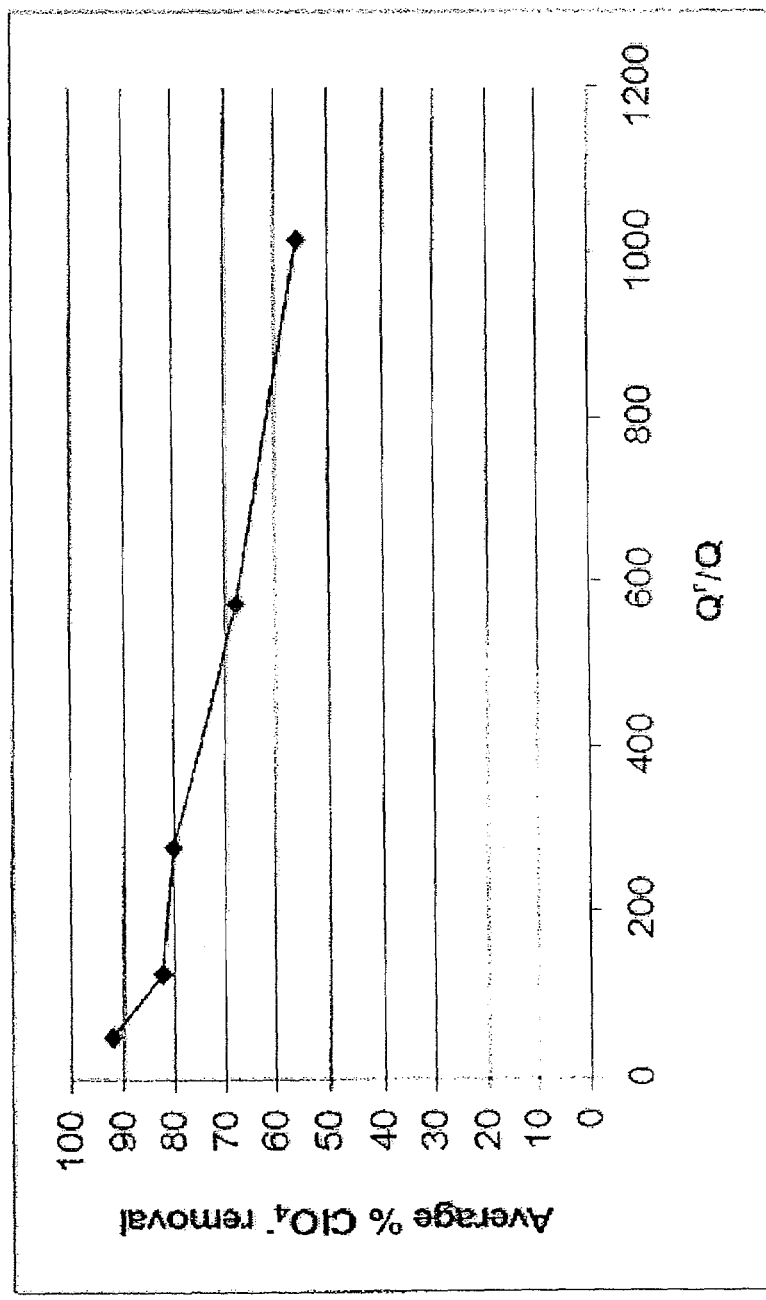
FIG. 27B shows the effect of recirculation velocity on low level perchlorate removal according to an embodiment of the invention, where Qr is the recirculation flow rate and Q is the influent flow rate.

FIG. 27B shows the effect of recirculation ratio on treatment of low perchlorate concentrations at an EBCT of 30 hrs. Decreased removal efficiencies were observed at increased recirculation ratios. Perchlorate reducing bacteria are slow growing autotrophs and the loss of biofilm shearing off from the sulfur pellets under turbulent conditions is thought to have resulted in lower perchlorate removal efficiencies at higher recirculation ratios. The highest removal efficiency (92%) was observed at the lowest recirculation ratio (Qr/Q=52).

Figure 27C:
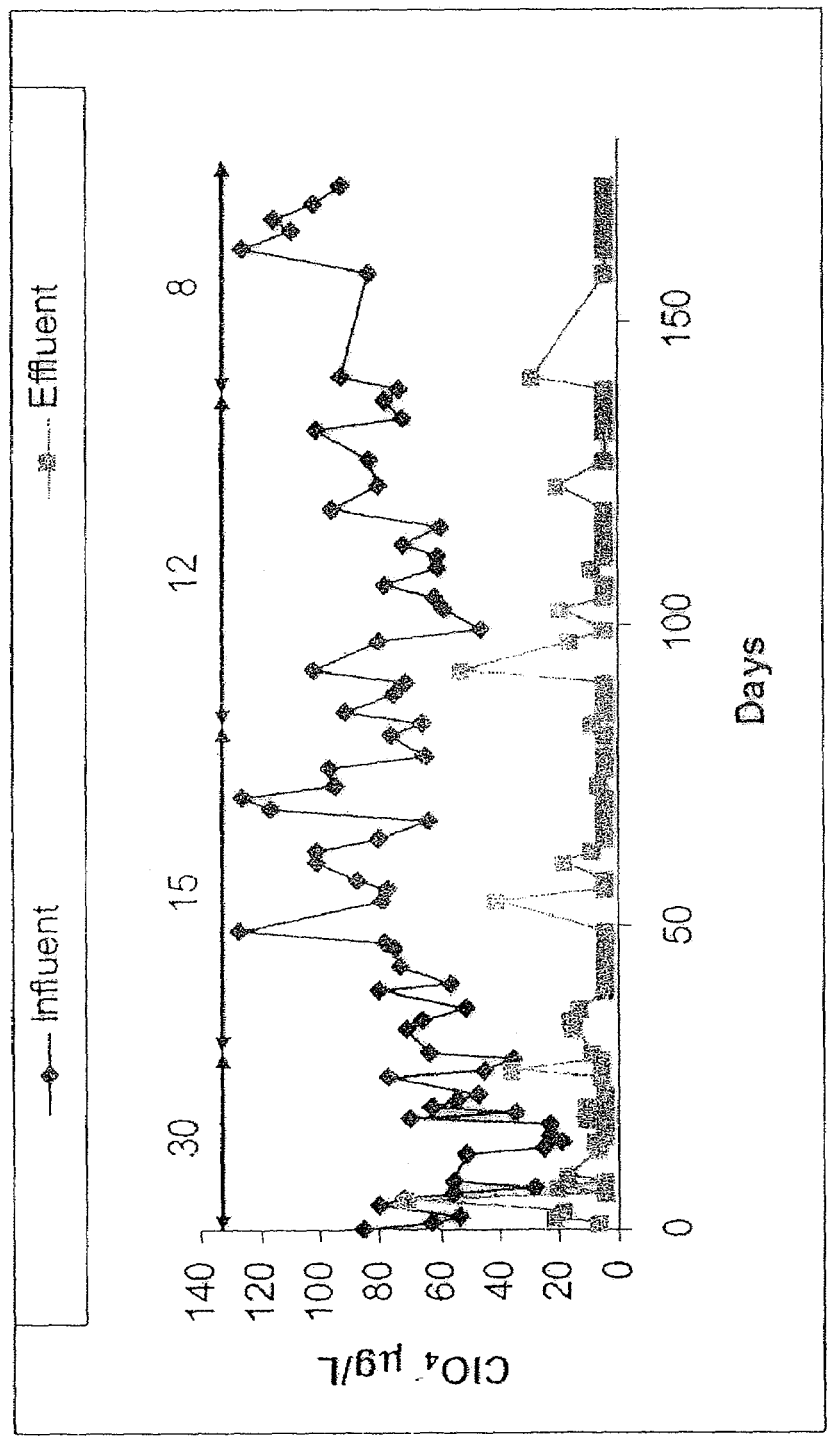
FIG. 27C shows packed bed bioreactor performance according to an embodiment of the invention at varying EBCTs of 30, 15, 12 and 8 hours, respectively, during more than 150 days of operational evaluation (EBCT values are shown above the arrows).

Reactor 2 was used to evaluate low-level perchlorate removal performance at varying EBCT without recirculation. FIG. 27C shows packed bed bioreactor performance at varying EBCTs (EBCT values shown above the arrows). Effluent perchlorate concentrations of <4 μg/L (the MDL) were achieved at an EBCT of 8 hours (FIG. 27C). Perchlorate removal was independent of EBCT and improved over time due to slow biofilm growth. Recirculation hindered perchlorate removal, possibly due to biomass removal by shear forces.

After observation of steady perchlorate removal efficiency at an EBCT of 30 hours, the EBCT was reduced in steps to a final value of 8 hours. Average perchlorate removal efficiencies at EBCTs of 30, 15, 12 and 8 hours were 75%, 90%, 87% and 96%, respectively, showing that removal efficiency was independent of EBCT within this range; but, in general, removal efficiency showed steady improvement over time during operation of the reactor. By the end of 130 days, consistent effluent perchlorate concentrations below an MDL of 4 μg/L were achieved at influent perchlorate concentrations of 80-120 μg/L and an EBCT of 8 hours. The bioreactor was then operated with 100 μg/L perchlorate and 10 mg/L $NO_3$—N.

Reactor 3 was started with SUPeRB from enriched batch cultures, 0.85 mm sulfur and oyster shell packing and an initial EBCT of 22 hours. An influent perchlorate concentration of 0.08-0.1 mg/L was maintained. An average perchlorate removal of 63% was observed in this reactor over an operating period of 54 days.

Figure 27D:
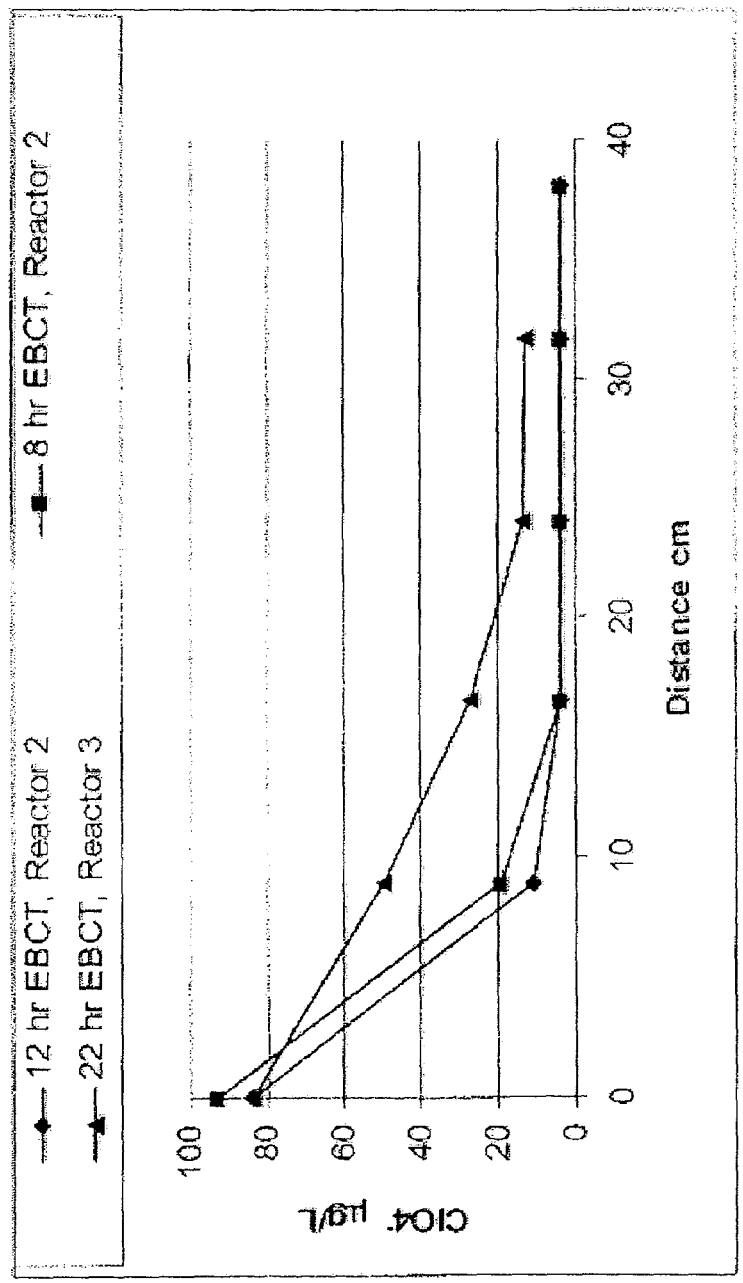
FIG. 27D shows a column profile (progressing upward) of perchlorate concentration (micrograms per liter) for a packed-bed reactor operated at low (0.08-0.1 mg/L) influent perchlorate concentration.

Perchlorate concentration profiles over the length of the column are shown for Reactors 2 at two EBCTs in FIG. 27D. Active perchlorate degradation was observed in the first 10 cm of Reactor 2, closest to the inlet, suggesting that most bacteria resided and formed biofilms where the electron acceptor was readily available and that there was little change in the concentration profile when the EBCT was decreased. The column profile for a 22-hour EBCT in Reactor 3 (FIG. 27D) shows that perchlorate was reduced from 84 μg/L to 13 μg/L over the entire length of the column. This profile was taken only a few days after the start of the evaluation, suggesting that in the early stages of biofilm growth the entire reactor is utilized for perchlorate reduction.

Empty bed contact times for perchlorate reduction can be in the range of 2 to 100 hours, and preferably can be in the range of 5 to 65 hours, and more preferably can be in the range of 8 to 40 hours.

A number of common genera of soil and sediment bacteria can use perchlorate as a terminal electron acceptor under anoxic conditions, and reduce perchlorate via chlorate to chlorite and finally disproportionate chlorite to chloride and oxygen. A widely accepted pathway for dissimilatory perchlorate reduction into innocuous chloride is as follows:

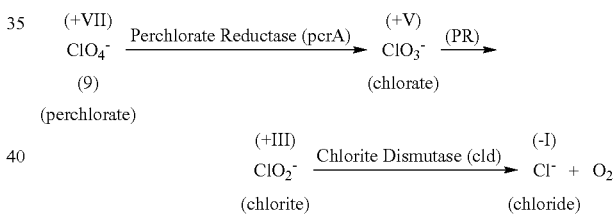

where the Roman numerals indicate the formal oxidation state of chlorine above each chemical species. None of the intermediates accumulate in solution. Genetic probes are available for some of the genes that code for enzymes supporting steps in this pathway.

Perchlorate degraders are ubiquitous in the environment, related to their diverse metabolic capabilities and to the widespread occurrence of perchlorate, which is believed to also originate from natural sources, as it is found in rain and snow. As perchlorate reducing bacteria are also capable of growth utilizing a diverse range of electron donors, bioaugmentation is not required for in situ bioremediation strategies in most environments. A wide variety of perchlorate-degrading strains have been isolated, many of which belong to the genera *Dechloromonas, Azospira* (formerly *Dechlorosoma*), and *Dechlorospirillum* [Achenbach et al., 2001; Zhang et al., 2002]. The majority of known perchlorate reducers today are closely related to members of the α- and β-proteobacteria.

Figure 28:
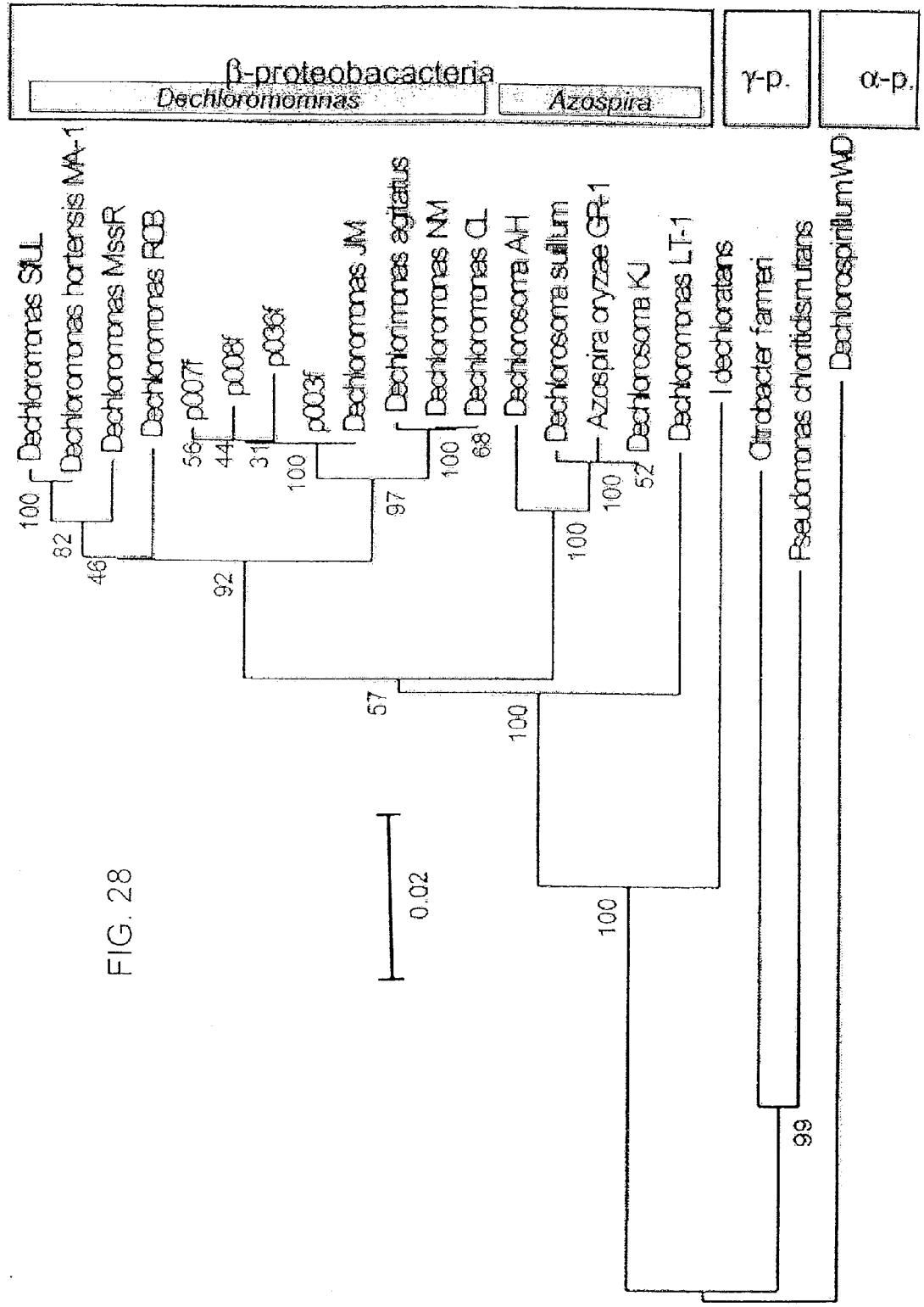
FIG. 28 shows phylogenetic relationship of the 16S rRNA clone library of the perchlorate degrading enrichment, showing four clones identified by pXXXf and with sequences from known perchlorate reducers added from GenBank.

As shown in FIG. 28, a phylogenetic tree of the enrichment culture was created, and its members were found to exhibit close relationship with the genera *Dechloromonas* (β-proteobacteria) and *Dechlorospirillium* (α-proteobacteria), which are considered to represent the most dominant perchlorate reducing bacteria in the environment (Table 15, below). FIG. 28 shows the phylogenetic relationship of the 16S rRNA clone library of the perchlorate degrading enrichment. Here, 4 clones are identified by pXXXf. Sequences from known perchlorate reducers are shown, added from GenBank. Sequences with a distinct similarity to the phyla Firmicutes and Bacteroidetes were also detected. These phyla contain denitrifiers and may be expected in wastewater. The bacterial community found in this culture maintains high diversity. This is thought to be due to the survival of non-perchlorate reducers protected in biofilm present on the sulfur and/or oyster shells. Alignment was accomplished with BioEdit™ v. 5.0.9 software and the phylogenetic tree was inferred by Minimum Evolution analysis and created with MEGA 3.1™ software.

Table 14, below, gives the microbial community composition of the enrichment culture according to an embodiment of the invention as identified by 16S rRNA analysis. Phylogenetic characterization of the enrichment used indicated that members of the phylum Proteobacteria dominate the population, which is expected because the capability to reduce perchlorate is widespread within this group.

TABLE 14

Composition of the enrichment culture as identified by 16S rRNA analysis, by percentage.

| Microbe (type, family, phylum) | (%) |
|---|---|
| Genera_incertae_sedis_TM7 | 3.2 |
| Bacteroidetes | 16.1 |
| Firmicutes | 16.1 |
| Proteobacteria | 45.2 |
| unclassified Bacteria | 19.4 |

Table 15 shows classes identified within the phylum proteobacteria. (Note that *Dechlorosoma* was recently renamed *Azospira* I. and *I. dechloratans, Ideonella dechloratans*, respectively). The β-proteobacteria, followed by the α and ε classes, represent the largest class within the group Proteobacteria.

TABLE 15

Classes identified within the phylum Proteobacteria and percent prevalence.

| Proteobacteria Class | (%) |
|---|---|
| α-Proteobacteria | 28.6 |
| β-Proteobacteria | 42.9 |
| γ-Proteobacteria | 7.1 |
| ε-Proteobacteria | 14.3 |
| Unclassified-Proteobacteria | 7.1 |

Figure 29:
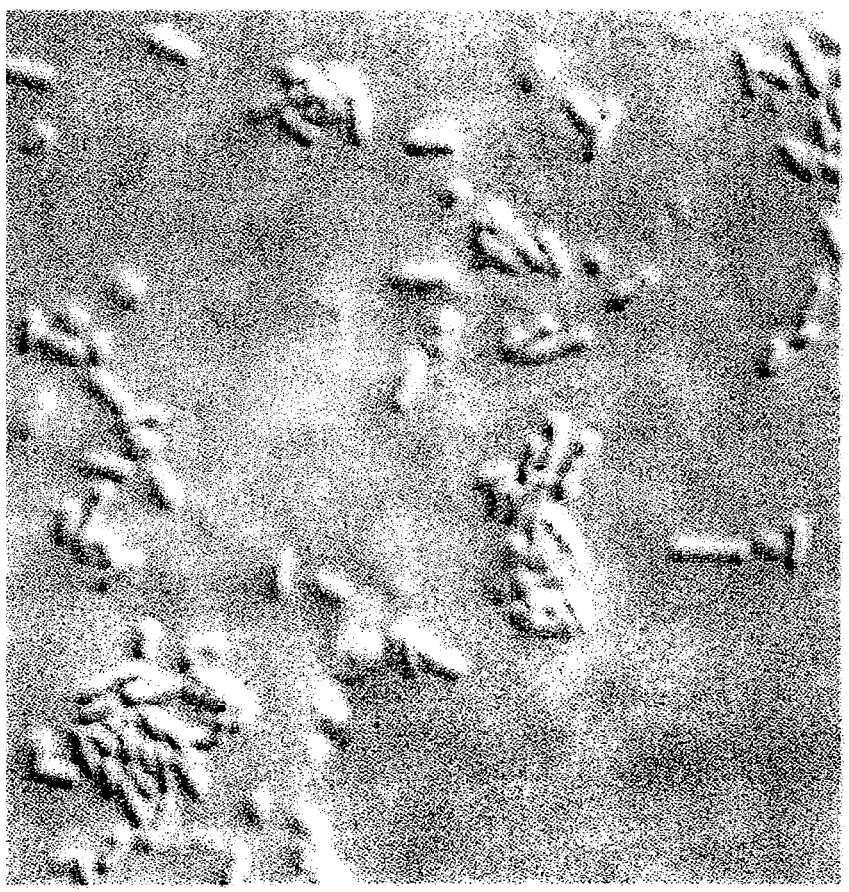
FIG. 29 is a microscopic phase-contrast image in gray scale, at 1000× magnification, of cells of a halophilic SUPeRB enrichment at 30 g/L NaCl according to an embodiment of the invention.
Figure 30:
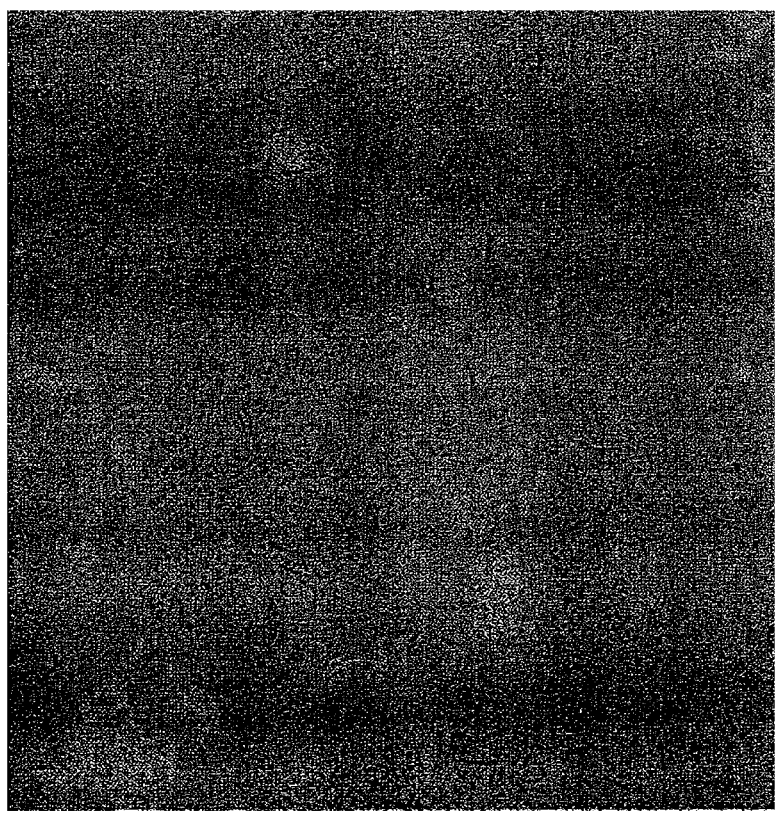
FIG. 30 is a microscopic epifluorescent image of the identical microscopic field as FIG. 29, at 1000× magnification, of in situ hybridization of cells of a halophilic SUPeRB enrichment at 30 g/L NaCl according to an embodiment of the invention.

Light microscopic images (FIGS. 29 and 30) show in situ hybridization cells from a halophilic SUPeRB enrichment that degrades perchlorate in the presence of 30 g/L of salt. The in situ probe, specific for common and well known perchlorate degraders (*Dechloromonas* spp.), was Monas1403 labeled with the fluorescent dye FAM. An identical microscopic field was viewed in gray scale by phase contrast (FIG. 29) and by epifluorescence (FIG. 30) at magnification 1000×.

Figure 31:
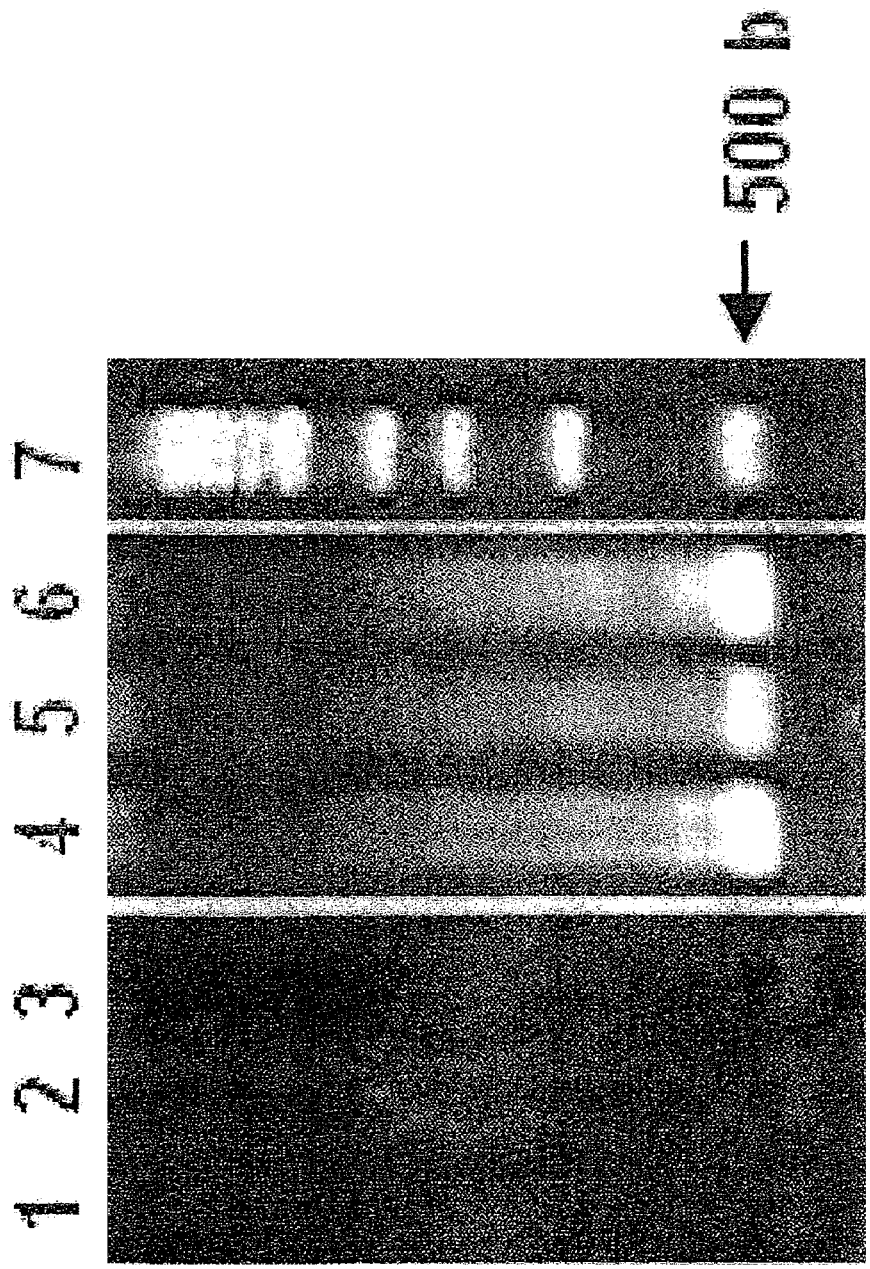
FIG. 31 shows two independent primer sets yielding amplification products indicating the presence of the gene cld for chlorite dismutase from total DNA extracted from SUPeRB, where lanes 1-3 are primers UCD-238F/UCD-646R, 408 bp; lanes 4-6 are primers DCD-F/DCD-R, 484 bp; lane 7, 1 Kb molecular marker.

Culture independent investigations showed the presence of genes indicative of perchlorate (or chlorate) reducers in a non-halophilic enrichment culture. Independent primers sets targeting internal regions of the gene cld for chlorite dismutase yielded amplicons of the expected size in triplicate experiments. FIG. 31 shows amplification products from two independent primer sets, indicating the presence of the gene cld for chlorite dismutase from DNA from SUPeRB (Lanes 1-3, primers UCD238F/UCD-646R, 408 bp; lanes 4-6, primers DCD-F/DCD-R, 484 bp; lane 7, 1 Kb molecular marker). A negative control without template DNA showed no bands. DNA extracted from *E. coli*, a non-(per)chlorate-reducing bacterium, showed no amplification of bands at the appropriate position in the gel. The DCD primer set (lanes 4-6) was based on sequences most similar to those of the most dominant perchlorate reducers in environmental systems, *Dechloromonas* spp., which confirms the clone library data (FIG. 28).

Figure 32:
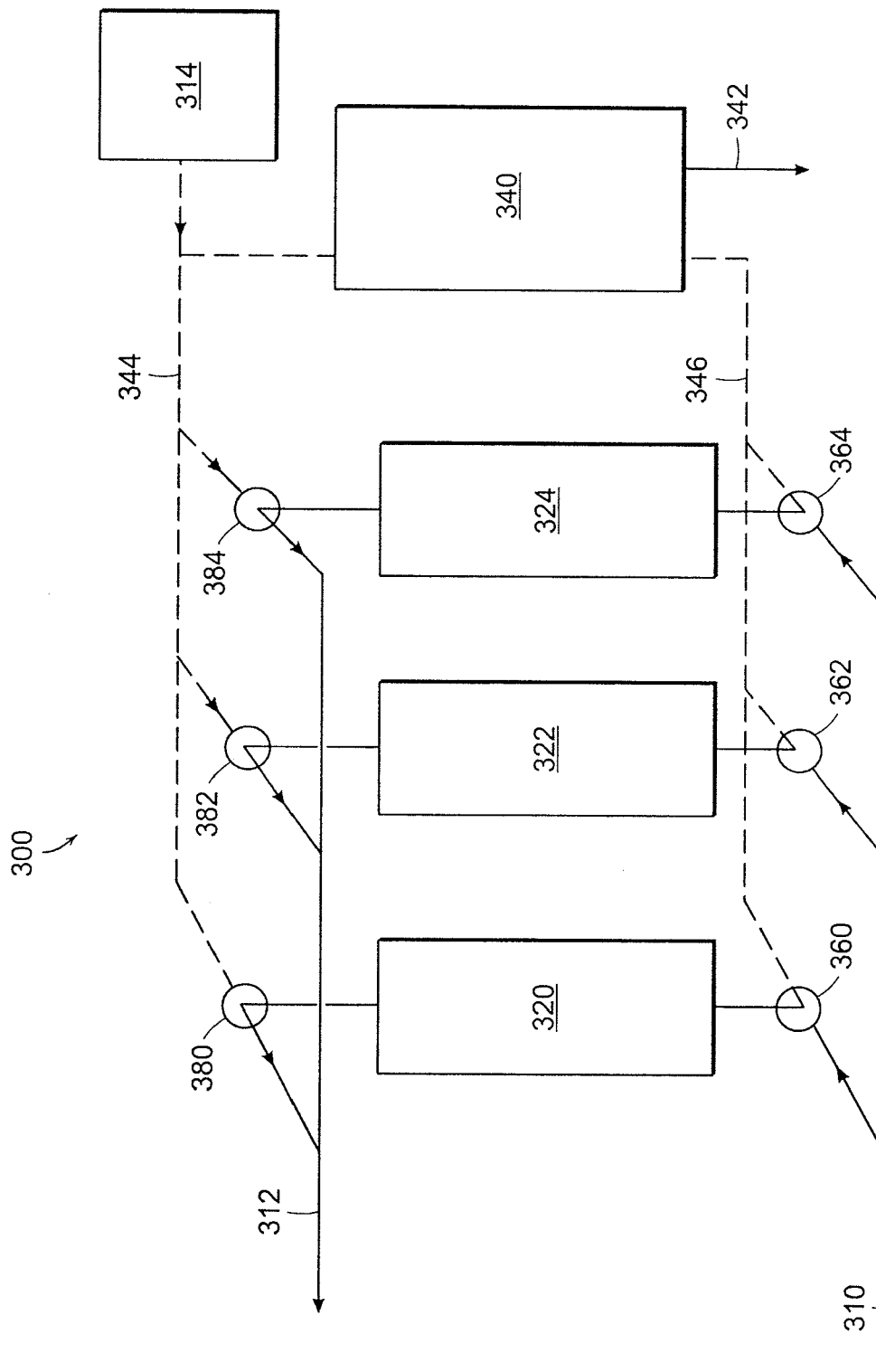
FIG. 32 depicts a combined primary and secondary perchlorate reduction system, wherein one or more ion exchange reactors are connected to a regeneration system comprising brine circulating through a perchlorate reduction bioreactor according to an embodiment of the invention.

FIG. 32 depicts a perchlorate reduction system 300 comprising a set of three ion exchange (IX) reactors 320, 322, 324 that are each connected by a set of valves to a brine flushing and/or IX regeneration system, wherein the brine flushing and or ion exchange regeneration system comprises a perchlorate reduction bioreactor 340, a brine source, a bioreactor drain valve 342, upper brine pipe 344 and lower brine pipe 346, according to an embodiment of the invention. For example, perchlorate reduction bioreactor 340 can comprise a sulfur granule and oyster shell media inoculated with a microbial community that contains at least one or more strains of one or more classes of Proteobacteria. A standard American Water Works Association mixture of synthetic ion exchange (IX) brine can be used at 30 g/L NaCl as a brine source. Inlet source water can enter via the influent pipe 310 and flow through any of the ion exchange reactors to which a valve is opened and be treated, i.e., reduced in perchlorate, and then the treated water can exit via the effluent pipe 312. Multiple-position valves 360, 362, 364 can (i) open to connect reactors 320, 322, 324, respectively, to inflow from influent pipe 310, (ii) open to connect reactors 320, 322, 324, respectively, to inflow from or outflow to the lower brine flush pipe 346, or (iii) be closed. Multiple-position valves 380, 382, 384 can (i) open to connect reactors 320, 322, 324, respectively, to outflow through effluent pipe 312, (ii) open to connect reactors 320, 322, 324, respectively, to inflow from or outflow to upper brine flush pipe 344, or (iii) be closed. By appropriate controlling of the valves, any one of the ion exchange reactors can be active at one time, while one of the other ion exchange reactors, simultaneously, can be regenerated by the brine regeneration and perchlorate bioreactor system. For example, opening valve 364 to connect influent pipe 310 with the volume of IX reactor 324 and similarly opening valve 384 to connect IX reactor 324 to effluent pipe 312, will make IX reactor 324 the active IX reactor in the primary treatment path. Simultaneously, if valves 380 and 360 are closed and valves 362 and 382 are open to brine pipes 346 and 344 respectively, then IX reactor 322 is put into fluid contact with the brine source and the perchlorate reduction bioreactor. The brine solution can be recirculated, for example until sulfate ion builds up to excessive levels, and/or the brine can be drained through drain 342 and recharged from brine source 314. It is also to be understood that the ion exchange resin in the ion exchange reactors can be disposed of periodically and/or regenerated on a variety of schedules.

It will be appreciated that the configuration of perchlorate reduction system 300 of FIG. 32 is illustrative only, and is not limited to the configuration shown; fewer or more IX reactors can be used, additional perchlorate reduction bioreactors can be included, alternate piping, connections and valves can be used, and other treatment equipment and steps can be added. Further, it will be appreciated that, by appropriate, alternative combinations of opening and closing of the multiple-position valves, multiple IX reactors can be active simultaneously and/or multiple IX reactors can be flushed and/or regenerated simultaneously by the brine flushing and perchlorate reduction bioreactor system.

It will be appreciated further that the above system for perchlorate reduction in FIG. 32, which in the embodiment shown combines a primary ion exchange (IX) perchlorate reduction system with a brine regeneration system and secondary perchlorate-reduction bioreactor that reduces the perchlorate in the brine, can be simplified in another embodiment to comprise a perchlorate reduction system wherein the primary perchlorate reduction is achieved directly by the bioreactor 340. This can be accomplished, for example, by closing valves 360, 362, 382 and 384 and opening multi-position valves 364 and 380 to only straight-through flow (i.e., closed to or bypassing reactors 324 and 320, respectively), so that influent pipe 310 flows directly an inlet pipe 346 of the bioreactor 340 and the outlet pipe 344 from the bioreactor flows directly to the outlet pipe 312.

While the invention has been described in connection with specific methods and apparatus, those skilled in the art will recognize other equivalents to the specific embodiments herein. It is to be understood that the description is by way of example and not as a limitation to the scope of the invention and these equivalents are intended to be encompassed by the claims below and as set forth in the claims.

What is claimed is:

1. A method for treating liquid from a source to reduce perchlorate concentration in the liquid, comprising:
   supplying inlet liquid from a liquid source, the liquid having a first perchlorate concentration,
   delivering a liquid into a bioreactor having a cavity and at least one inlet and at least one outlet opening connecting to the cavity, the bioreactor having a packed media comprising a plurality of granules of electron donor material and pieces of mollusk shell buffer material having at least 90% calcium carbonate by weight, positioned in the bioreactor cavity such that a liquid passing through the bioreactor cavity makes fluid contact with the media and such that the pieces of mollusk shell material are in fluid communication with the granules of electron donor material, the media being seeded with a sludge containing bacteria,
   forming a treated liquid having a second perchlorate concentration less than the first, and
   passing the treated liquid out of the bioreactor outlet opening.

2. The method of claim 1, further comprising, after the step of passing the treated liquid out of the bioreactor outlet opening,
   post-treating the treated liquid by substantially filtering biocells with a sand filter.

3. A method of treating water from a water source to reduce perchlorate concentration in the water, comprising:
   supplying inlet water from a water source, the water having a first perchlorate concentration,
   optionally using a pretreatment system having at least one inlet and at least one outlet,
   providing a bioreactor having an interior cavity and at least one inlet and at least one outlet opening,
   connecting the outlet of the said optional pretreatment system to the inlet of the bioreactor,
   using a media comprising sulfur granules and mollusk shell pieces forming a packed bed in the bioreactor interior cavity such that water passing through the bioreactor cavity makes fluid contact with the media, the media being seeded with a sludge containing bacteria,
   configuring the optional pretreatment system, bioreactor, and the inlet opening and the outlet opening to enable water to pass through the pretreatment system into the bioreactor cavity in such manner that the water makes fluid contact with the media and subsequently exit from the bioreactor, and
   optionally passing the water having a first perchlorate concentration from the water source into the pretreatment system to form pretreated water having a perchlorate concentration,
   passing the optionally pretreated water having a perchlorate concentration into the bioreactor to come into fluid contact with the media and thereby forming treated water having a second perchlorate concentration less than the first concentration, and
   passing the treated water out of the bioreactor outlet opening as outlet water.

4. The method of claim 3 wherein the step of passing water having a first perchlorate concentration into the optional pretreatment system to form pretreated water includes substantially removing at least one of particulate matter or litter material from the inlet water.

5. The method of claim 3, further comprising,
   supplying inlet water from a catchment, a holding tank, an industrial wastewater stream or other waste water source,
   using a media in the bioreactor comprising at least a volume of sulfur granules and at least a volume of mollusk shell pieces, wherein the sulfur granules comprise pellets, nuggets, blocks and particles of elemental sulfur not less than 2 mm in diameter and the volume ratio of sulfur granules to mollusk shell pieces in the bioreactor is in the range of 250% to 350%,
   seeding the media with sludge containing a plurality of living micro-organisms comprising at least one of a species of perchlorate-reducing bacteria that grows on sulfur and respires on perchlorate,
   moving the water within the bioreactor in a direction of primary flow during treatment at a flow rate greater than 0.2 L/hr,
   receiving the treated water from the bioreactor into at least one outlet pipe to create outlet water, and
   improving the quality of the outlet water relative to the quality of pretreated water.

6. The method of claim 5 wherein the step of seeding the media with sludge includes seeding with sludge containing at least one member of the β-proteobacteria or α-proteobacteria.

7. The method of claim 1, further comprising
   providing a recycling pump and recycling pipe between the bioreactor outlet opening and the bioreactor inlet,
   optionally recirculating the water in the bioreactor system at a recirculation flow rate, which rate is the lesser of about 9.7 cm/mm or about 52 times the influent flow rate.

8. The method of claim 3, further comprising:
   using a backwash system comprising a backwash inlet pipe entering the bioreactor interior cavity, a backwash outlet pipe exiting the bioreactor interior cavity and a backwash pump, the using step including:
   introducing backwash water from a source to the backwash inlet pipe,
   activating the backwash pump to pump the backwash water through the media, backwashing at a pressure in the range of 60 to 180 PSI, preferably 80-100 PSI,
   receiving backwash water that has passed through the media, and releasing backwash water from the bioreactor through the backwash outlet pipe.

9. The method of claim 3, further comprising:
improving the quality of the outlet water relative to the quality of the inlet water by producing outlet water that has substantially lower concentration of perchlorate.

10. The method of claim 1, further comprising
improving the quality of the outlet water relative to the quality of pretreated water by producing outlet water that has substantially lower concentration of perchlorate.

11. The method of claim 3, further comprising
producing outlet water that has, on average, a perchlorate concentration less than 10.0% of the perchlorate concentration of the inlet water.

12. The method of claim 3, further comprising:
using a media buffering material wherein water placed in fluid contact with the media buffering material, upon addition of an acid titrant of 2.5 milli-equivalents per liter of H+ ions sufficient to shift the pH of the water from a starting pH value Y to a new pH of 3.0, recovers 68% of its starting pH value, that is, 68% x Y, within 140 minutes.

13. The method of claim 8, further comprising
periodically activating the backwash pump to pump the backwash water through the media in a direction opposite to the direction of primary flow during treatment.

14. The method of claim 10, wherein the outlet water has, on average, a perchlorate concentration less than 0.5 mg/L.

15. The method of claim 3, wherein the step of passing the optionally pretreated water into the bioreactor to come into fluid contact with the media and thereby form a treated water further comprises,
delivering the optionally pretreated water without aeration inside the bioreactor and the fluid contact between the liquid and the media is substantially anoxic.

16. The method of claim 5 wherein the bacteria colonize upon the sulfur granules and upon the mollusk shell pieces.

17. The method of claim 3 wherein the water contacts the media for a period in the range of about 8 to 40 hours.

18. The method of claim 3, further comprising, prior to the step of using a media,
forming the media including mollusk shell pieces that are crushed, unmodified mollusk shell pieces, and
sterilizing the crushed, unmodified mollusk shells prior to providing the media.

19. The method of claim 3, further comprising using the oyster shell pieces to control alkalinity.

20. The method of claim 3, wherein prior to the step of using the media forming the media comprising crushed, unmodified oyster shells obtained through a source of crushed oyster for poultry farming or is a source of industrial bi-product oyster shells.

21. The method of claim 8, wherein backwashing is conducted not more than once every six months.

22. The method of claim 3, further comprising
producing outlet water that has, on average, a perchlorate concentration less than 2% of the perchlorate concentration of the inlet water.

23. The method of claim 22, further comprising maintaining the produced outlet water at less than 2% concentration of the perchlorate concentration of the inlet water after at least 100 days of operation.

24. The method of claim 22, wherein a flow in the bioreactor is recirculated at a 9.7 cm/mm recirculation velocity.

25. The method of claim 11, wherein an empty bed contact time is less than 40 hours.

26. The method of claim 11, further comprising maintaining the produced outlet water at less than 10% concentration of perchlorate in the inlet water after at least 260 days of operation without recirculation and with an empty bed contact time less than 15 hours.

27. The method of claim 3, further comprising
using granules of electron donor material in the bioreactor cavity that are elemental sulfur and comprise a plurality of one or more of sulfur pellets, sulfur nuggets, sulfur blocks and sulfur particles, wherein the pellets, nuggets, blocks or particles are in the range of about 0.15-10 mm, and
using pieces of calcium carbonate material in the bioreactor cavity, the pieces of material comprising oyster shell pieces, wherein a total volume in the bioreactor filled by the elemental sulfur is approximately three times greater than a total volume filled by the oyster shell pieces.

28. The method of claim 27, wherein the media is seeded with a sludge containing sulfur-utilizing, perchlorate reducing bacteria includes seeding with a sludge containing at least one of a bacteria species that is a member of the β-proteobacteria or α-proteobacteria.

29. The method of claim 3, wherein the step of using the media further comprises using calcium carbonate material having at least 90% calcium carbonate by weight in the form of aragonite.

30. The method of claim 1, further comprising
producing outlet water that has, on average, a perchlorate concentration less than 10.0% of the perchlorate concentration of the inlet water.

31. The method of claim 1, further comprising, prior to the step of supplying inlet liquid,
processing mollusk shell pieces wherein the mollusk shell pieces comprise crushed, unmodified mollusk shell pieces by sterilizing the crushed, unmodified mollusk shells prior to packing the reactor cavity.

32. The method of claim 1 wherein the packed media comprises a layer of the granules of electron donor material and a layer of the mollusk shell material.

33. The method of claim 1 further comprising providing fluid communication between the bioreactor cavity and an ion-exchange reactor.

34. The method of claim 1 further comprising passing a treated liquid having a perchlorate concentration of less than 4 micrograms per liter.

35. The method of claim 1 further comprising forming the treated liquid in the bioreactor cavity without aeration.

36. The method of claim 1 further comprising using a proteobacteria in the bioreactor for perchlorate reduction.

* * * * *